| KEY POS | CODE | | |
|---|---|---|---|
| 1 | 1234567 | T.F. | |
| 8 | 34567 | UC | |
| 9 | 23456 | TAB | |
| 10 | 5 | SPACE | |
| 11 | 1 | I | |
| 12 | 245 | + | |
| 13 | 457 | Q | |
| 14 | 167 | A | |
| 15 | 2 | 2 | |
| 16 | 146 | Z | |
| 17 | 236 | W | |
| 18 | 256 | S | |
| 19 | 125 | 3 | |
| 20 | 12356 | X | |
| 21 | 13567 | E | |
| 22 | 367 | D | |
| 23 | 3 | 4 | |
| 24 | 12567 | C | |
| 25 | 147 | R | |
| 26 | 23567 | F | |
| 27 | 135 | 5 | |
| 28 | 136 | V | |
| 29 | 126 | T | |
| 30 | 12367 | G | |
| 31 | 235 | 6 | |
| 32 | 267 | B | |
| 33 | 456 | Y | |
| 34 | 467 | H | |
| 35 | 123 | 7 | |
| 36 | 137 | N | |
| 37 | 356 | U | |
| 38 | 157 | J | |
| 39 | 4 | 8 | |
| 40 | 357 | M | |
| 41 | 14567 | I | |
| 42 | 257 | K | |
| 43 | 145 | 9 | |
| 44 | 12456 | , | |
| 45 | 237 | O | |
| 46 | 127 | L | |
| 47 | 6 | 0 | |
| 48 | 12467 | . | |
| 49 | 12357 | P | |
| 50 | 567 | & | |
| 51 | 247 | o | |
| 52 | 156 | / | |
| 53 | 7 | — | |
| 54 | 12457 | % | |
| 55 | 13467 | 1/2 | |
| 56 | 8 | CR. RET. | |
| 57 | 246 | BK. SP. | |
| 59 | 24567 | LC | |
| 71 | 347 | F-4 | |
| 72 | 134 | F-8 | |
| 73 | 124 | F-1 MNP. STOP | |
| 74 | 12347 | F-11 | |
| 75 | 23467 | F-5 | |
| 76 | 234 | F-9 | |
| 77 | 345 | F-2 | |
| 78 | 13457 | F-12 | |
| 79 | 12346 | F-6 | |
| 80 | 12345 | F-10 | |
| 81 | 346 | F-3 PRINT RES. | |
| 82 | 13456 | F-13 | |
| 83 | 23457 | F-7 | |

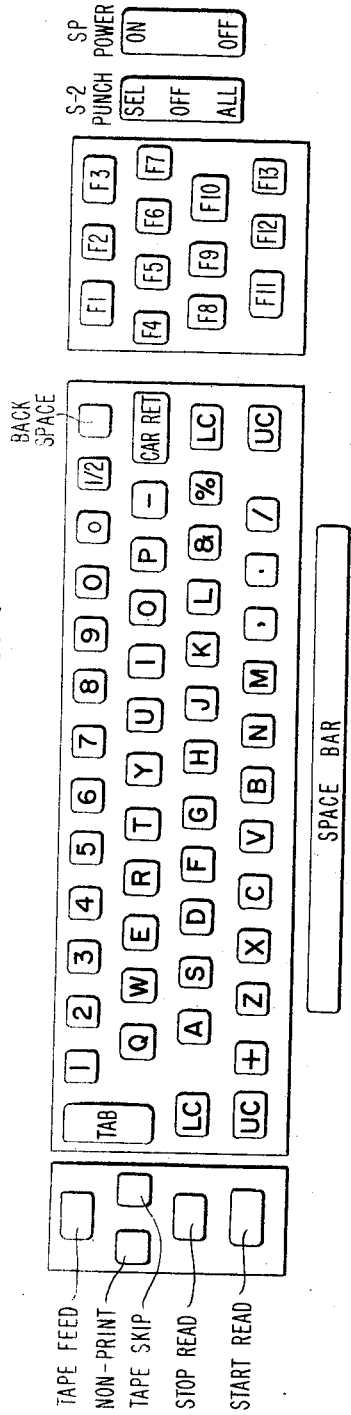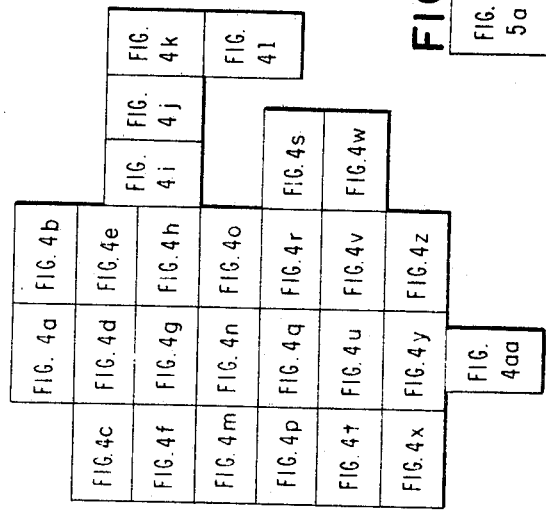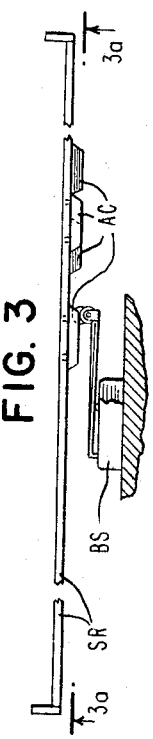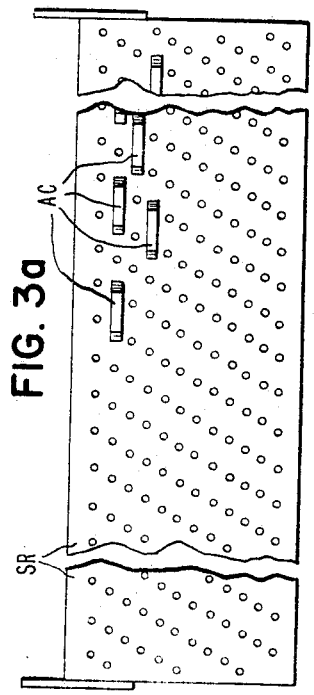

FIG. 2

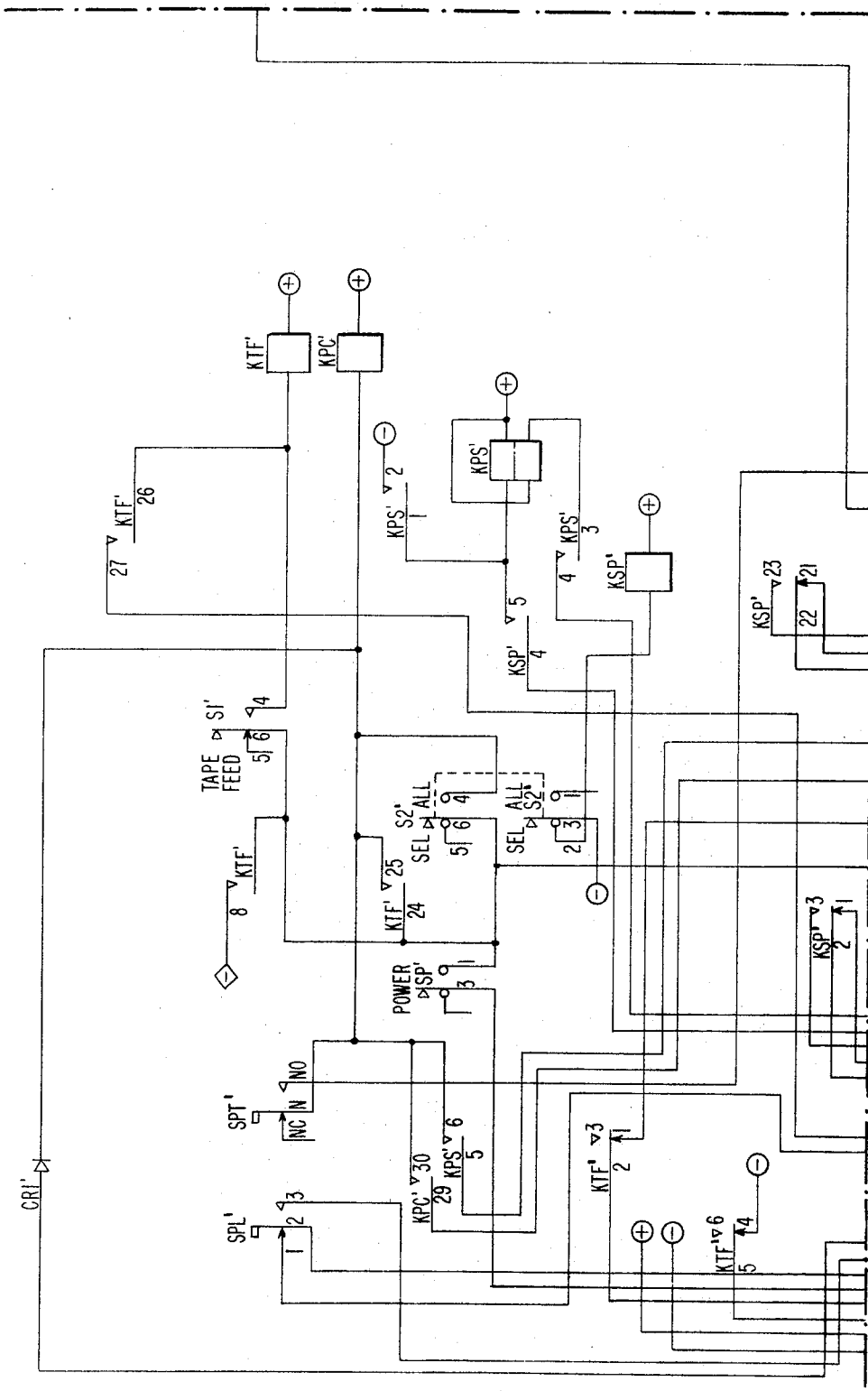

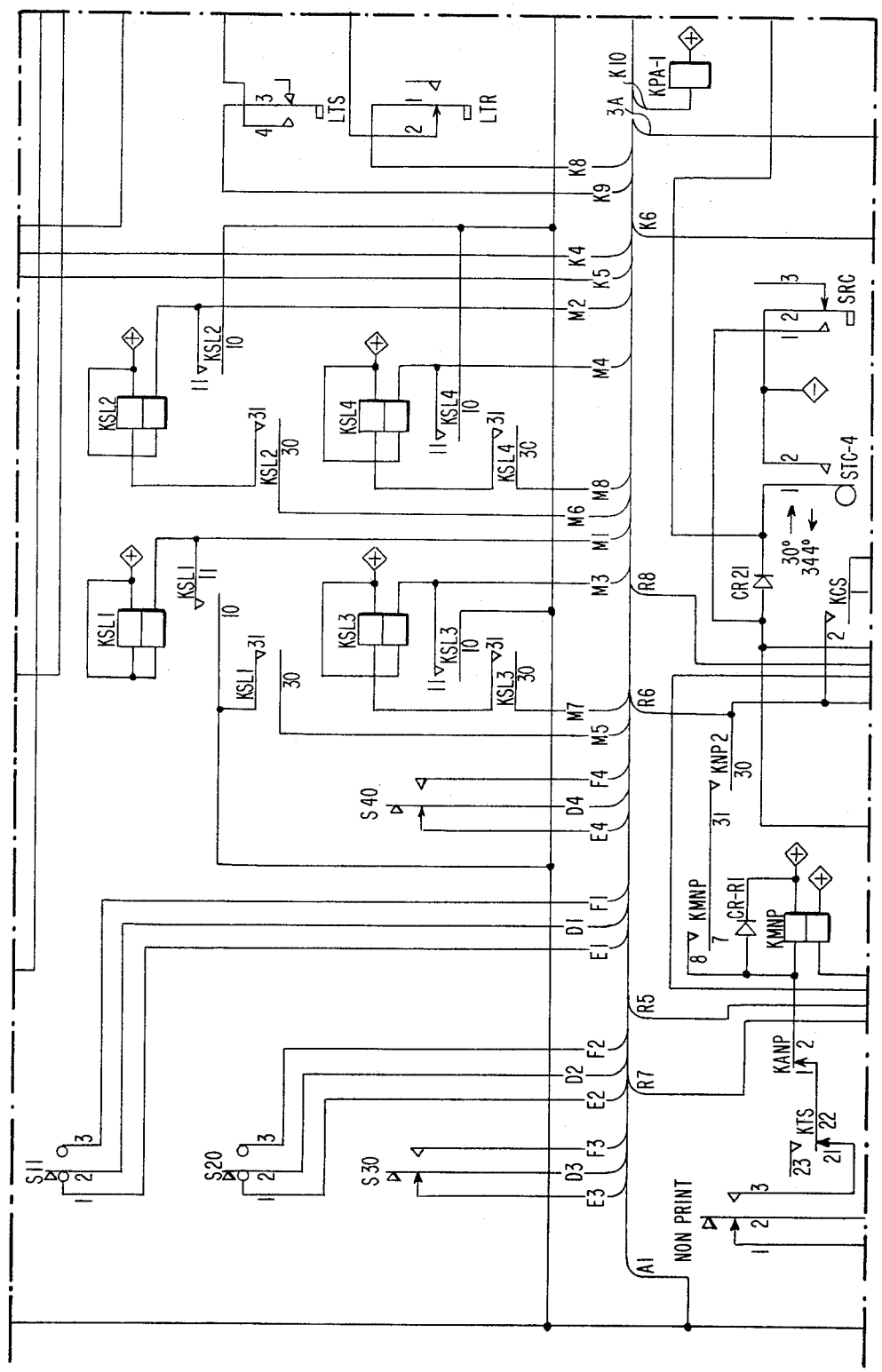

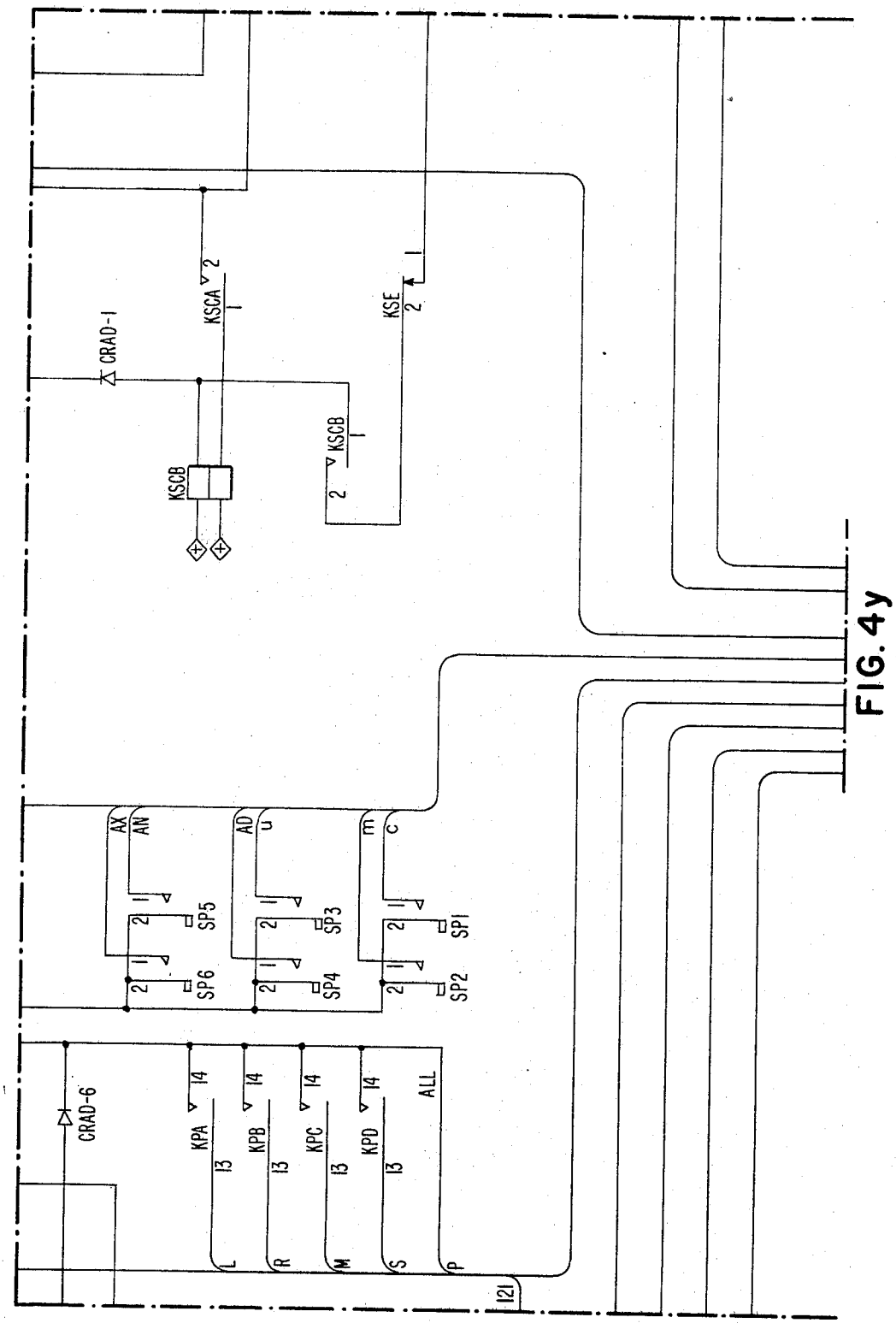

United States Patent Office 3,507,377
Patented Apr. 21, 1970

3,507,377
DATA UTILIZING SYSTEM INCLUDING A TABULATING CARD READER
Gilbert A. Denis, Rochester, N.Y., assignor to The Singer Company, a corporation of New Jersey
Filed Aug. 20, 1965, Ser. No. 481,242
Int. Cl. B41j 5/36
U.S. Cl. 197—20             10 Claims

ABSTRACT OF THE DISCLOSURE

The present invention relates to machines and systems for translating data information supplied manually or read from record media such as punched tapes and tabulating cards. More particularly, the inventon relates to machines and systems for program-controlled translation of data and especially to the production of printed documents and other reproduction of data by use of information derived in whole or in part from punched tape and tabulating cards read by a program-controlling and program-controlled punched tape reader or tabulating card reader or both.

Background of the invention

In the field of automated data translation, speed and accuracy of data processing and flexibility of automated operations are primary attributes to be desirably attained within the limits of practicability established by each particular class of application. Not all data processing applications are of such large scope as to require the high speed and extensive data processing capacity which characterize the typical complex and high cost electronic computer. Many inherently involve manual data manipulations and the translation of data recorded by use of punched tape and tabulating card record media, and the speed of data processing is often limited by these factors. Even though limited in speed of operation, accuracy and flexibility of automated operations remain as highly desirable objectives of these systems. This is particularly true in those innumerable applications centering around the extensive recording of data by use of tape recording media (such as punched tape and magnetic tape and tabulating cards.

Punched tape and tabulating cards are widely used to record numerous kinds and types of data, particularly that relating to various forms of business activities. This recorded data is then useful in many automated operations including a diversity of accounting and inventory control procedures and preparation of printed records and documents. It is often desirable to make selective recording and selective utilization of data recorded in a punched tape or like type of recording medium and selectively to use data recorded in a group of tabulating cards as by sorting the cards into particular categories or even to make selective use of data recorded in an individual tabulating card.

Such selective recording and selective use of only a part of the data recorded in a tape or the selective use of a portion of each tabulating card has heretofore often been accomplished in document preparation and like applications by some form of manual control or program control prerecorded in the tape or in each individual tabulating card. The flexibility of program selective control and the ease and rapidity of desired change of prerecorded programs has heretofore been appreciably more limited than is desirable. For example, a particular program may be established by an endless belt of punched tape having successively recorded program-control punched codes or by a program control punched tabulating card wrapped around and carried by a program drum, in either of which arrangements any desired change of the program requiring physical replacement of one program tape or card by another.

Related application

The system disclosed herein includes a power-driven typewriter which may have the general construction disclosed in the Blodgett et al. U.S. Patent No. 2,905,298 including a punched-tape and edge-punched tabulating card reader and a tape punch constructed as integral units of the typewriter as shown in the cited patent the disclosure of which is incorporated herein by reference.

Objects

It is an object of the present invention to provide a novel and highly flexible system for program controlled translation and utilization of data recorded in tape or in each of successively read tabulating cards, and one having particular utility in printed document preparation.

It is a further object of the invention to provide a new and improved system for deriving and utilizing data from tape or tabulating cards, and one wherein the tape or each card is read under highly flexible program control manually selectable and changeable at will or automatically selectable and changeable according to program information recorded in the tape or according to prerecorded programs derived from card to card and under selective control of each card itself.

It is an additional object of the invention to provide a highly flexible data translation system wherein data, derived from a record tape or from each of a plural tabulating cards successively read under program controls which extend to each individual card column and which are selectively changeable manually or automatically from card to card, may be rerecorded in whole or in selectable part in a new record medium, may be utilized alone or combined with manually inserted data for printed document preparation, or may be both so rerecorded and utilized under both format controls and reading and recording controls which are exercised both manually and by the document printer or which are supplied by an additional program record medium which itself may supply data in the document preparation.

Brief description of the drawings

Other features and advantages of the invention will be apparent from the detailed description hereinebelow set forth considered together with the accompanying drawings wherein:

FIG. 1 illustrates the keyboard layout arrangement, including associated function code keys and control switches, of an electric power-driven typewriter used in the data translation system of the invention;

FIG. 2 shows a typical eight-channel code form useful in the system of the invention for automatic control of the typewriter operations in accomplishing document reproduction and format and function controls;

FIGS. 3 and 3a illustrate a field switch rack structure having a plurality of stationary switches and rack supported switch actuators arranged for movement with the typewriter carriage during line printing operations thereof;

Figure 5A:
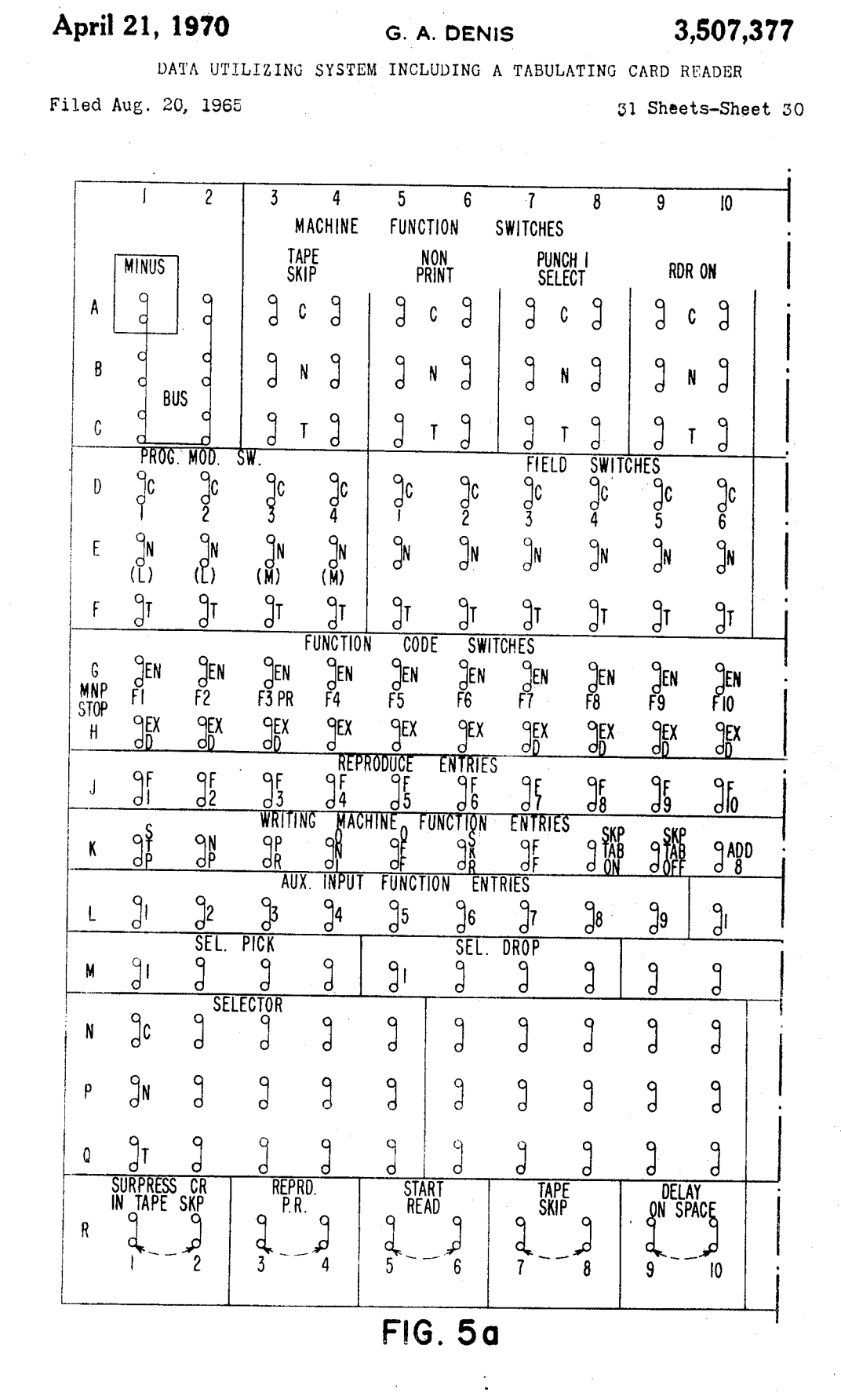
Figure 5B:
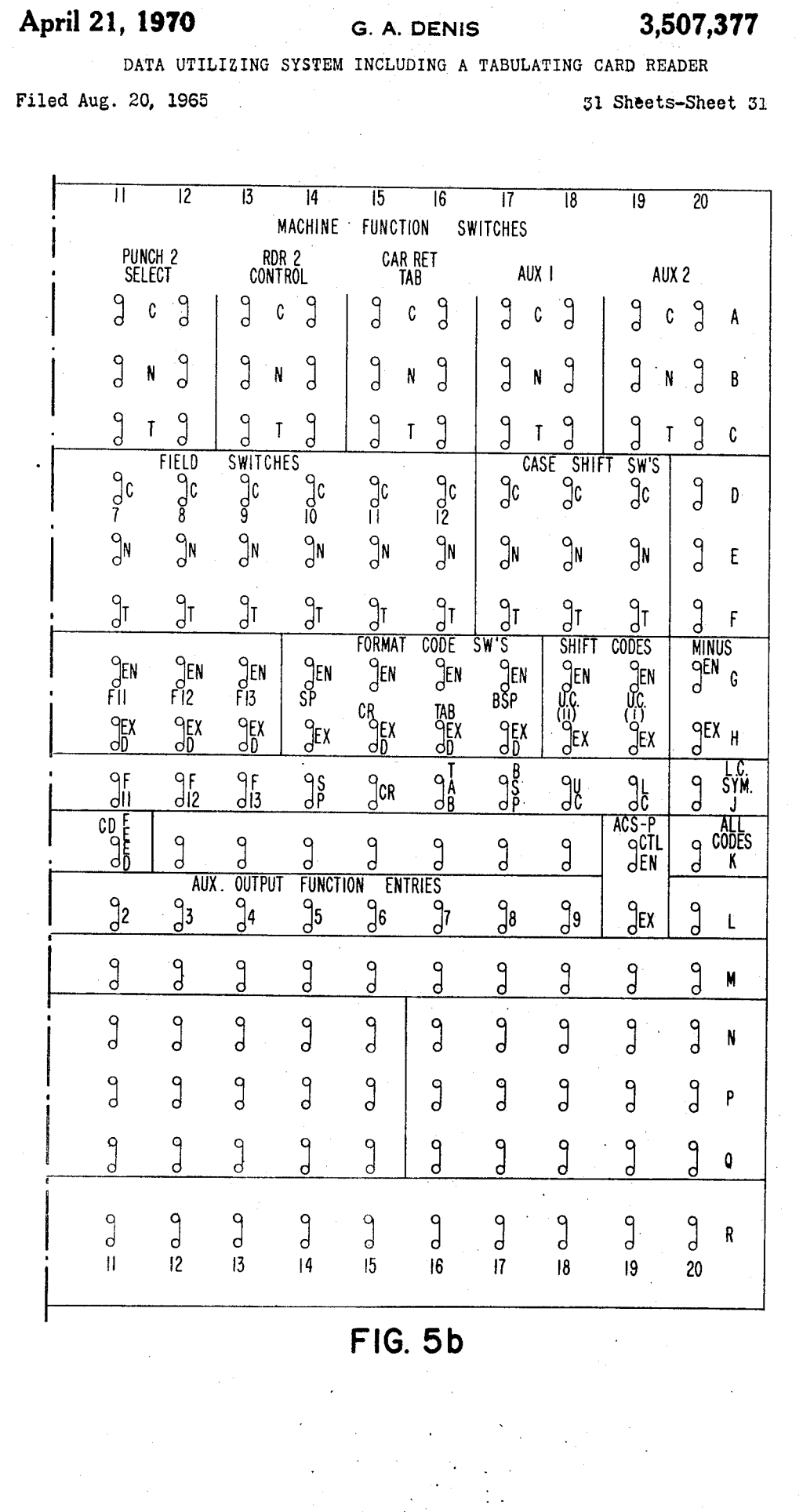

FIGS. 5a and 5b arranged as in FIG. 5 illustrate the plugboard of the typewriter with all wiring removed for convenience in order that the identification of the plugboard terminals and their operational utility may be more clearly seen.

General organization and operation

Figure 4B:
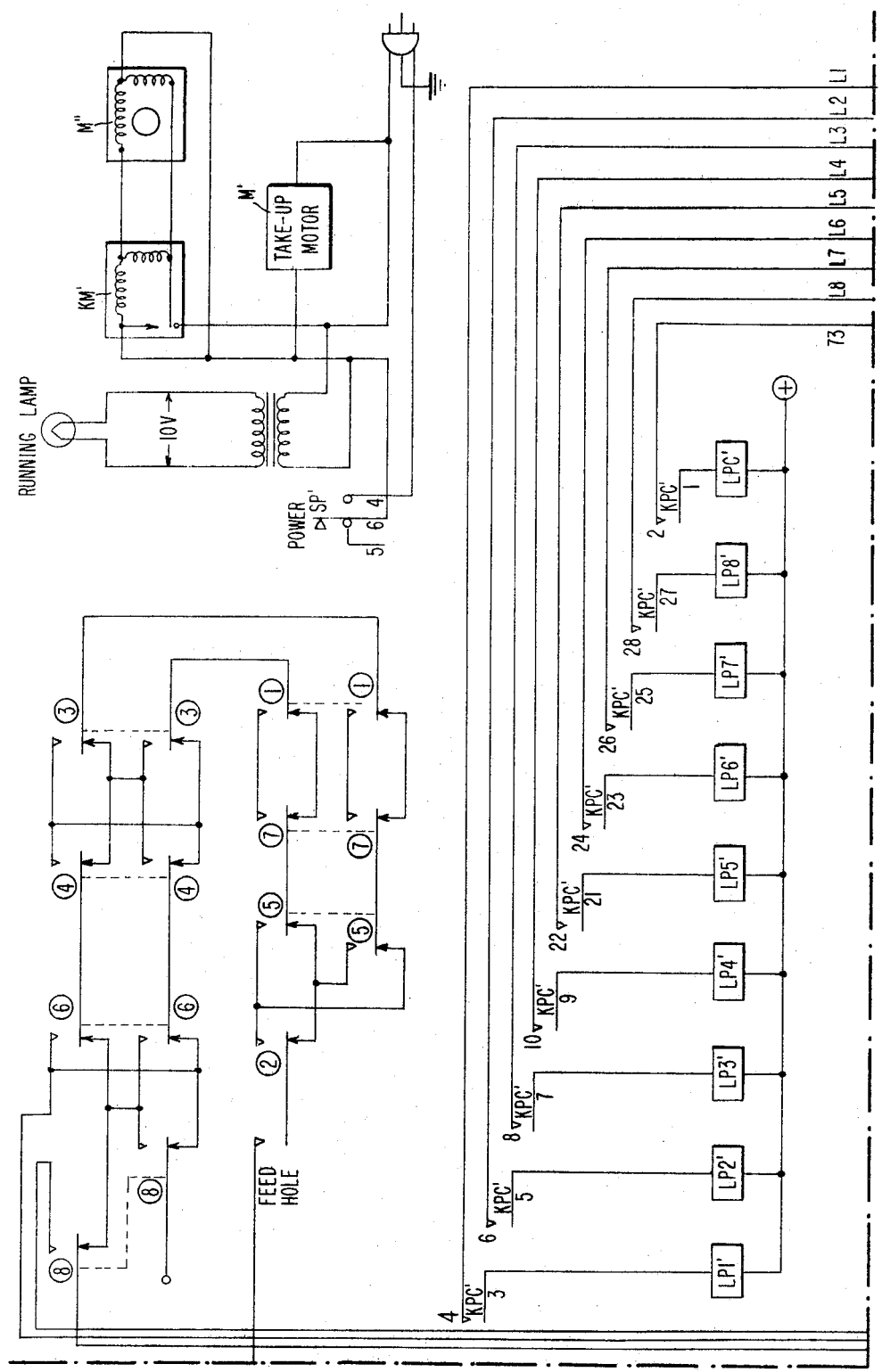
FIGS. 4a–4aa arranged as in FIG. 4 show the composite electrical circuit diagram of the typewriter combined with an automatic tabualting card reader which together comprise a system embodying the invention and operative to derive and utilize data recorded both in a punched tape and in Hollerith code form in conventional tabulating cards.
Figure 4C:
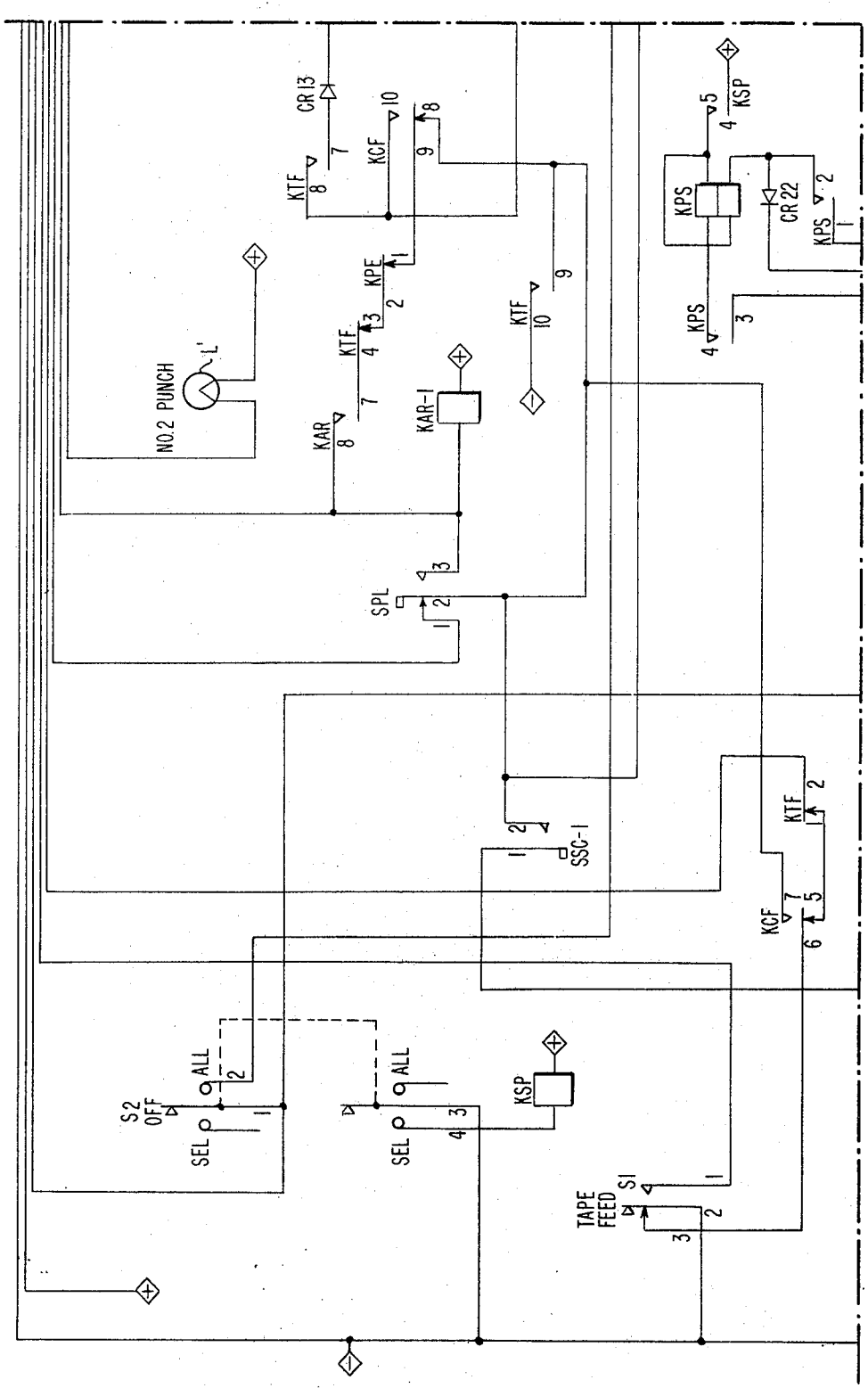
Figure 4D:
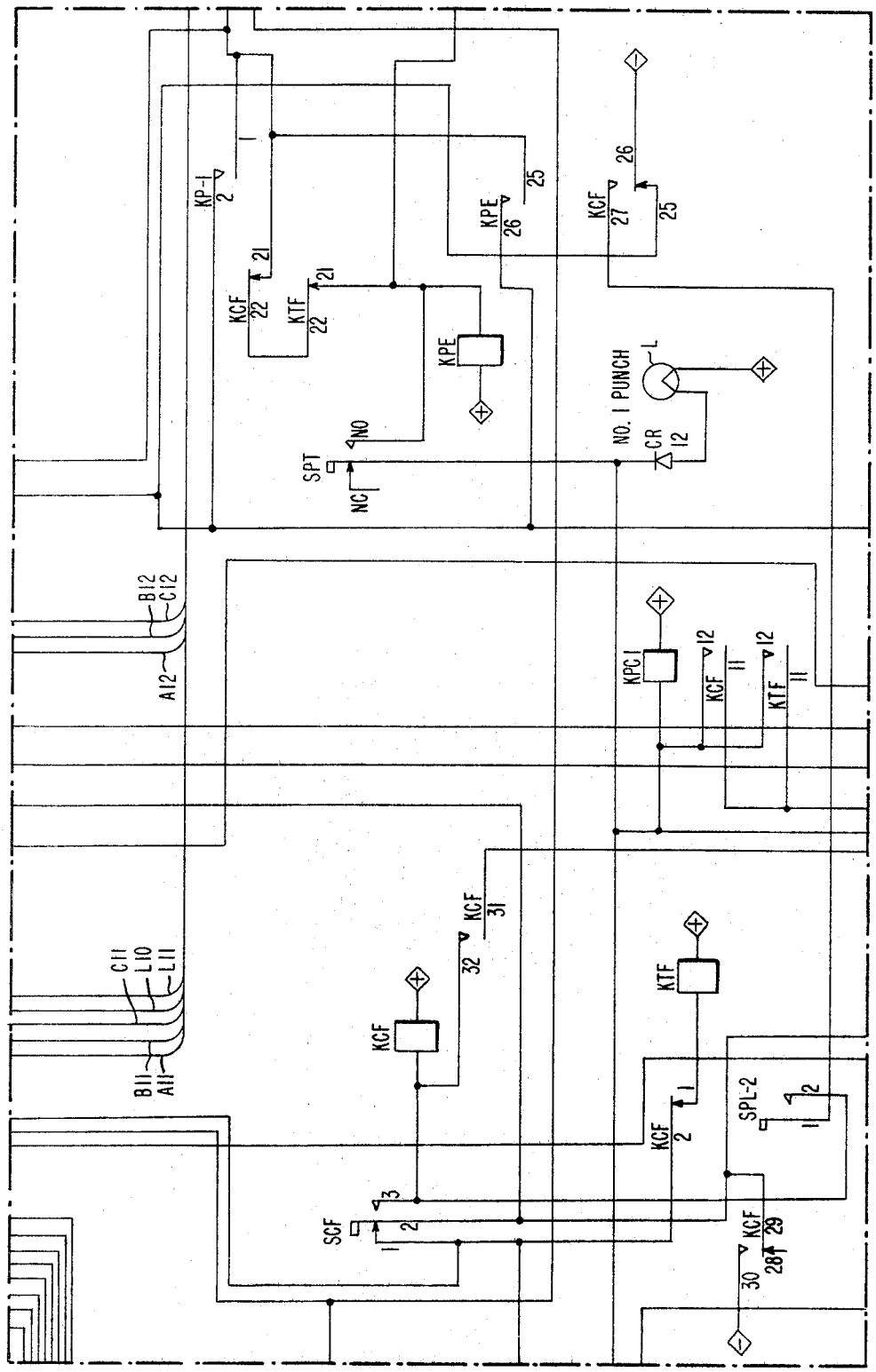
Figure 4E:
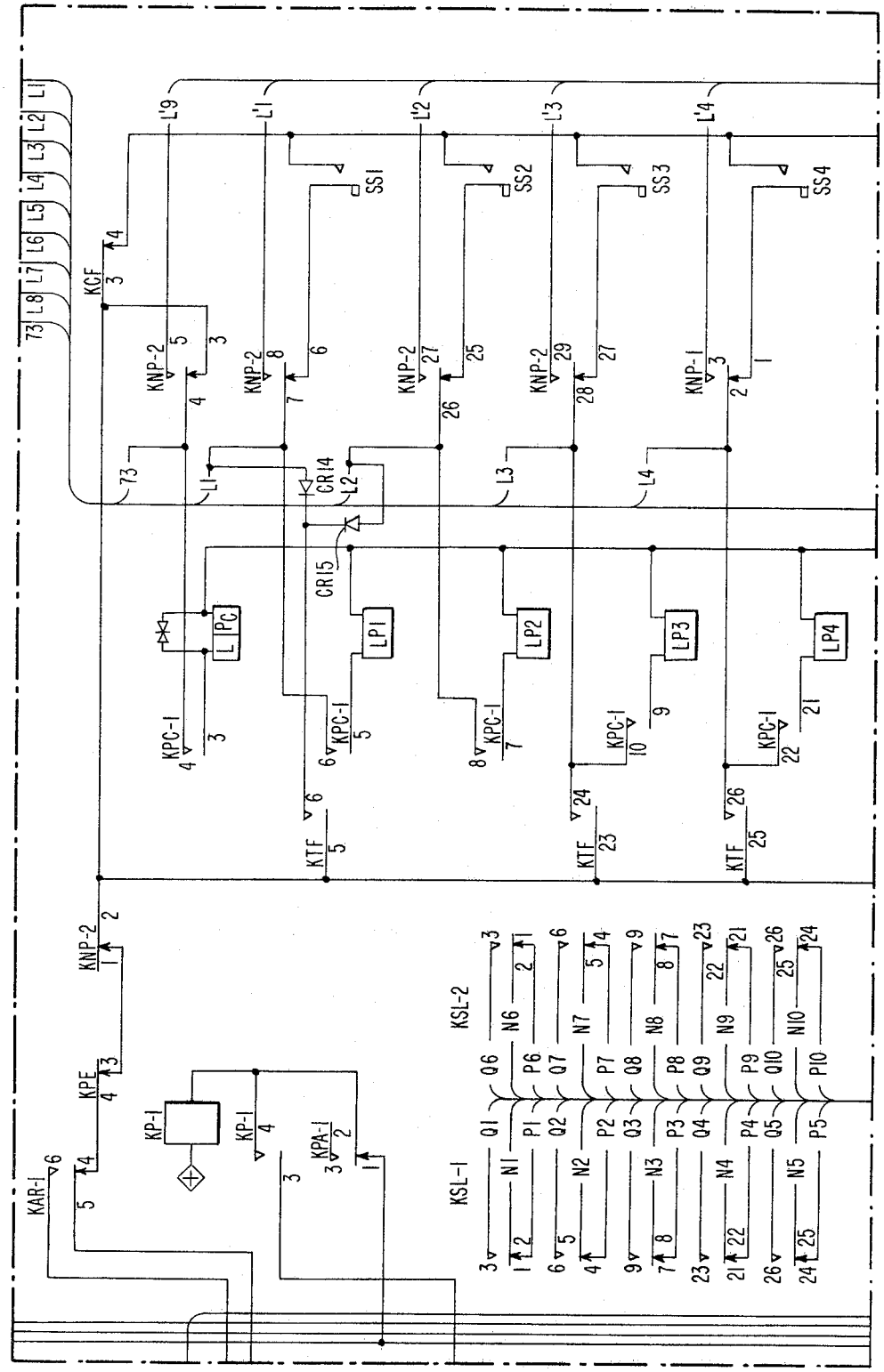

A system embodying the present invention is described herein as one in a form useful for deriving from an input punched tape or from tabulating cards and for utilizing such data in reproduction of printed documents while automatically producing a by-product punched tape which selectively records data read from the input punched tape or from tabulating cards or data manually inserted into the printed document by manual manipulation of the typewriter keyboard and associated function keys. The system includes a power-driven typewriter having the general construction disclosed in the Blodgett et al. U.S. Patent No. 2,905,298 including a punched-tape and edge-punched tabulating card reader (the term "punched tape" reader being used herein for convenience of reference as applicable to a reader suitable for reading punched tape or an edge-punched tabulating card or both) and a tape punch constructed as integral units of the typewriter as shown in this patent. The keyboard of the typewriter, and arrangement of associated function keys and control switches hereinafter described more particularly, is illustrated in FIG. 1 and is generally of conventional key arrangement including alphabetic, numeral, symbol and function keys. These keys are operable, as in the Blodgett et al. patent, both manually and automatically under control of a code translator. The latter is operatively responsive to the typical code shown in FIG. 2 according to coded information read by the input punched-tape reader of the typewriter, or according to information read in Hollerith code form from tabulating cards and by use of a tabulating card reader hereinafter described and which converts each item of information in Hollerith code form to a corresponding item of information in the FIG. 2 code form.

As in the Blodgett et al. patent mentioned, the typewriter system herein described includes provision for manually or automatically selecting a non-print operational condition of the typewriter to permit information read from a data reader to be rerecorded in either of two punched-tape data recorders selectively placed into operation either manually or automatically under program control, the non-print operation being terminated in each instance under program control.

Also as in the Blodgett et al. patent, the typewriter operation may be manually or automatically controlled to skip and make no utilization of information read from a punched tape by the integral reader of the typewriter, and data may be selectively skipped in one or more columns of each tabulating card by control of the tabulating card reader according to a program selected manually or automatically as applicable to all tabulating cards or one selected by each successively read card.

However, and for reasons which will be explained more fully hereinafter, the typewriter of the system described herein has substantially increased flexibility and versatility in selecting, utilizing and qualifying various automatic program and manual controls and this is accomplished by several possible modifications of a given program either under manual control or under control of the program itself. Enhanced flexibility of typewriter programmed operations with available qualifications thereof is attained by the field switch rack structure illustrated in FIGS. 3 and 3a and which enables typewriter functions to be initiated, controlled and qualified by the position of the typewriter carriage. This field rack structure includes a switch bank BS having twelve individual switches which may be operated, according to the prevailing cariage position, by plural actuators AC. The latter have individual lengths selected to provide switch actuation over a preselected number of carriage print positions, which are defined by aligned apertures in twelve rows thereof on a switch rack SR and into which the actuators AC may be inserted and retained for actuation of individual ones of the twelve field switches in the switch bank BS.

Further flexibility of program-control operations and operation qualification is attained by a plurality of code selector bridge contacts more fully described hereinafter.

The automatic tabulating card reader earlier mentioned has a physical construction disclosed in the following copending U.S. applications: Edwin O. Blodgett, Ser. No. 431,854, filed Feb. 11, 1965 for "Tabulating Card Reader Card Drive Structure," now U.S. Patent 3,432,644; Edwin O. Blodgett, Ser. No. 431,940, filed Feb. 11, 1965 for "Tabulating Card Reader Program Control Structure," now U.S. Patent 3,407,287; Wilbur C. Ahrns Ser. No. 431,859, filed Feb. 11, 1965 for "Tabulating Card Reader Input Hopper Feed Structure," now U.S. Patent 3,407,293; and Van Buskirk Ser. No. 431,905, filed Feb. 11, 1965 for "Tabulating Card Reader Output Hopper Structure," now U.S. Patent 3,309,081. This reader has an input card hopper which receives a pack of tabulating cards and feeds them successively past a card reading zone to an output card hopper.

The information items recorded in successive indexpoint columns of the tabulating card are successively read at the reading zone either at a relatively lower normal reading rate of approximately 572 codes per minute when the information read from the card is to be used or at a substantially higher or accelerated reading rate of 80 card columns per second when the information read is to be skipped (i.e., not used). The skip operation is applicable to each card column and may be changed from column to column. All reading operations including the skip operation are under program control of a program cylinder which rotates in unison with movement of the card past the reading zone and which provides a program control position corresponding to each of the eighty card columns. The program cylinder enables a total of twelve independent program control functions to be selected by any of four independent programs selectable manually or selectable automatically by a program-selection information item recorded in the first column of each tabulating card. This permits individual program control processing of four different tabulating card formats loaded in intermixed relation into the input card hopper of the reader. The program control cylinder includes twelve replaceable program control function rings each having eighty teeth corresponding to the conventional eighty card columns, and program control is accomplished by removing (or omitting in the fabrication of the ring) a tooth at each card column where control is to be effected. The fact that each or all of these rings may be replaced on the program cylinder enables high flexibility of programmed operations.

Any number of card reader functions to a total of seven may, under control of the twelve available selections afforded by the program control cylinder, be programmed with respect all programs or with respect individual ones of the four selectable programs. Data information read from each card and not skipped is automatically converted to the code form of FIG. 2 and is supplied to the typewriter for document preparation or selective rerecording in a by-product punched-tape or both. Skipping of card recorded information is initiated by reading a skip code by the tabulating card reader and thereafter continues over a selectable number of succeeding card columns under control of the program cylinder so that skipping may be programmed to terminate at any selected column of the tabulating card.

Transfer of read operations from the tabulating card reader to the punched-tape reader of the typewriter may be programmed-controlled to take effect at any card column, and retransfer of reading operations back to the tabulating card reader may be accomplished manually or automatically under program control of the punched-tape reader. Manual and programmed non-print and print-restore operations are available with respect to the operations of the tabulating card reader as in the case of the earlier mentioned Blodgett et al. patent, as are operations of the typewriter under manual or automatic control of information read by the punched-tape reader thereof, there being the difference in the tabulating card reader that any such programmed operation is established by a prevailing program selected on a card by card basis and is under control of the program cylinder.

In addition to the card skip operation earlier mentioned as being effected manually or under programmed card-skip control, the tabulating card reader herein described enables the additional desirable operation of permitting program control skipping of blank columns in the tabulating card, suppression of zone punch recordings in the tabulating card, and the conversion of zeros to a carriage space function with respect to all tabulating card zeros appearing to the left of the first significant digit in a data numeric field.

Arrangement and operation of the overall electrical circuit

Figure 4G:
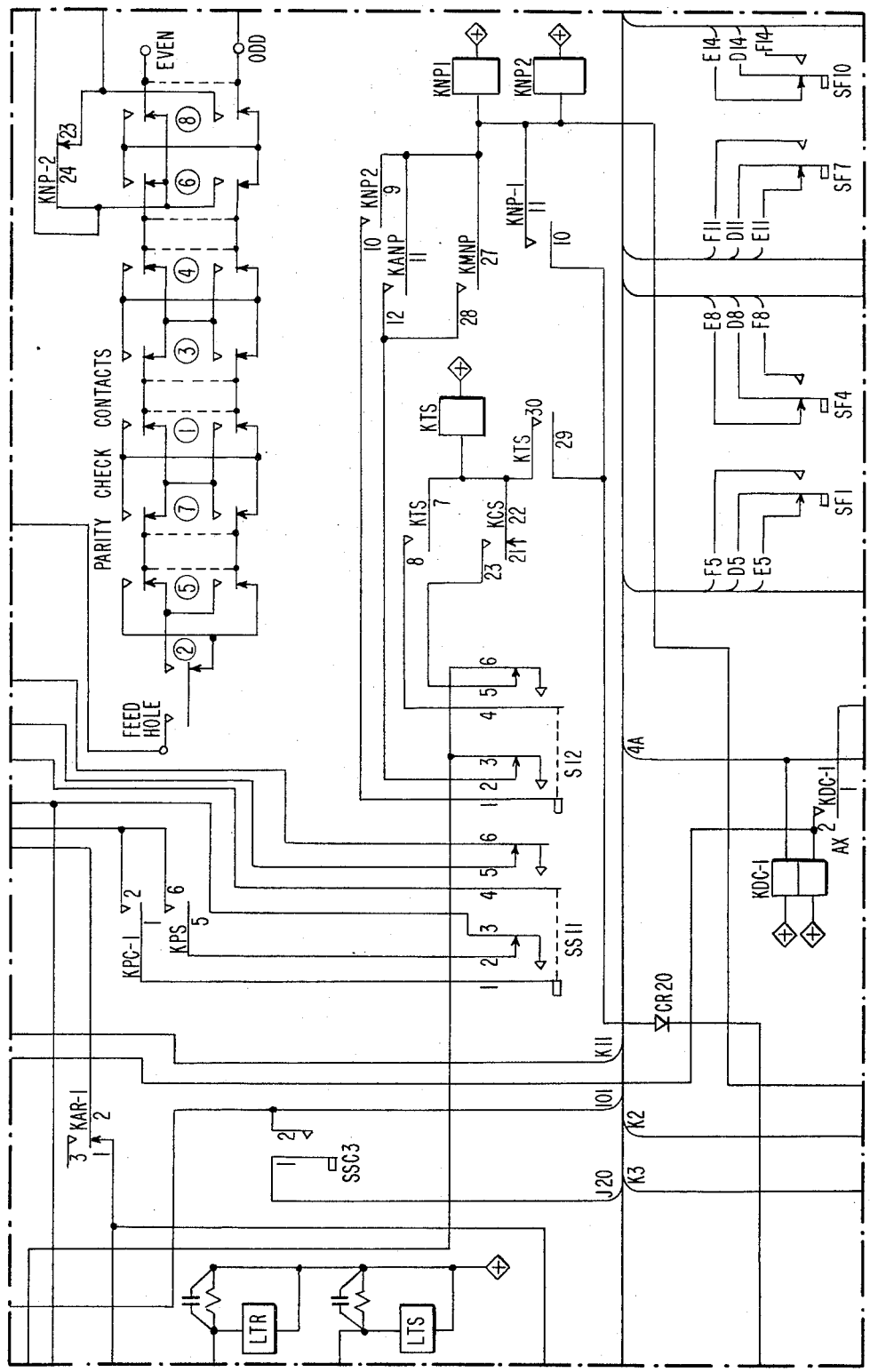
Figure 4H:
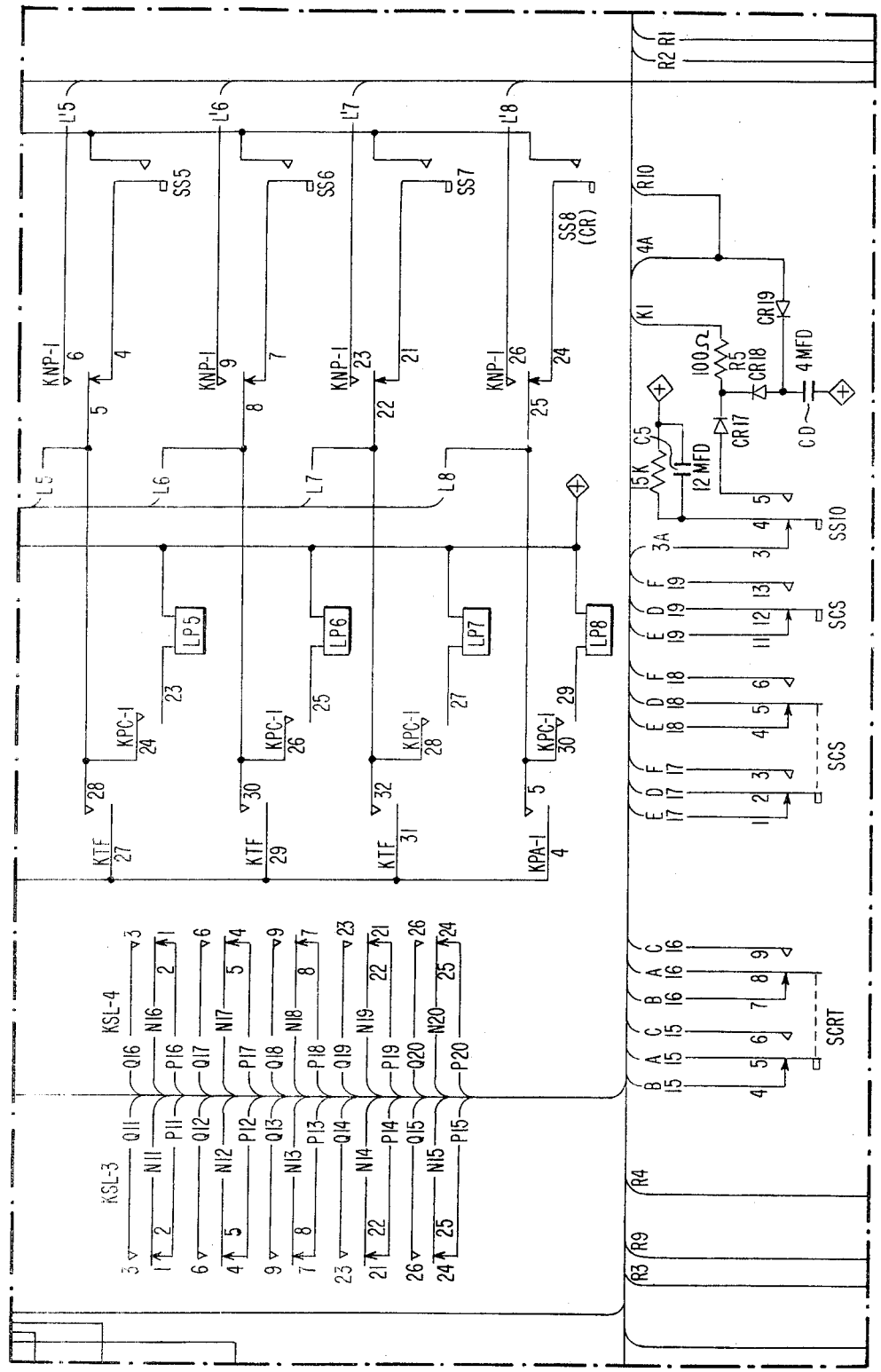
Figure 4I:
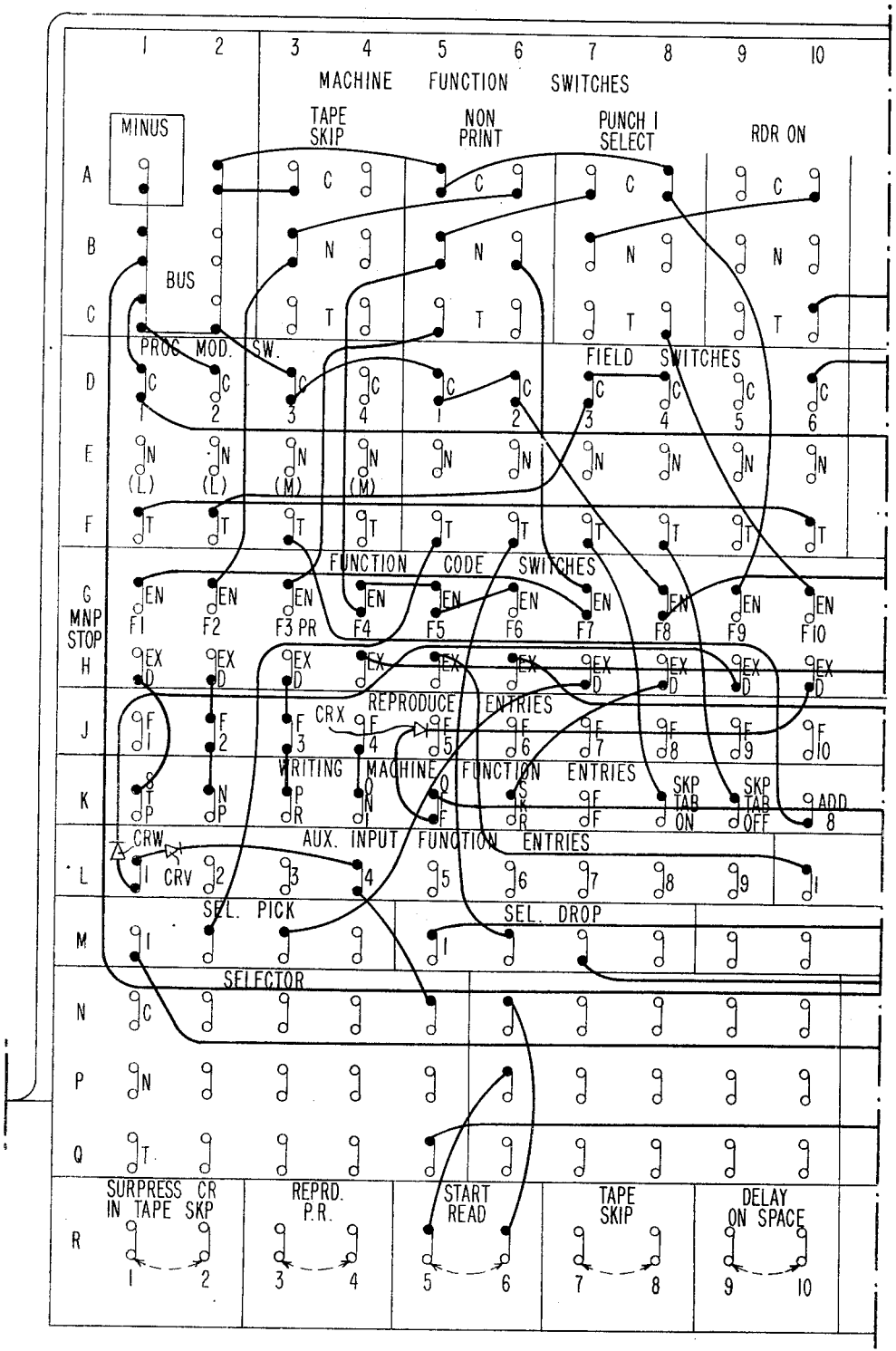
Figure 4J:
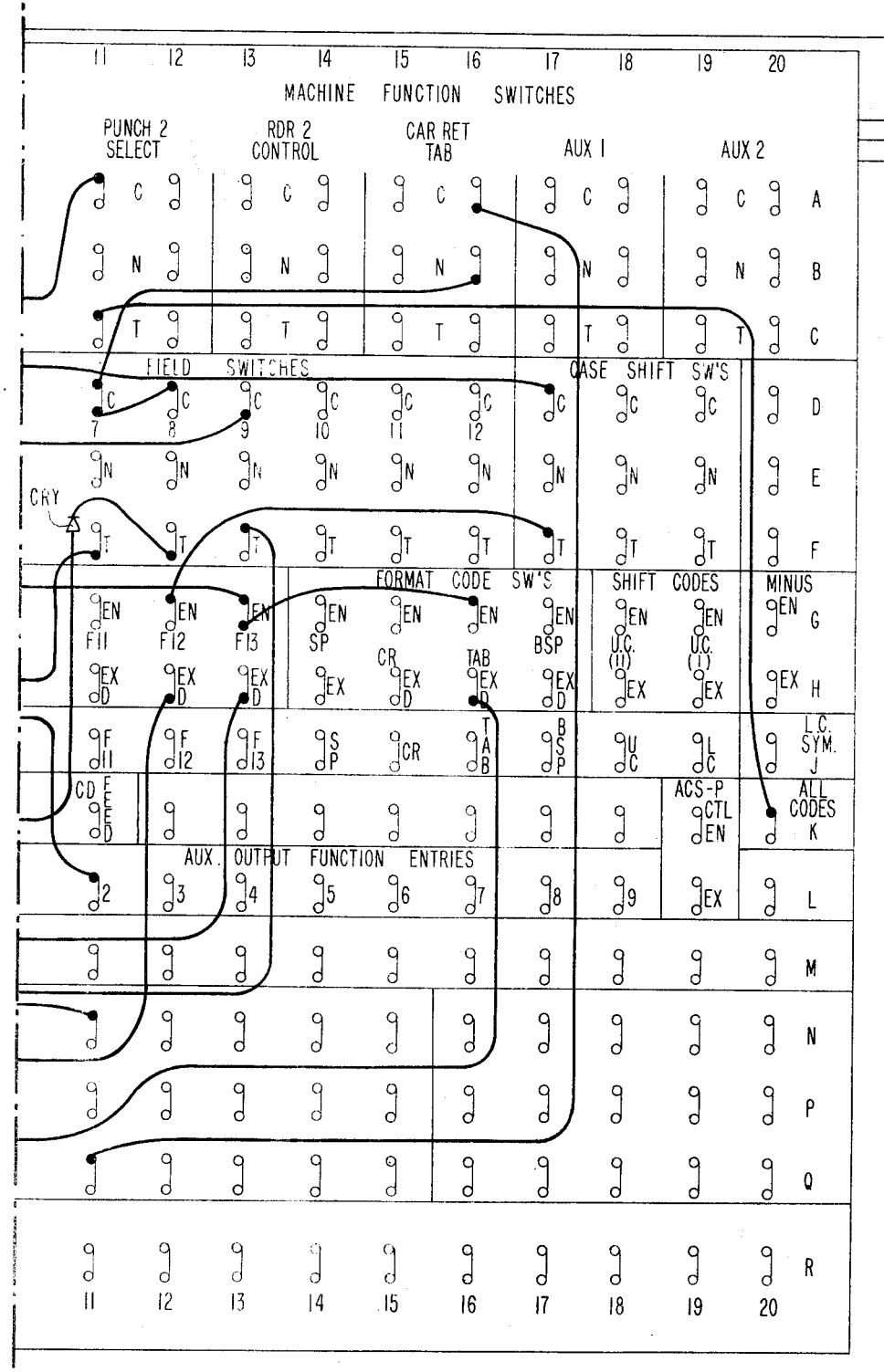
Figure 4K:
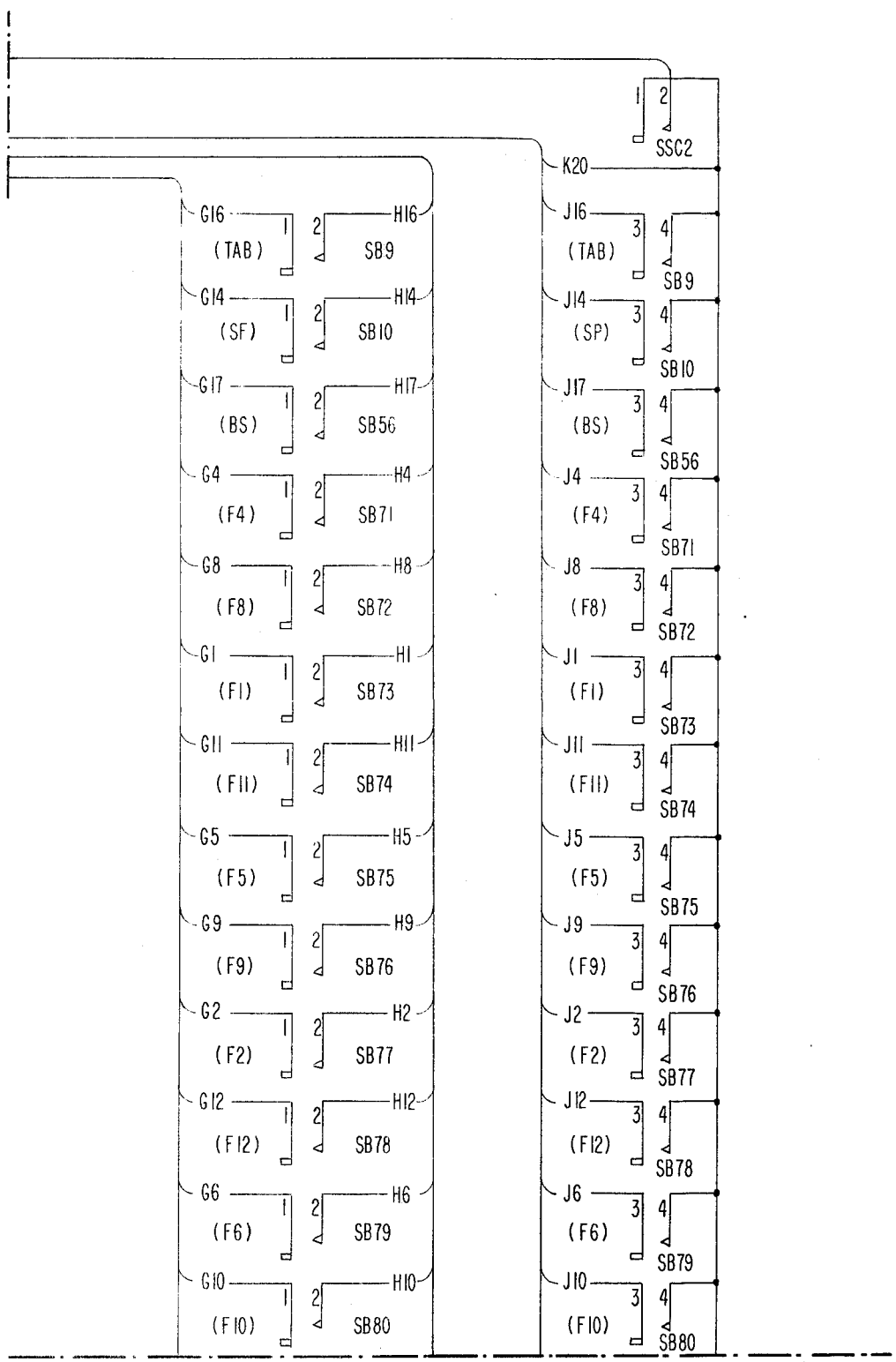
Figure 41:
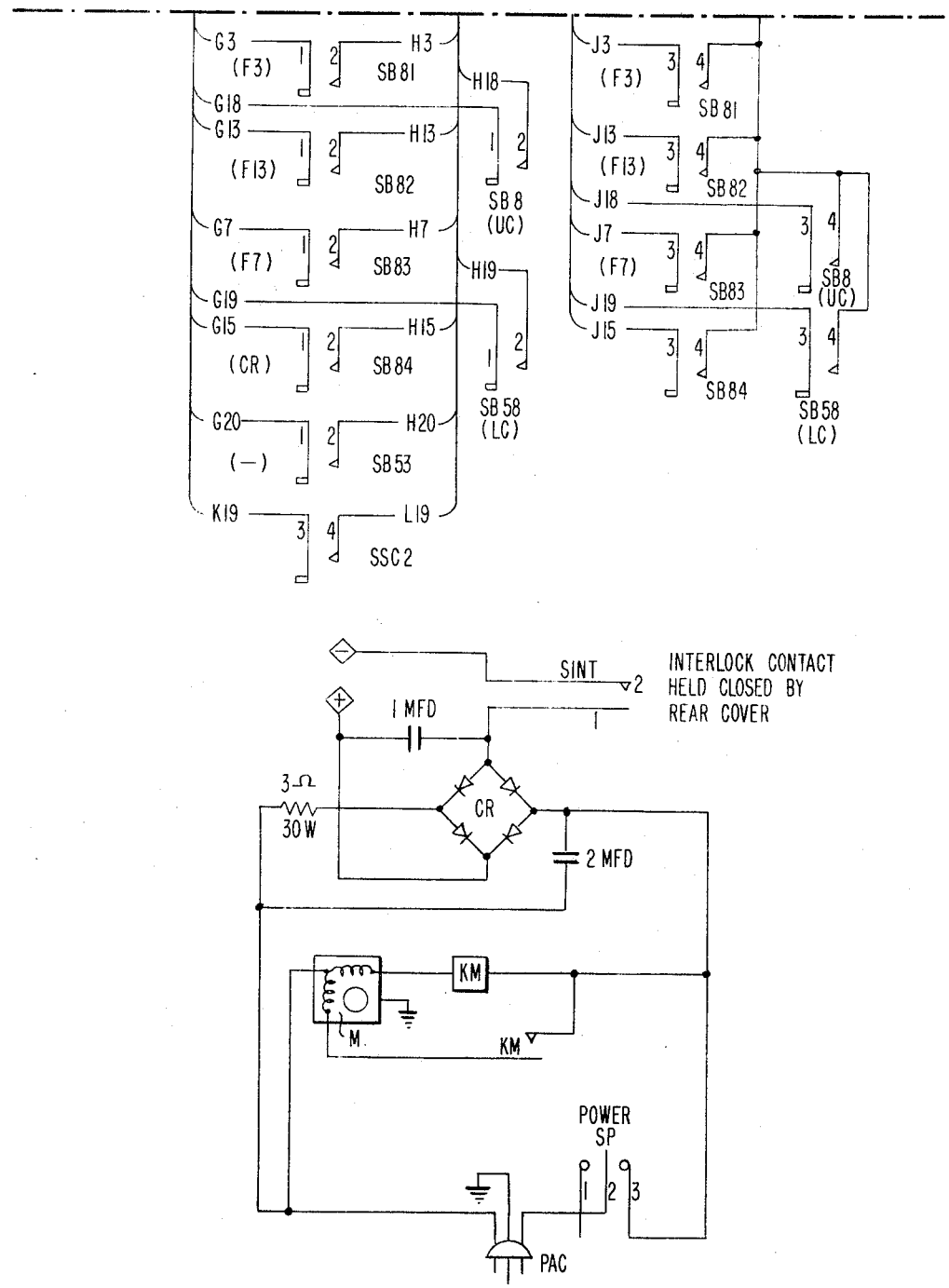
Figure 4M:
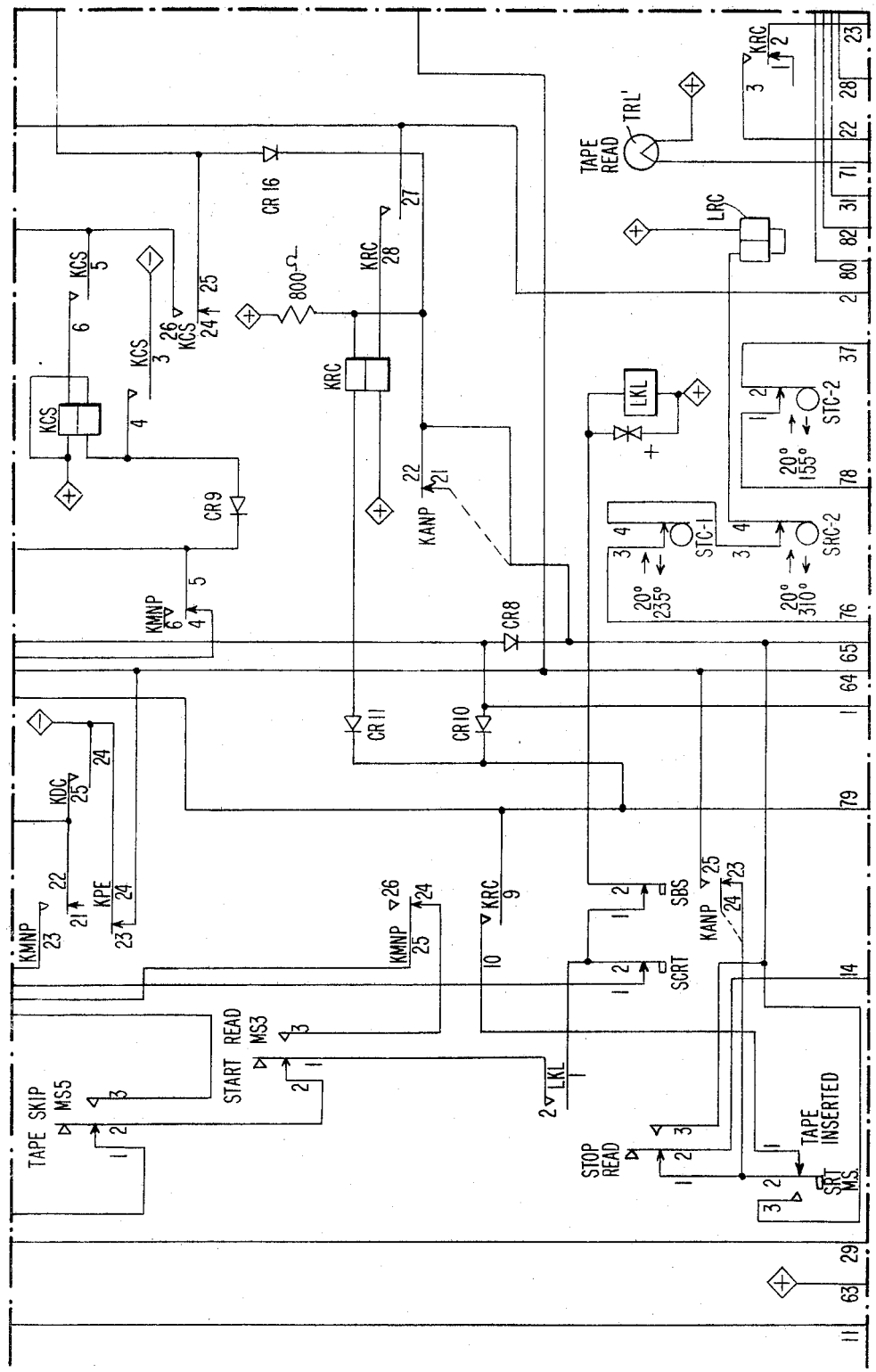
Figure 4N:
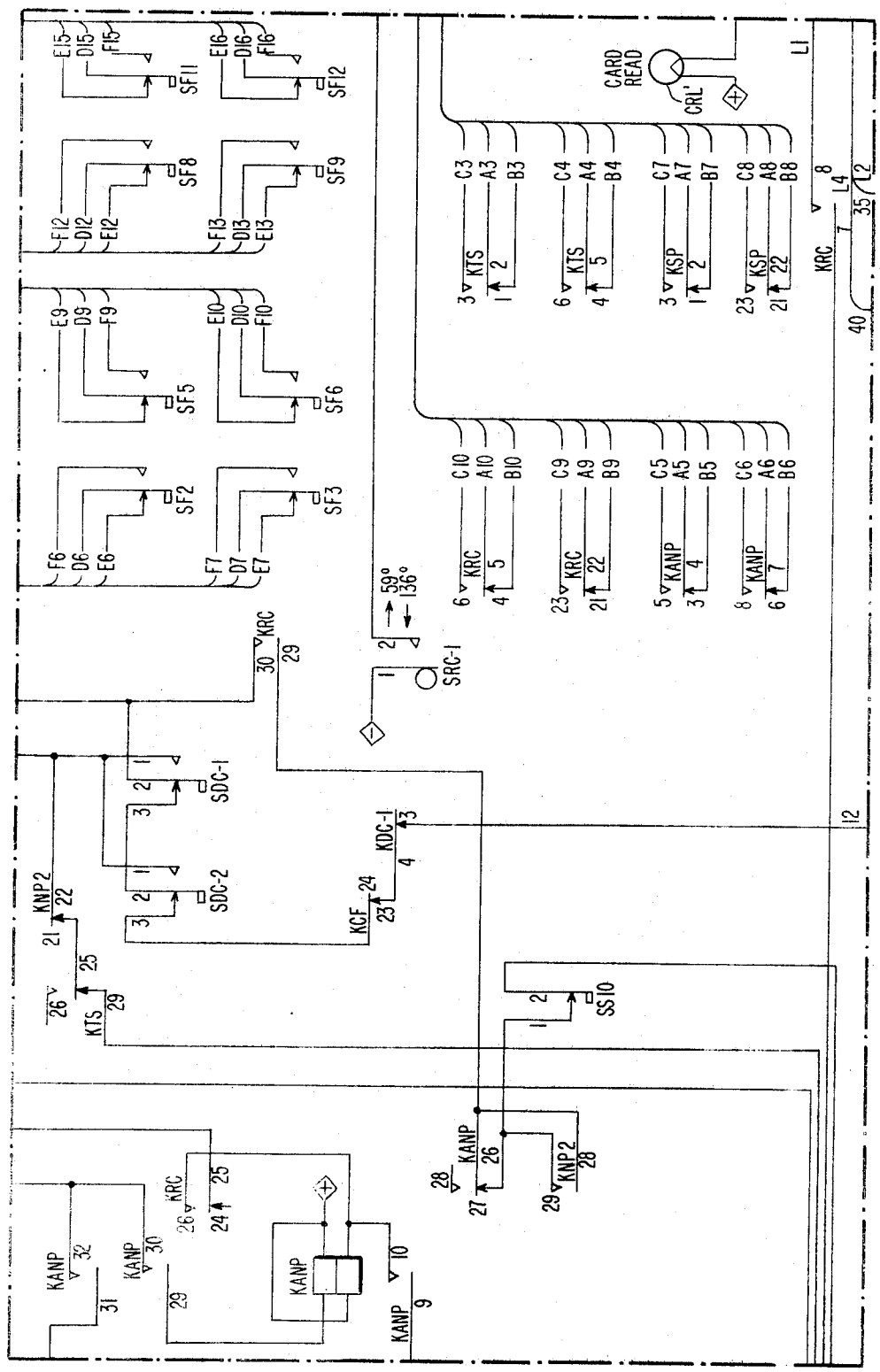
Figure 40:
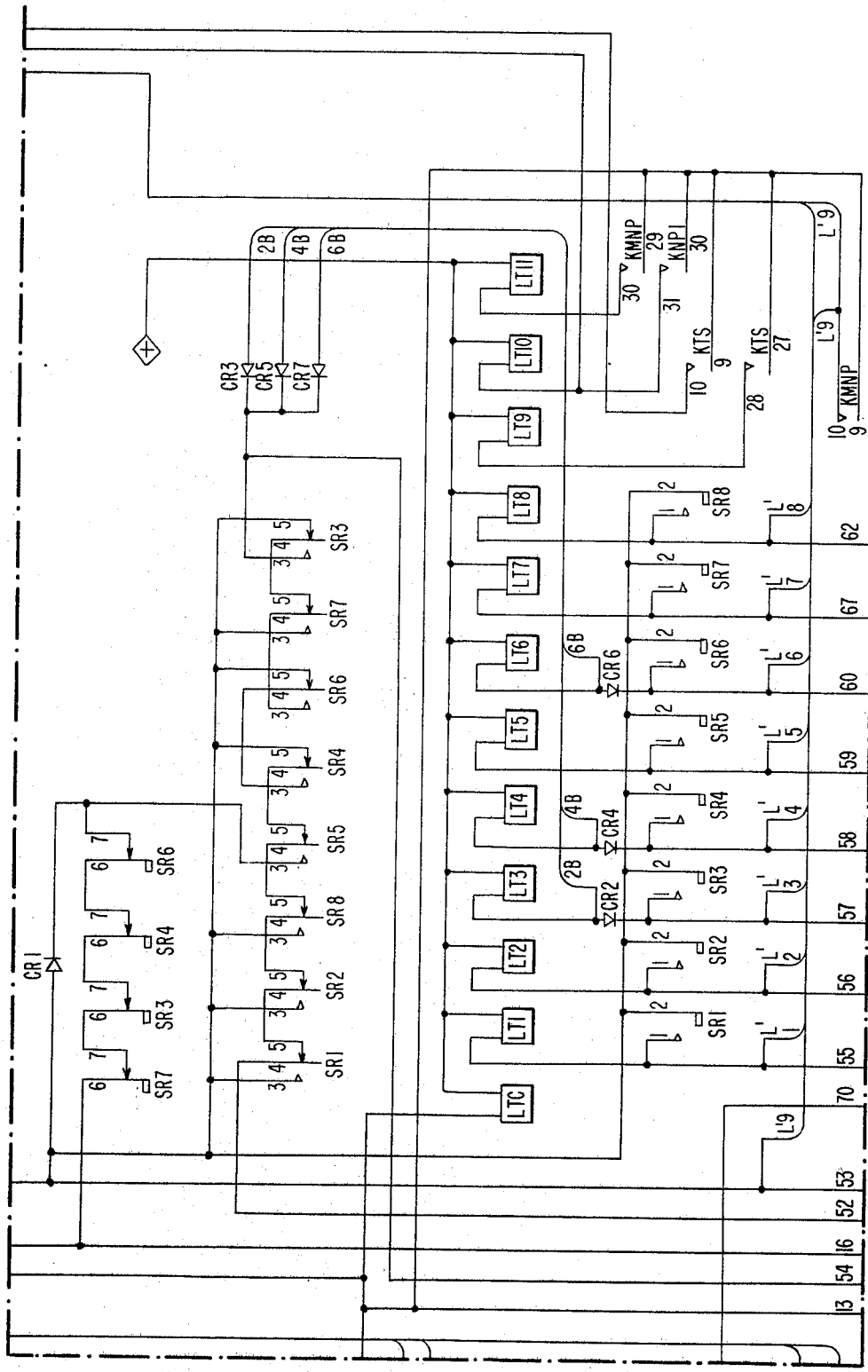
Figure 4P:
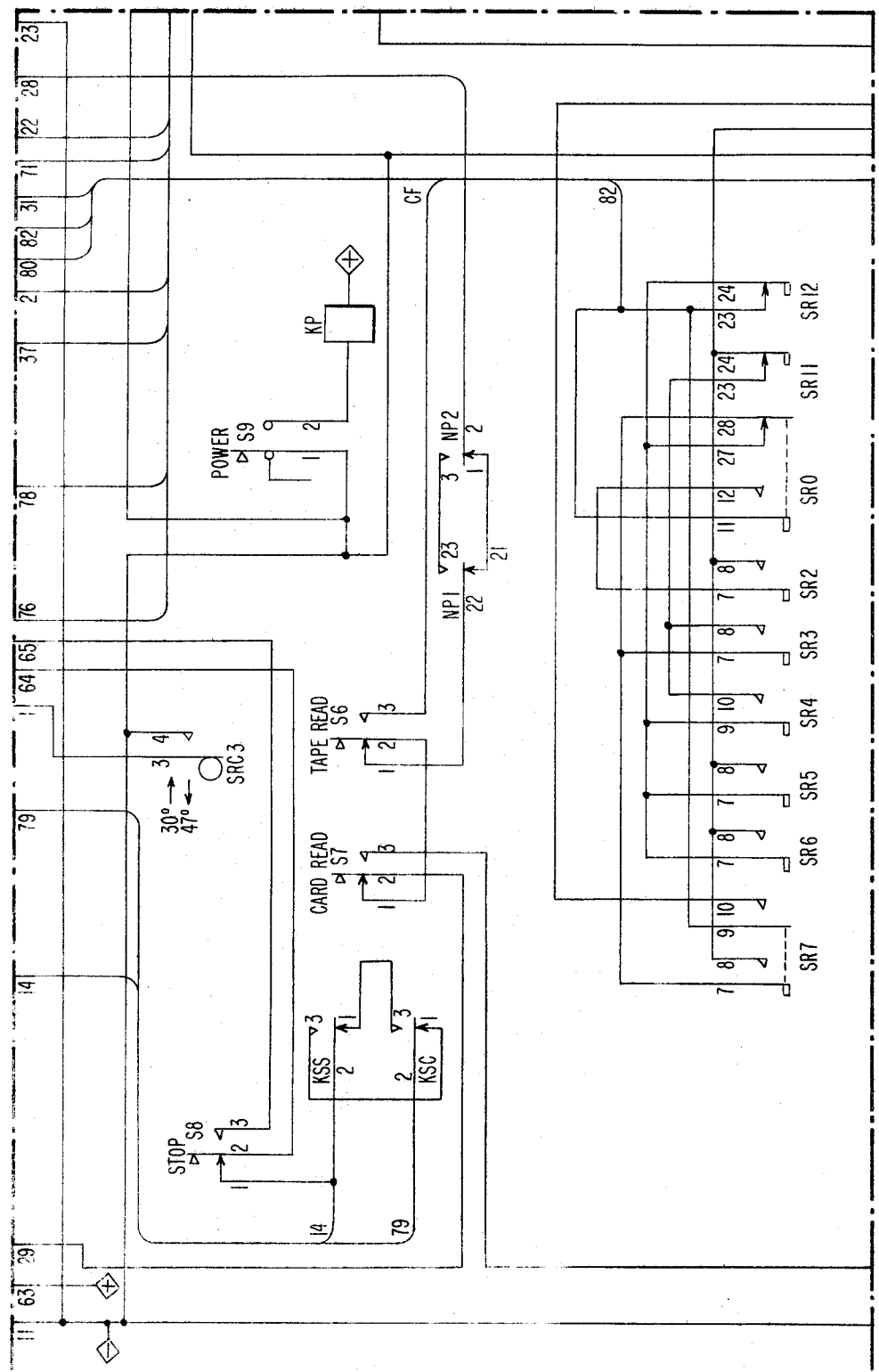
Figure 4Q:
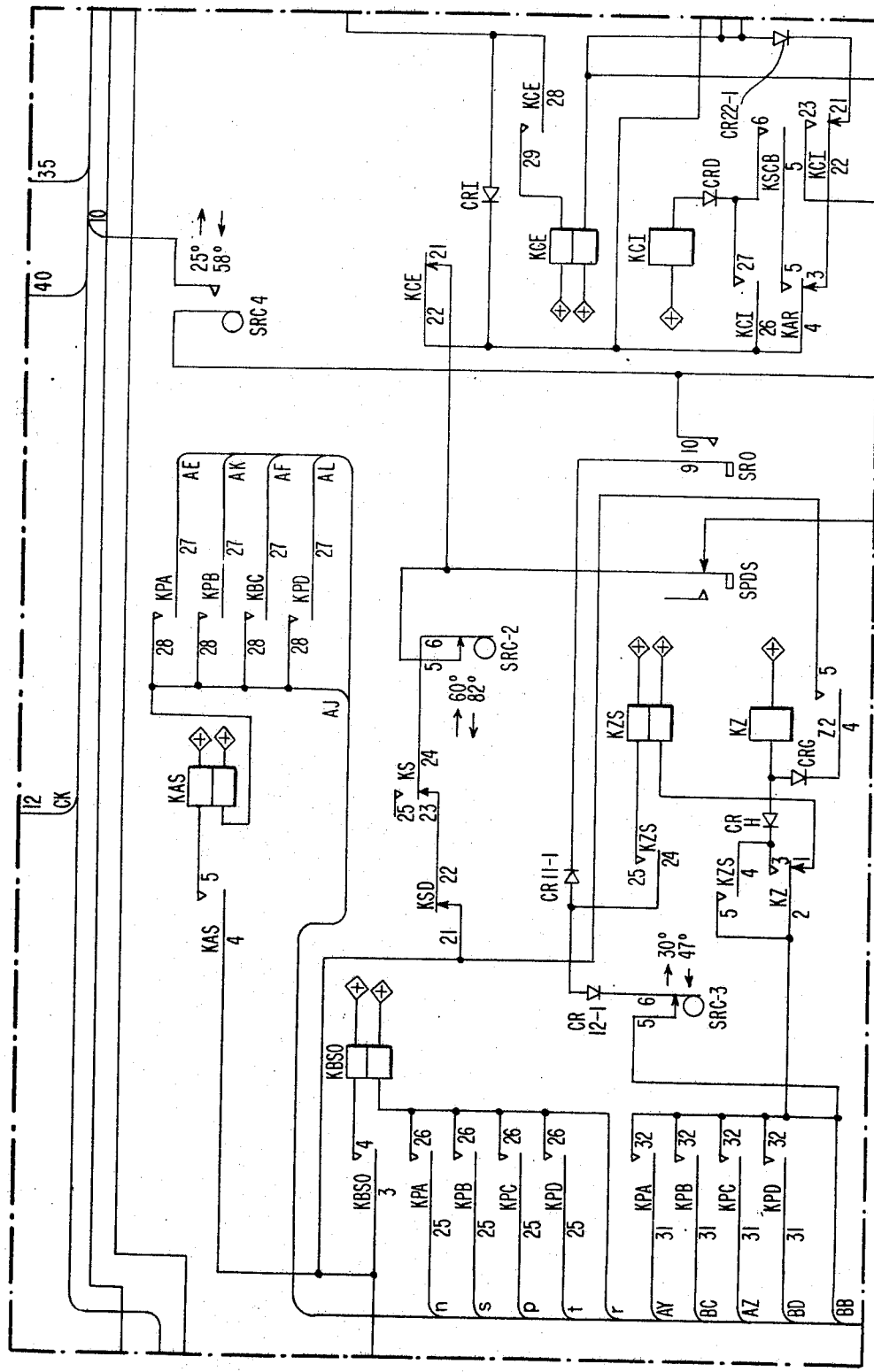
Figure 4R:
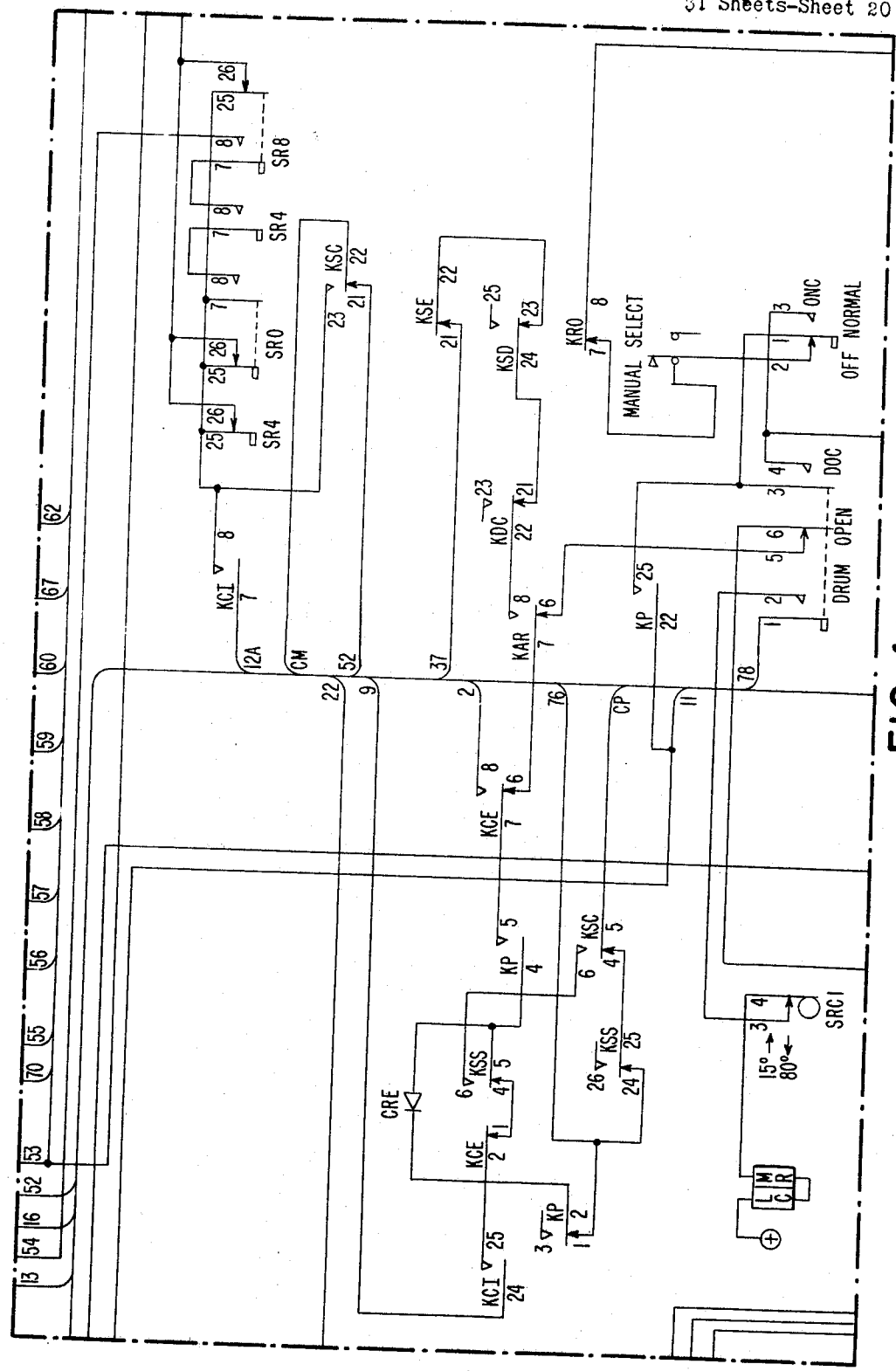
Figure 4S:
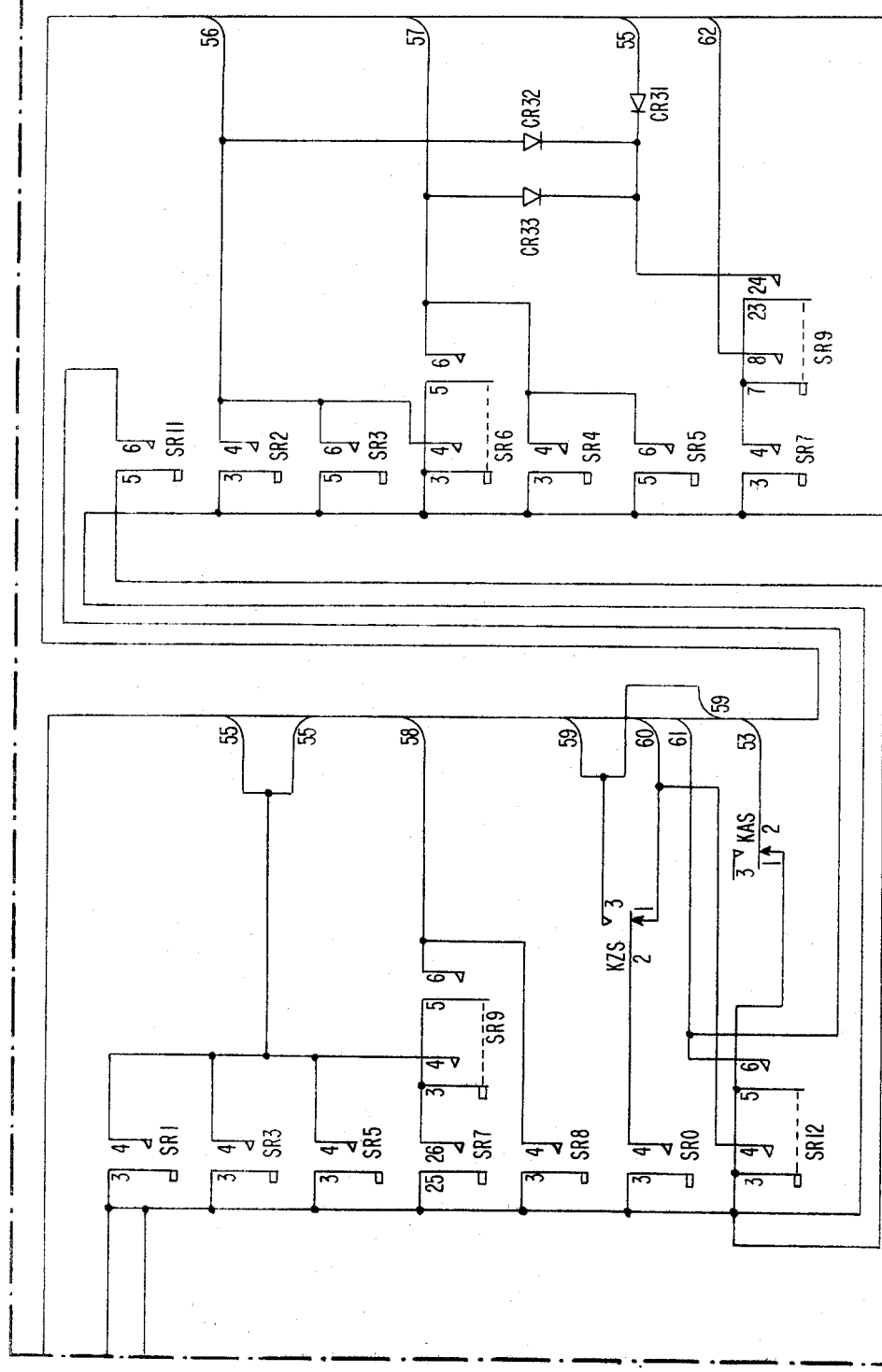
Figure 4F:
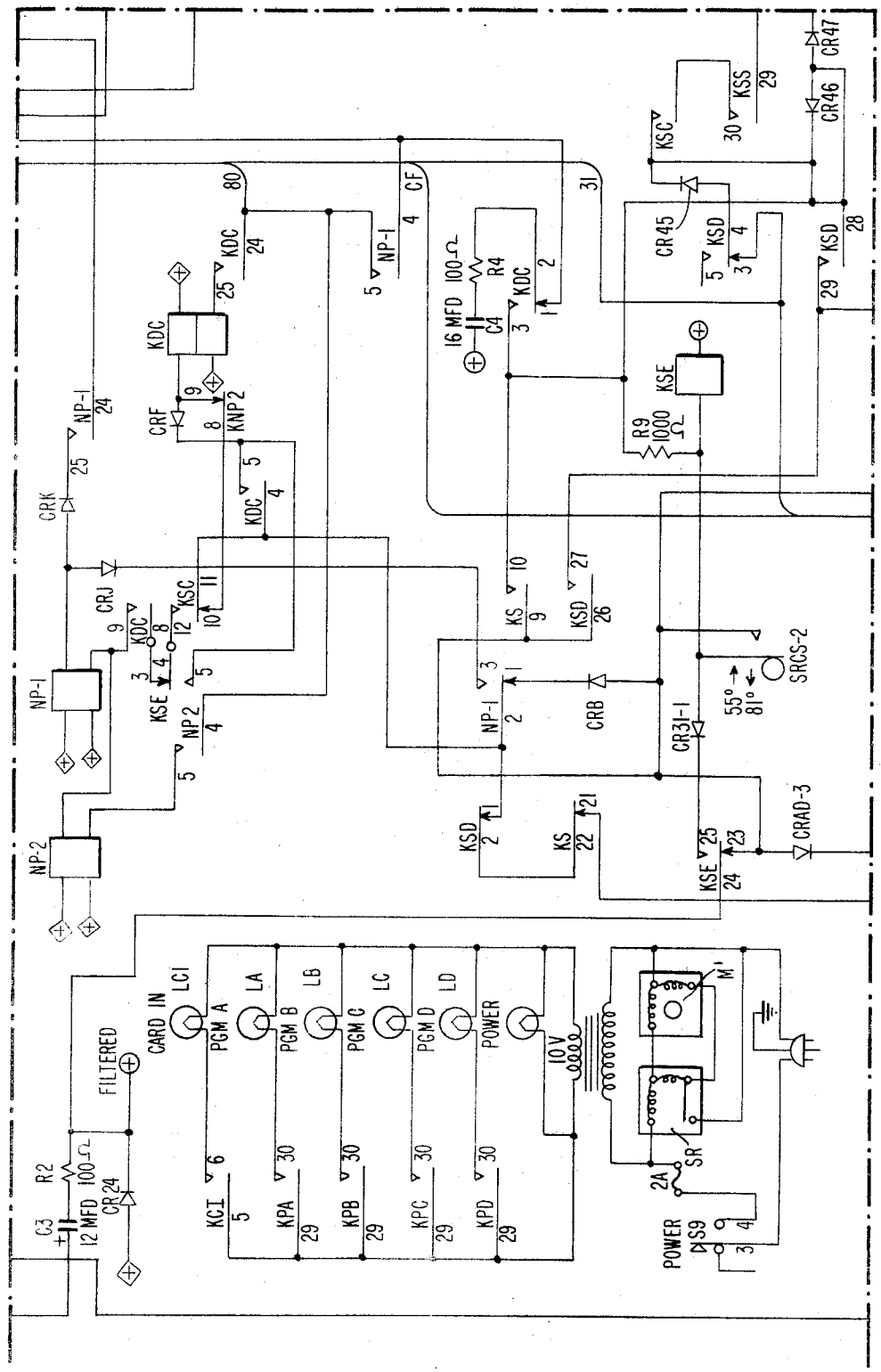
Figure 4U:
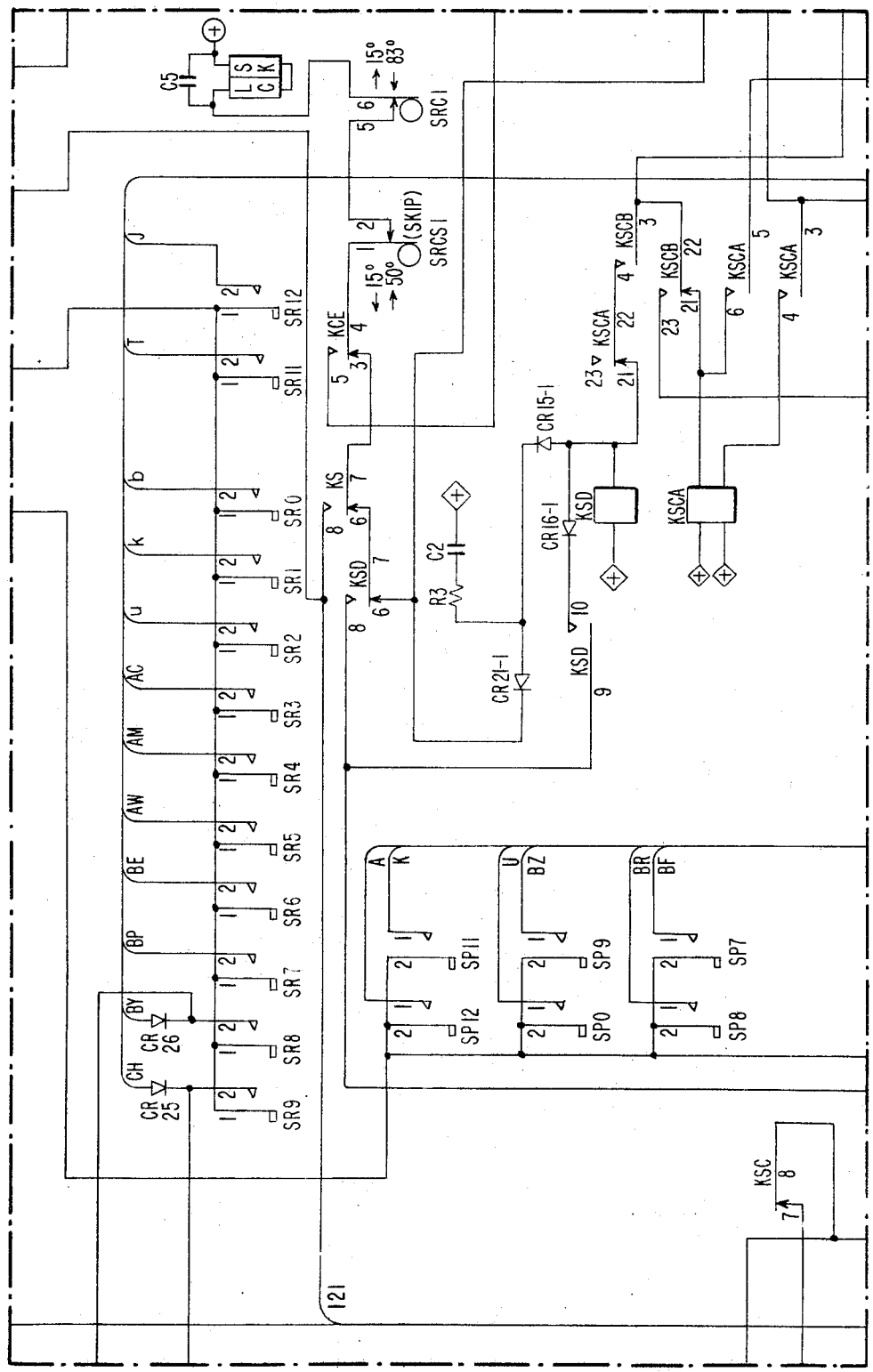
Figure 4V:
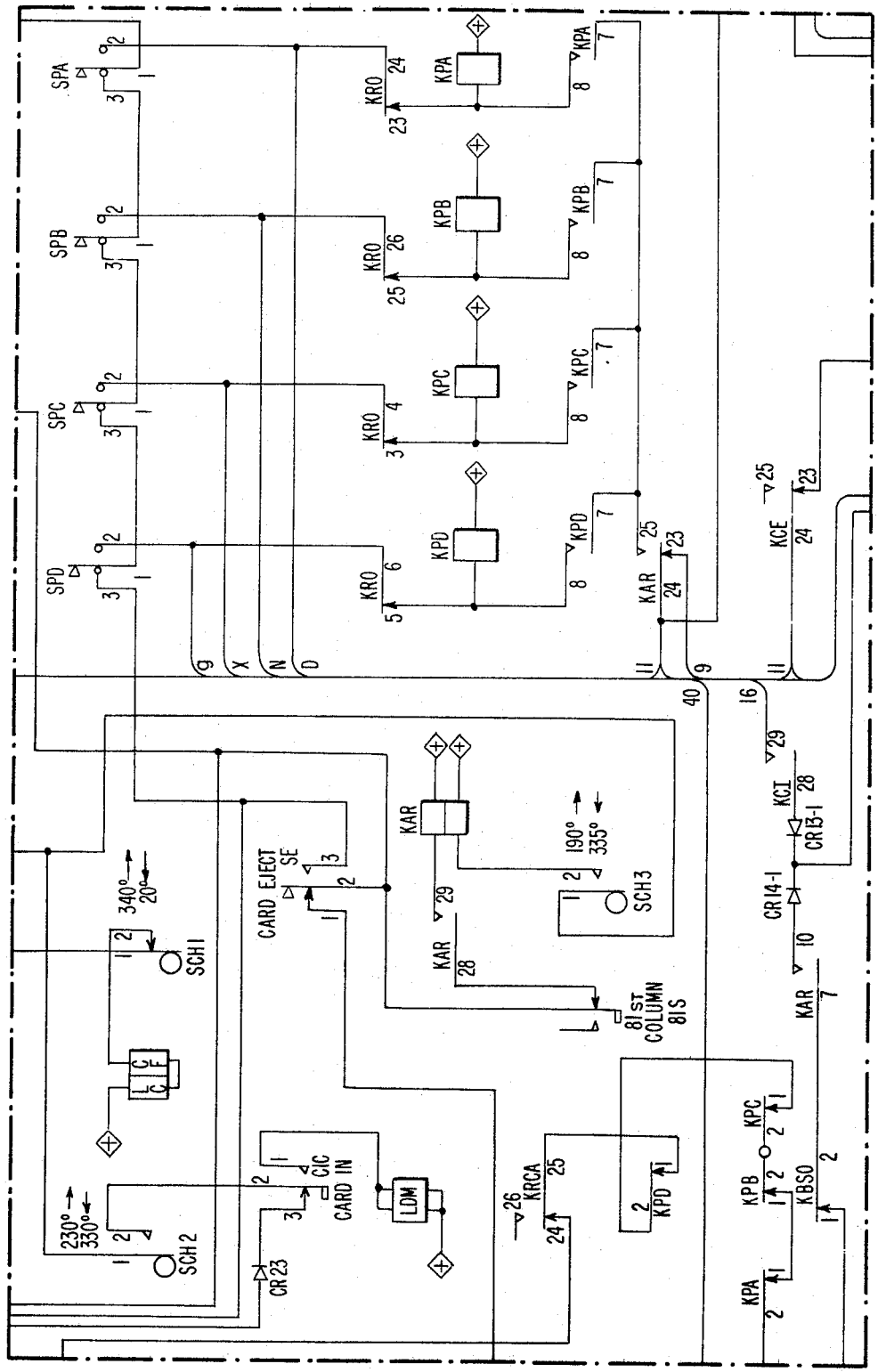
Figure 4W:
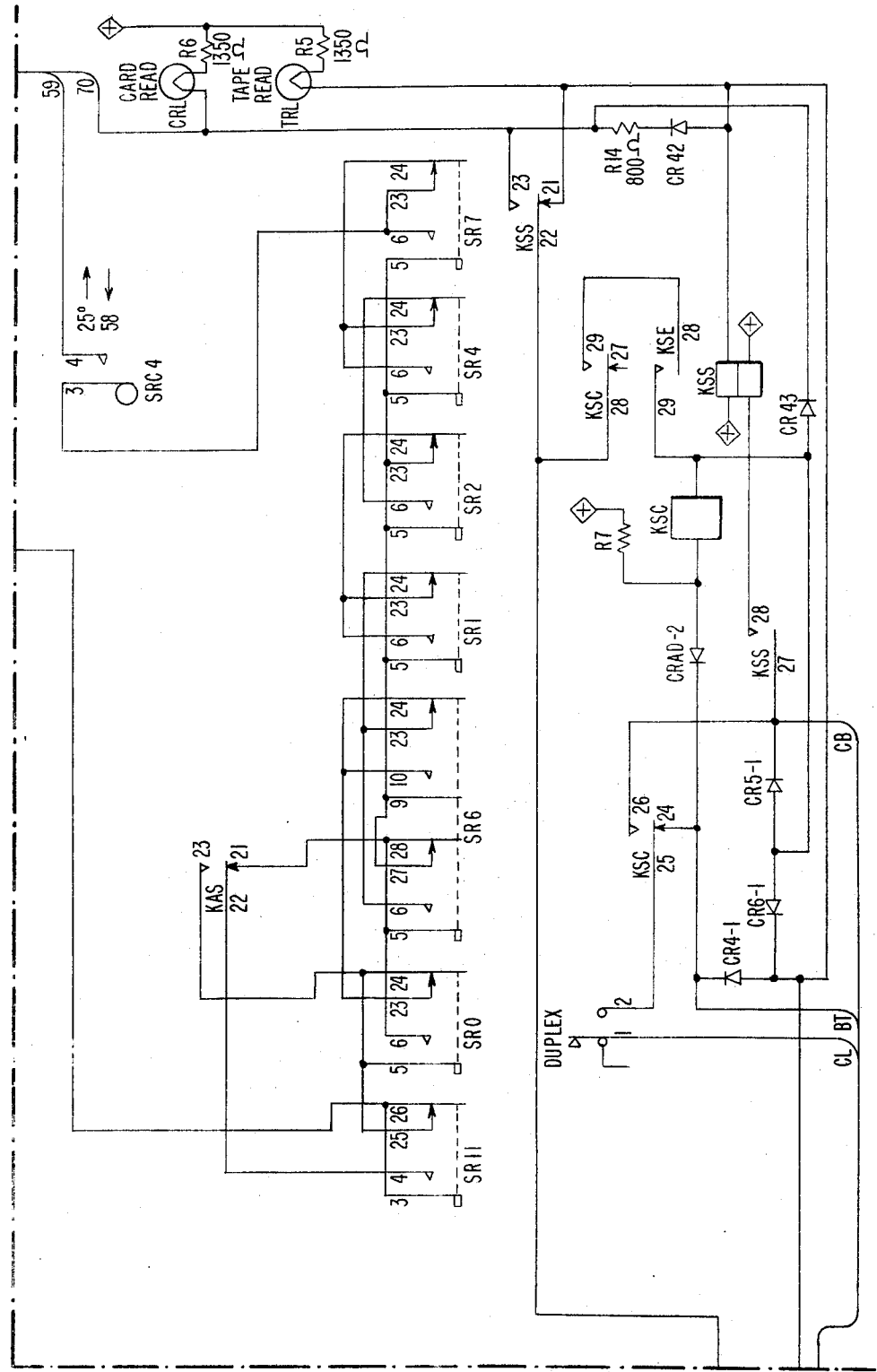
Figure 4X:
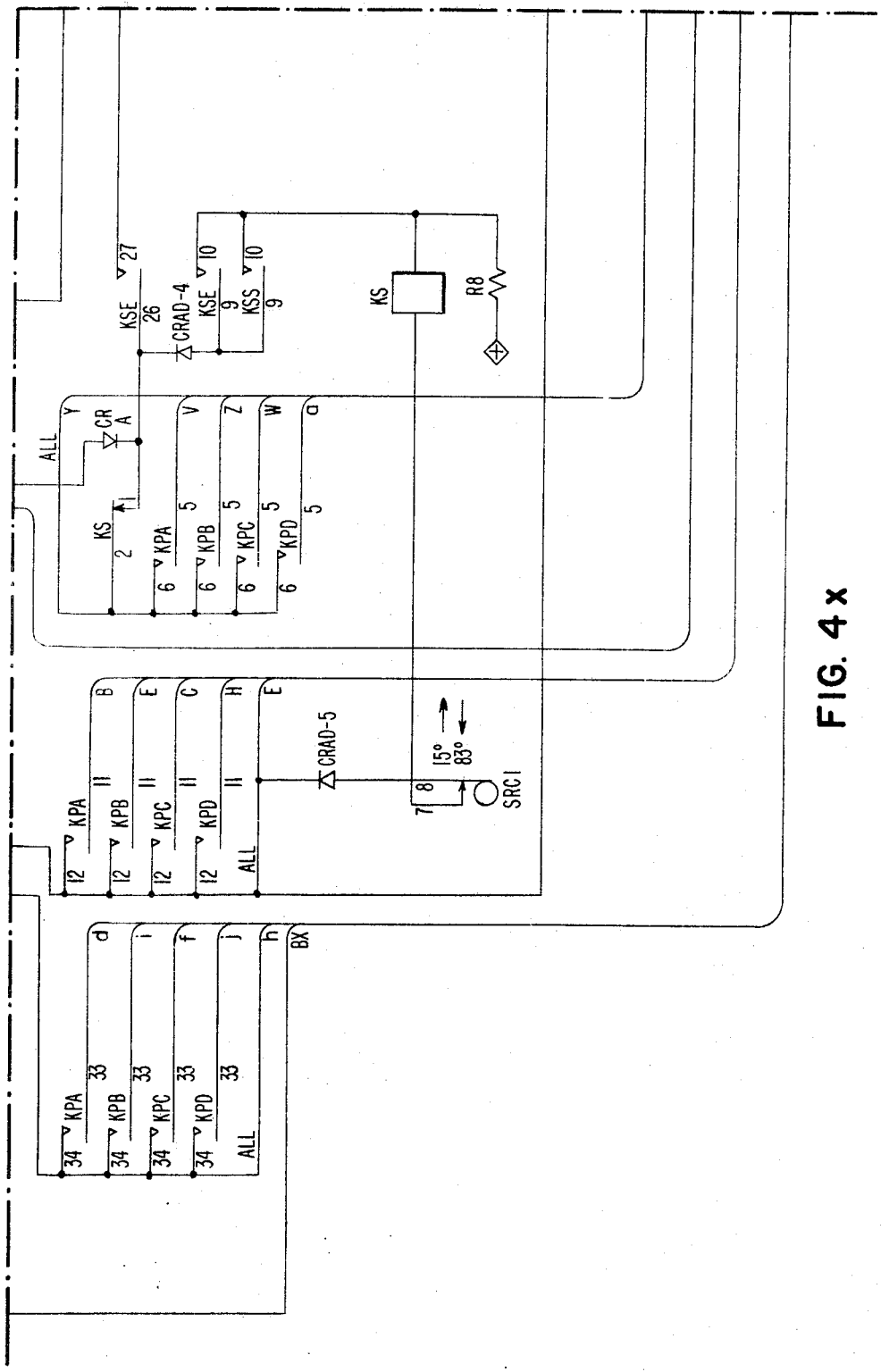
Figure 4Z:
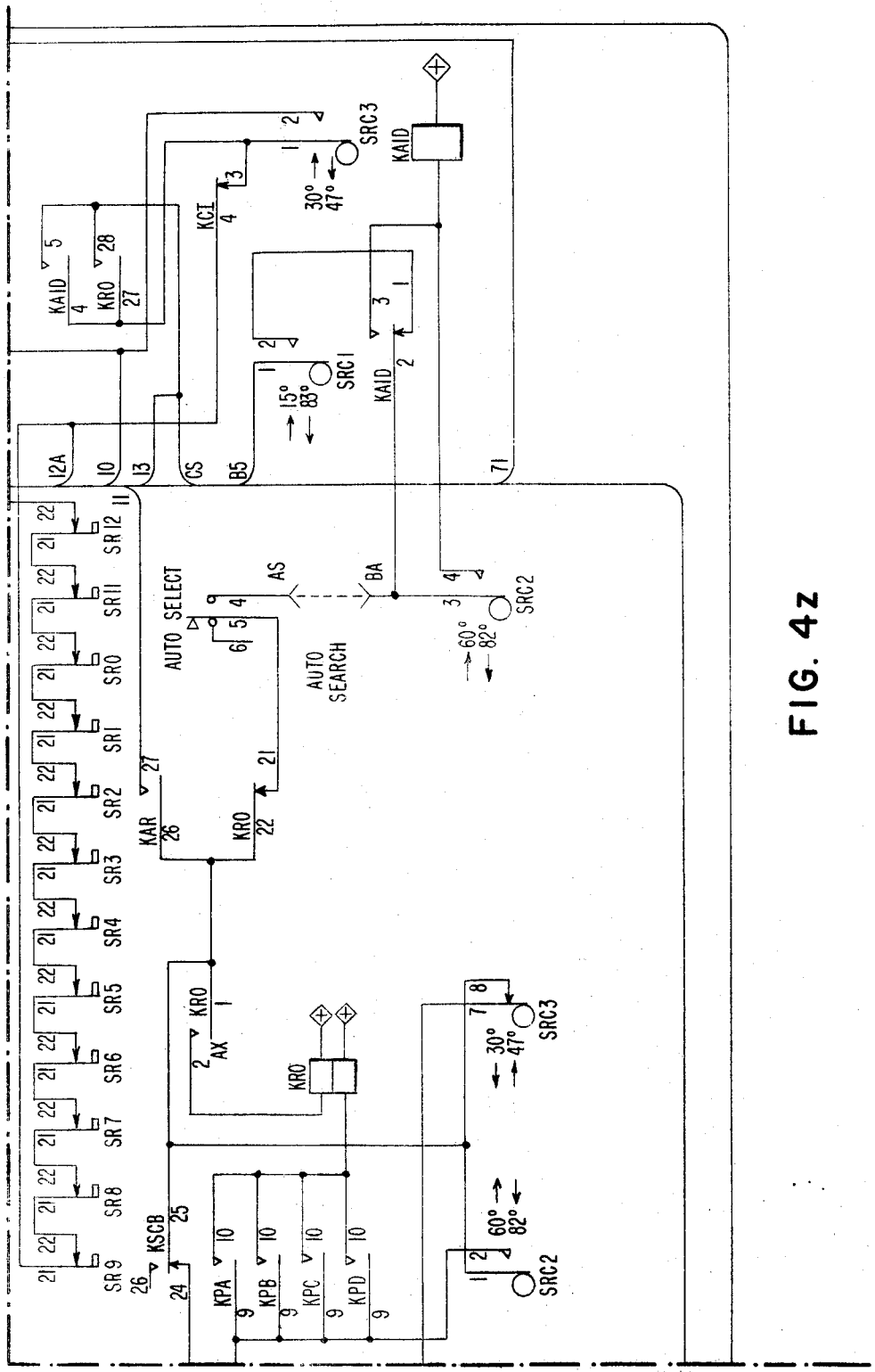
Figure 4A:
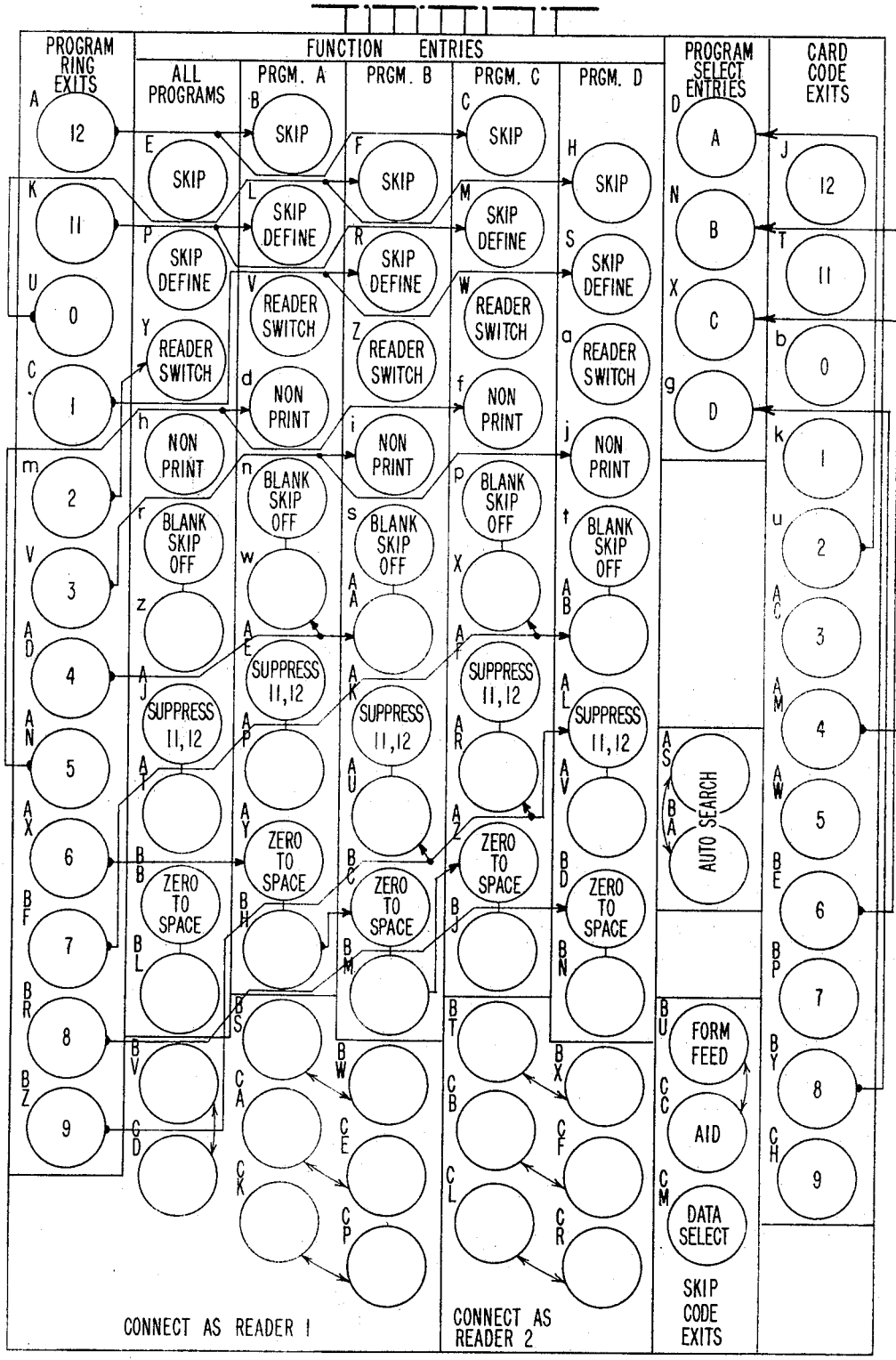

The overall electrical circuit arrangement of the data translation system shown in FIGS. 4a–4aa arranged as in FIG. 4. The electrical circuit of the typewriter unit itself is shown in FIGS. 4a–4o of which FIGS. 4a and 4b relate to an auxiliary tape punch which may be used with and controlled by the typewriter, and that of the automatic tabulating card reader is shown in FIGS. 4p–4aa. To facilitate the description of the composite electrical system, the electrical circuit arrangement of the typewriter will first be considered in conjunction with that of the auxiliary tape punch and under the assumption that the automatic tabulating card reader is manually controlled to be in non-operative condition. This description will be followed by consideration of the electrical circuit arrangement of the automatic tabulating card reader and the electrical intercontrol between this reader and the typewriter.

In considering the arrangement and operation of the electrical circuit employed in the typewriter and its associated auxiliary tape punch, it may be pointed out at the outset that the typewriter electrical circuit is quite similar to that shown and described in the above-mentioned Blodgett et al. patent and accordingly consideration will be given herein only to those differences which distinguish the present typewriter electrical circuit and its operation from that disclosed in the Blodgett et al. patent.

The typewriter includes a power switch SP (FIG. 4l) which may be manually operated to close its contacts 2 and 3 and thereby energize the conventional power drive motor M of the typewriter through a starting relay KM operating in conventional manner. The power switch SP also energizes a diode rectifier bridge CR which converts the alternating current of the power source in unidirectional current for relay and control energization of the typewriter, auxiliary tape punch and automatic card reader.

A tape or edge-punched tabulating card punch (the term "tape punch" being used hereinafter for convenience as designating either of these types of punches) is constructed as an integral unit of the typewriter, and an auxiliary tape punch (FIGS. 4a and 4b) is also used as in the aforementioned Blodgett patent. Either or both tape punches are individually or concurrently rendered operative to record portions or all of the data and functional control information used in the substance and format of document preparation by the typewriter. The typewriter and its integral tape punch are placed in readiness for operation by manual actuation of a tape feed switch S1 (FIG. 4c) to close its contacts 1 and 2 and thereby energize a tape feed relay KTF (FIG. 4d), which remains energized so long as the tape feed switch is manually actuated. The energizing circuit for the relay KTF extends through the now closed contacts 1 and 2 of the switch S1, the normally closed contacts 1 and 2 of the auxiliary punch tape feed relay KTF', the normally closed contacts 1 and 2 of a card feed microswitch SCF (which in normal position senses the absence of a tabulating card in the reader of the typewriter), and the normally closed contacts 1 and 2 of a card feed relay KCF to the relay KTF. Energization of the tape feed relay KTF energizes a punch control relay KPC–1 through the now closed contacts 11 and 12 of the relay KTF and normally closed contacts 4 and 5 of KTF', and also energizes the clutch magnet LPC (FIG. 4e) of the integral tape punch through the now closed contacts 3 and 4 of the punch control relay KPC–1, the normally closed contacts 4 and 5 of a non-print relay KNP–2 and the normally closed contacts 1 and 2 of the latter relay, the normally closed contacts 3 and 4 of a punch error relay KPE, the normally closed contacts 4 and 5 of an anti-repeat relay KAR–1, normally closed contacts 1 and 2 of punch latch contacts SPL' and SPL in series, and now closed contacts 9 and 10 of tape feed relay KTF. Energization of the punch clutch magnet LPC through the circuit just traced causes the tape punch repetitively to record delete codes 1-2-3-4-5-6-7 by energization of the punch magnets LP1–LP7 (FIGS. 4e and 4h) each of which operate in series with an individual pair of now closed contacts on relays KPC–1 and KTF from the energizing circuit of the punch clutch magnet LPC last described. After manual release of the tape feed switch S1, the tape feed relay KTF is maintained energized into the initial portion of any punch cycle initiated before release of the switch S1; this holding circuit is traced through the normally closed contacts 1 and 2 of the relay KCF, the now closed contacts 7 and 8 of the relay KTF, the diode rectifier CR13, the normally closed contacts 1 and 2 of the auxiliary punch latch contacts SPL', the normally closed contacts 1 and 2 of the integral punch latch contacts SPL (which do not open until after initiation of a punch cycle of operation) and the now closed contacts 9 and 10 of the relay KTF. Each such punch cycle energizes an anti-repeat relay KAR–1 (FIG. 4c) when the normally open contacts 2 and 3 of the punch latch contacts SPL close during the punch cycle and the normally open contacts 1 and 2 of the code selector common contacts SSC1 also close during a punch cycle. The relay KAR–1 opens its contacts 4 and 5 to interrupt the earlier described energizing circuit of the integral punch clutch magnet LPC and punch magnets LP1–LP7, and the relay KAR–1 remains energized during closure of the selector common contacts SSC1 through the now closed contacts 7 and 8 of the relay KAR–1 and the normally closed contacts 3 and 4 of the relay KTF when these contacts again close upon the deenergization of this relay (this hold energizing circuit includes the normally closed contacts 1 and 2 of a punch error relay KPE and the normally closed contacts 8 and 9 of the relay KCF to the now closed contacts 1 and 2 of the selector common contacts SSC1) so that the relay KAR–1 thus remains energized to near the end of the punch cycle.

The auxiliary tape punch is similarly placed into operation by manual operation of a power switch SP' (FIG. 4a) to close its contact pairs 1–3 and 4–6 (FIG. 4b) of which the latter contact pair energizes a take-up motor M' and a punch drive motor M" through a starting relay KM'. Manual actuation of a tape feed switch S1' energizes a tape feed relay KTF', and the contacts 24 and 25 of the latter close with its contacts 7 and 8 to energize a punch control relay KPC'. The energizing circuit for the relay KTF' is from positive potential through the relay winding, now closed contacts 4 and 6 of tape feed switch S1', now closed contacts 1 and 3 of power switch SP', normally closed contacts 1 and 2 of relay KTF, normally closed contacts 3 and 4 of relay KCF, and normally closed contacts 2 and 3 of tape feed switch S1 to negative potential. Contacts 7 and 8 of relay KTF' close to hold relay KTF' energized under control of the manually operated tape feed switch S1'. The energizing and holding circuit of tape feed relay KTF' is extended through the now closed contacts 26 and 27 of the latter to energize the tape feed relay KTF through the normally closed contacts 1 and 2 of the relay KCF. The now closed contacts 9 and 10 of the relay KTF supply negative energizing power through the normally closed contacts 1 and 2 of the punch latch contacts SPL, the normally closed contacts 1 and 2 of the punch latch contacts SPL' of the auxiliary punch unit, the normally closed contacts 4 and 5 of the relay KAR–1, the normally closed contacts 3 and 4 of the relay KPE, the normally closed contacts 1–2 and 3–4 of the non-print relay KNP–2, and the now closed contacts 1 and 2 of the punch control relay KPC' to the punch clutch magnet LPC' of the auxiliary tape punch; the energizing circuit last traced is also extended through the now closed contacts 5 and 6 and 23–32 of the relay KTF to energize the auxiliary punch magnets LP1'–LP7' through the now closed contacts 3–10 and 21–26 of the punch control relay KPC' to cause the auxiliary punch unit to punch repetitive delete codes 1–2–3–4–5–6–7 so long as the tape feed switch S1' remains manually actuated to retain the relay KTF' energized through its now closed hold contacts 7 and 8.

The integral tape punch may be operated to record all data and functional control information of the typewriter by manually operating a toggle switch S2 (FIG. 4c) to its "ALL" position (where the switch remains with its contacts 1 and 2 closed) to provide continuous energization of the punch control relay KPC–1 and to energize a No. 1 punch indicator lamp L to indicate the operative state of the integral punch unit. The auxiliary punch unit may similarly be operated to record all data and functional control information of the typewriter by manual operation of a toggle switch S2' (FIG. 4a) to its "ALL" position (where it remains) to provide continuous energization of the punch control relay KPC' and concurrent energization of a No. 2 punch indicator light L' (FIG. 4c) indicating the operative state of the auxiliary punch unit.

The integral punch unit may be manually controlled to record only selected data and functional control information. This is accomplished by manually operating the punch select switch S2 to its "select" position where it will remain with its contacts 3 and 4 closed to energize a select punch relay KSP. The now closed contacts 4 and 5 of the relay KSP enable energization of a punch select relay KPS through a diode rectifier CR22 from the plugboard terminal K4 as, for example, by manual or automatic operation of the function key F4 to supply negative energization to the terminal K4 (FIG. 4i) through the qualifying contacts A5 and B5 of the automatic non-print relay KANP (normally closed contacts 3 and 4 of the latter as shown in FIG. 4n) so that punch selection is accomplished in this example only during the absence of an automatic non-print operation. This energized circuit may be extended to plugboard terminal J4 to effect a punched tape recording of the function key F4 operation. The select punch relay KPS may also be turned ON, by way of a further example shown in FIGS. 4i and 4j, by supplying negative energization to the plugboard terminal K4 through the transferred contacts of a field switch SF7 (plugboard terminals D11 and F11), the normally closed contacts 7 and 8 of the carriage return and tabulating contacts SCRT (FIG. 4h plugboard terminals A16 and B16 of FIG. 4j), and the transferred contacts 2 and 3 of the selector relay KSL3 (FIG. 4h and plugboard terminals N11 and Q11 of FIG. 4j) whenever the latter relay is energized. Energization of this relay is shown by way of example as accomplished by negative energization applied to its energizing terminal M3 upon operation of a function key F7 (plugboard terminals G7 and H7) qualified by the non-operative state of the automatic non-print relay KANP (its normally closed terminals 6 and 7, plugboard terminals A6 and B6) and further qualified by the non-energized state of the tape skip relay KTS (its normally closed contacts 1 and 2 of FIG. 4n and plugboard terminals A3 and B3 of FIG. 4i). The select relay KSL3 is shown as being deenergized in response to a transfer of field selection switch SF9 to complete an electrical circuit between the plugboard terminals D13 and F13, thus applying energization through plugboard terminal M7 and through now operated KSL3 contacts 30 and 31 to reverse energize the KSL3 relay thereby causing it to release. Thus the select punch relay KPS, in this example, may be energized between positions of the carriage defined by the field switches SF7 and SF9 except over any range of carriage movement involved in a carriage return or tabulation operation, and provided there is no tape skip or Non Print operation. More specifically, the operation of the KPS relay requires that the field switch SF7 be operated, that there by neither a carriage return or tab operation, and that relay KSL13 be operated. Operation of the KSL3 relay requires that the function code switch F7 be operated while the machine is in neither the Non Print or Tape Skip modes, and the KSL3 relay is automatically released when the field switch F9 operates. Energization of the punch select relay KPS closes its contacts 1 and 2 to maintain the relay energized, and the contacts 5 and 6 of the relay KPS close to energize the punch control relay KPC–1 through the normally closed contacts 2 and 3 of the selector contacts SS11 and normally closed contacts 5 and 4 of relay KTF'. The punch control relay KPC–1 remains energized either through its now closed contacts 1 and 2 and the normally open contacts 1 and 3 of the selector contacts SS11 (operated by the function keys F1–F13) during each interval of operation of the latter or through the contacts 5 and 6 of the relay KPS while these contacts remain closed.

The relay KPS is deenergized by reverse energization supplied through its now closed contacts 3 and 4 from a plugboard terminal K5. More specifically, a potential applied at terminal K5 causes a current to flow through a reverse-flux winding in a magnitude and sense which produce magnetic flux which is equal and opposite to the flux created by the other relay winding. With the net resultant flux of zero, the relay releases thereupon opening the circuits to both its windings. In the first example given above, release of relay KPS is accomplished by supplying negative energization through an isolating diode rectifier CRX (to isolate this energizing circuit from a further energizing circuit of the plugboard terminal K5 presently to be described), the plugboard terminals G10 and H10 between which a continuous electrical circuit is completed upon manual or automatic operation of the function key F10 to use this key by way of example, this energizing circuit being qualified by the energized state of the select punch relay KSP (its normally open contacts 22 and 23, plugboard terminals A8 and C8). In the second example set forth above in respect to the energization of the punch select relay KPS, deenergization of this relay is shown as accomplished by energizing the plugboard terminal K5 through an isolating diode rectifier CRY in response to the transferred contacts of a field selection switch SF8 (plugboard terminals D12 and F12), this energizing circuit being qualified by the absence of a carriage return or tabulation operation (closed circuit between plugboard terminals A16 and B16) and being further qualified by the operative state of the selection relay KSL3 to close its normally open contacts 2 and 3 (plugboard terminals N11 and Q11). Thus during the energized period of the select punch relay KSP, the punch select relay KPS may be selectively energized and deenergized by appropriately controlling in alternate manner and with such qualification as desired the supply of negative energizing potential to the plugboard terminals K4 and K5, thus controlling the integral punch to record selected data and functional control information.

The auxiliary tape punch may likewise be manually controlled to effect selective recording of data. This is accomplished by manual actuation of the switch S2' (FIG. 4a) to its "select" position (where it will remain until manually reset) at which position its now closed contacts 2 and 3 energize a select punch relay KSP'. The latter in turn closes its contacts 4 and 5 to energize a punch select relay KPS' through a circuit extending through now closed contacts 4 and 5 of relay KSP' to the plugboard terminal L10 to which energization is supplied from the plugboard terminal A1 through the bridge code selector contacts of a function key, such as the contacts SB75 of the F5 function key (plugboard terminals G5 and H5) shown as qualified by way of example by the deenergized state of the automatic non-print relay (plugboard terminals A5 and B5). The relay KPS' is thereafter deenergized by reverse energization supplied through its now closed contacts 3 and 4, and a conductor extending to the plugboard terminal L11 to which negative energization is shown as supplied through the bridge contacts SB79 of the function key F6 (plugboard terminals G6 and H6) qualified by the deenergized state of the non-print relay (plugboard terminals A5 and B5). The normally open contacts 5 and 6 of the relay KPS' close to energize the punch control relay KPC' through the normally closed contacts 5 and 6 of the selector contacts SS11 and the now closed contacts 1 and 3 of the power switch SP'. When the select relay KPS' is later deenergized to open its contacts 5 and 6, the relay KPC' may remain energized through its now closed contacts 29 and 30 and the normally open contacts 4 and 6 of the selector contacts SS11 during the brief interval when these contacts are closed by the operation of the function key F6 (all function keys concurrently operate both of the selector contacts S11 and S12). Thus the auxiliary punch unit is controlled during the energized period of the select punch relay KSP' selectively to record data and functional control information.

Either of the punch control switches S2 and S2' may be manually operated to a position intermediate its "ALL" position, and will then remain in the intermediate position, to terminate all recording by the corresponding integral or auxiliary punch unit.

The foregoing description of the integral tape punch unit was premised upon its operation with paper tape. When this unit is used to effect edge punching of tabulating cards as described in the aforementioned Blodgett patent, operation of the tape feed switch S1 effects automatic blank code punching (punching of a feed hole only) resulting in movement of the card through the punch unit to the terminal edge of the card. This operation is similar to that described in the Blodgett patent and involves the energization of a card feed relay KCF (FIG. 4d) through the now closed contacts 2 and 3 of the card feed microswitch SCF, by operation of the tape feed switch S1. The punch control relay KPC–1 is concurrently energized through a circuit which includes the now closed contacts 9 and 10 of the relay KCF. Upon release of the tape feed switch S1, the punch clutch magnet LPC (FIG. 4e) is continuously energized from positive potential through the punch clutch magnet winding LPC, now closed contacts 3 and 4 of the relay KPC–1, normal contacts 4 and 5 of relay KNP–2, normal contacts 1 and 2 of KNP–2, normally closed contacts 3 and 4 of KPE, normally closed contacts 4 and 5 of KAR, normally closed contacts 1 and 2 of punch latch contacts SPL' and SPL in series, now closed contacts 4 and 5 of relay KCF and the now released contacts 2 and 3 of tape feed switch S1. When the contacts 2 and 3 of the card feed microswitch SCF open the hold energizing circuit of the relay KCF is interrupted. Release of the KCF relay opens contacts 6 and 7 thereof, thereby interrupting the circuit to the punch clutch magnet LPC. A similar card feed operation may be accomplished by applying negative energization to the plugboard terminal K11 to effect energization of the card feed relay KCF.

The keyboard of the typewriter includes a key lock magnet LKL (FIG. 4m) which must be energized before any key lever of the typewriter may be operated. This magnet is normally energized through the normally closed contacts 1 and 2 of the back space operated contacts SBS, the normally closed contacts 1 and 2 of the carriage return and tab operated contacts SCRT, and the normally closed contacts 23 and 24 of the punch error relay KPE.

The typewriter may be manually operated to type a document, during which time the operated key levers actuate code selector contacts as described in the aforementioned Blodgett patent and these contacts energize the clutch magnet and punch magnets of the integral and auxiliary punch units if either of these units is operative to record the data and functional control operations of the typewriter.

The typewriter may also be automatically controlled to print a document of given format according to data and functional control information read from a punched tape read by an integral tape reader of the typewriter. This automatic operation is accomplished by manually actuating a start read switch MS3 (FIG. 4m) to energize a read control relay KRC through a diode rectifier CR11, a jumper connection between the plugboard terminals R5 and R6, the normally closed contacts 24 and 25 of a manual non-print relay KMNP, the now closed contacts 1 and 3 of the start read switch MS3, and the now closed contacts 1 and 2 of a key lock magnet LKL to the energized circuit of the latter traced just above. The read control relay KRC remains energized through its own contacts 9 and 10; this energizing circuit extends from positive potential through the winding of relay KRC, a diode CR11, now closed contacts 9 and 10 of relay KRC, normally closed contacts 1 and 2 of the stop read switch MS4, the now closed contacts 1 and 2 of microswitch SRT, a conductor 14, normally closed contacts 1 and 2 of the card reader stop switch 58, a conductor 64, and the normally closed contacts 23 and 24 of the parity error relay KPE. Upon manual release of the start read switch MS3 to close its contacts 1 and 2, a reader clutch magnet LRC is energized through a circuit which includes normally closed contacts 1 and 2 of reader cam actuated contacts SRC–2, normally closed contacts 3 and 4 of translator cam actuated contacts STC–1, normally closed contacts 24 and 25 of a relay KSS, normally closed contacts 4 and 5 of a relay KSC, a jumper connection between the plugboard terminals CP and CK, normally closed contacts 3 and 4 of a delay control relay KDC–1, normally closed contacts 23 and 24 of the card feed relay KCF, normally closed contacts 2 and 3 of a delay control translator seeker contact SDC–2, normally closed contacts 2 and 3 of a delay control translator seeker contact SDC–1, the now closed contacts 29 and 30 of the read control relay KRC, the normally closed contacts 26 and 27 of an automatic non-print relay KANP, normally closed contacts 1 and 2 of the code selector contacts SS10, normally closed contacts 1 and 2 of a non-print relay NP–2, normally closed contacts 21 and 22 of a non-print relay NP–1, normally closed contacts 1 and 2 of a tape read switch S6, normally closed contacts 1 and 2 of a card read switch S7, normally closed contacts 1 and 2 of a non-print switch MS2, normally closed contacts 1 and 2 of a tape skip switch MS5, the now closed contacts 1 and 2 of the start read switch MS3, and the now closed contacts 1 and 2 of the key lock magnet LKL to the energizing circuit of the latter previously traced. The energization of the reader clutch magnet LRC initiates a cycle of reader operation during which time a code translator clutch magnet LTC (FIG. 4o) is energized through normally open contacts 1 and 2 of read cam actuated contacts SRC–1.

As explained in the aforementioned Blodgett patent, the reader includes a plurality of reader contact assemblies SR1–SR8 (FIG. 4o) each having normally open contacts 1 and 2 (and transfer contacts 3, 4 and 5 and the reader contact assemblies SR3, SR4, SR6 and SR7 additionally having normally closed contacts 6 and 7) which are operated to closed contact position by single or combinational contact pairs according to the prevailing code bits of each of successive codes read by the reader. Associated with the contacts 1 and 2 of each reader contact assembly is a code translator magnet LT1–LT8. Upon closure of the contacts 1 and 2 of any reader contact assembly SR1–SR8, the associated code translator magnet LT1–LT8 is energized by negative potential supplied through a circuit common to all of the No. 2 contacts of the reader contact assemblies. This energizing circuit may be permanently completed through a jumper connection between the reproduce print restore plug hub terminals R3 and R4 and the reader cam-actuated contacts SRC–1, or otherwise may be completed in the following manner: through various of the non-transferred and transferred contacts 3, 4 and 5 of the reader contact assemblies SR1–SR8 as shown, a conductor 52, the normally closed contacts 21 and 22 of the select card relay KSC in the tabulating card reader, a jumper connection between the plugboard terminal CN and CS of the latter, and a conductor 13 to the circuit negatively energized through the contacts 1 and 2 of the reader cam-actuated contacts SRC–1. The translator magnets energized in accordance with each code read from a punched tape, effect automatic operations of the typewriter print and functional control key levers and special keys as in the aforementioned Blodgett patent.

The present typewriter utilizes a code selector having the construction disclosed in a copending Smith application Ser. No. 407,752, filed Oct. 30, 1964, entitled "Code Selector" now issued as U.S. Patent 3,269,509 and assigned to the same assignee as the present application. This code selector includes a selector slide which is reciprocated by each key lever or functional key. Each slide is mechanically coupled to individual and combinational ones of the code selector contacts SS1–SS8 in conformity with the code which is used to represent the alpha-numeric or symbol or functional-control item of information individual to such each key lever. Thus as the selector slide moves through a reciprocatory cycle in response to the operation of a given key lever or functional key, individual or combinational ones of the code selector contacts SS1–SS8 close to energize individual ones of the punch magnets LP1–LP8 of the integral punch unit (and punch magnets LP1'–LP8' of the auxiliary punch unit) through normally closed contacts of the relays KNP–1 and KNP–2 and normally open contacts of the relay KPC–1 ( and KPC') as shown. The energizing circuit common to these selector contacts SS1–SS8 directly energizes the punch clutch magnet LPC through the normally closed contacts 4 and 5 of the relay KNP–2 and the normally open contacts 3 and 4 of the punch control relay KPC–1, and includes a circuit which has already been traced to negative potential at contacts 1 and 2 of the code selector common contacts SSC1 (FIG. 4c) which are operated to closed contact position by all of the reciprocatory code slides of the code selector associated with alpha-numeric keys including the period and common symbols but excepting those code slides associated with the function keys, the carriage return key, the space bar, the tab key, the back space key, the + key, symbol keys, and the upper case and lower case keys. The code selector also includes "bridge" contact assemblies SB9, SB10, SB53, SB56, and SB71–SB84 (FIGS. 4k and 4l) which are operated by particular code selector slides identified with individual functional keys indicated in parentheses in association with each such contact assembly. The contacts 1 and 2 of these bridge contact assemblies, together with the contacts 3 and 4 of the common contact assembly SSC–2 (which is operated in common by the auxiliary keyboard function keys, by the carriage return key lever, by the plus symbol key lever, by the space, tab, and back space key levers, the upper case and lower case key levers, and by all symbol key levers except the comma and period key levers) are connected to pairs of terminals of the plugboard as indicated. A second set of contacts 3 and 4 of these code selector bridge contact assemblies, including contacts 3 and 4 of further bridge contact assemblies SB8 and SB58, have one contact of each connected to an individual terminal of the plugboard as indicated and one contact energized in common by contacts 1 and 2 of the code selector common contacts SSC–2 operated in the manner just explained. The functions of these various groups of bridge contacts will be explained more fully hereinafter.

The integral punch unit includes a system of parity check transfer contacts shown in FIG. 4g which are energized through normally closed contacts 25 and 26 of the card feed relay KCF and the normally open feed hole contacts operated by the feed hole punch of the punch unit. It will be noted that the representative code form shown in FIG. 2 is one of odd parity in which each code group has an odd number of code bits. If each code recorded by the punch unit has such odd parity, the parity check transfer contacts provide no continuous electrical circuit through the contact system. A recorded code having even parity, however, is known to be erroneous and the parity check transfer contact system accordingly provides an electrically continuous circuit through the contacts thereof to energize a parity error relay KP–1 (FIG. 4e) through normally closed contacts 1 and 2 of a relay KPA–1. The contacts 3 and 4 of the parity error relay KP–1 thereupon close to energize the punch error relay KPE (FIG. 4d), and the contacts 25 and 26 of the latter close to maintain a hold energizing circuit for the relays KPE and KP–1 through the normally closed contacts 21 and 22 of the relay KCF and the normally closed contacts 21 and 22 of the relay KTF. This halts the reader operation by deenergization of the read control relay KRC (FIG. 4m) by reason of the interruption of its hold energizing circuit through the normally closed contacts 23 and 24 of the relay KPE, and deenergization of the relay KRC effects opening of its contacts 29 and 30 to interrupt the energizing circuit of the reader clutch magnet LRC. The resumed operation of the punched tape reader is effected by energization of the tape feed switch S1 to energize the tape feed relay KTF or the card feed relay KCF to open the contacts 21 and 22 of either of these relays and thus deenergize the error relays KPE and KP–1. As shown in FIG. 4b, the auxiliary tape punch likewise includes a system of parity check transfer contacts which operates in the same manner as just described whenever an erroneous even parity code is punched by this punched tape unit.

The operation of the punched tape reader may be halted by manual actuation of the stop read switch MS4 (FIG. 4m) to interrupt the hold energizing circuit of the read control relay KRC and thereby interrupt the energizing circuit of the reader clutch magnet LRC as just explained. Resumed operation of the punched tape reader is then effected by manual actuation of the start read switch MS3 to reenergize the read control relay KRC as previously described.

Information read from a punched tape may be skipped (i.e. not used in effecting automatic operations of the typewriter) by manual actuation of a tape skip switch MS5 (FIG. 4m) to energize a control skip relay KCS through a jumper connection between the plugboard terminals R7 and R8, the normally closed contacts 4 and 5 of the relay KMNP, and a diode rectifier CR9. The control skip relay KCS thereafter remains energized through its now closed contacts 3 and 4. Normally open contacts 22 and 23 of the relay KCS close to effect energization of a tape skip relay KTS (FIG. 4g) through the normally closed contacts 5 and 6 of code selector contacts SS12, to negative potential. Contacts 9 and 10 (FIG. 4o) of the relay KTS energize a translater magnet LT10 (through a jumper connection between the plugboard terminals R1 and R2) concurrently with energization of a translator magnet LT9 through the now closed contacts 27 and 28 of the relay KTS. Energization of these translator magnets introduce such 9th level and 10th level codes into the code translator as to make the translator non-responsive to all codes read by the tape reader which continues in operation. The control skip relay KCS is deenergized by reverse energization applied through its normally open but now closed contacts 5 and 6 upon appropriate negative energization applied to the terminal K6 of the plugboard. This may be accomplished, for example, by operation of the function key F8 by which to close the code translator bridge contacts SB72 and thus by plugboard wiring from the minus terminal A1 to the terminal G8 with additional plugboard wiring from the terminal H8 to the terminal K6 supply the desired negative reverse energization to deenergize the control skip relay KCS. Deenergization of this relay in turn deenergizes the tape skip relay KTS, through the now open contacts 22 and 23 of the relay KCS, as soon as the function key F8 restores to reopen the contacts 4 and 6 of the selector contacts SS12 to interrupt the continuing energization of the relay KTS through its now closed contacts 7 and 8.

Manual non-print operations of the typewriter may be accomplished by manual actuation of a non-print switch MS2 (FIG. 4f) to energize a non-print relay KMNP. The contacts 27 and 28 of the latter close to energize non-print relays KNP1 and KNP2 (FIG. 4g), which interrupt the energizing circuit of the punch clutch magnet LPC and disconnect the code selector contacts SS1–SS8 from the punch magnets of the integral and auxiliary punch units and thereafter transfer energizzation of the punch magnets and punch clutch magnet to the tape reader contacts SR1–SR8 and to the reader contacts of a card reader hereinafter described. The contacts 29 and 30 of the non-print relay KMNP close to energize a translator magnet LT11 (FIG. 4o), and the contacts 30 and 31 of the non-print relay KNP1 close to energize a translator magnet L210, to halt automatic typewriter key lever operations while continuing the punched tape reader operation. The non-print relay KMNP remains energized through its now closed contacts 30 and 31 of the relay KNP2, the now closed contacts 9 and 10 of the read control relay KRC, the normally closed contacts 1 and 2 of the contacts SRT (which are closed when a tape is positioned in the tape reader in readiness to be read), the normally closed contacts 1 and 2 of a stop read switch MS4, a conductor 14, the normally closed contacts 1 and 2 of a stop read switch S8 of the tabulating card reader, a conductor 64, and the normally closed contacts 23 and 24 of the punch error relay KPE. Thus under this manual non-print operating condition, the tape reader operation can only be halted by manual actuation of one of the stop read switches MS4 or S8 to deenergize the read control relay KRC.

Automatic non-print operation accomplished by reading a non-print code by the punched tape reader effects energization of an automatic non-print relay KANP (FIG. 4n) from the plugboard terminal K2 through the normally open but now closed contacts 25 and 26 of the read control relay KRC. The plugboard terminal K2 is energized for this purpose upon automatic operation of a selected function key (such as the key F2 by way of example) in response to the non-print code, thereby to complete a plugboard wired circuit from the negative energization terminal A1 through plugboard terminals interconnected by bridge contacts of the selected function key (such as plugboard terminals G2–H2, having a circuit completed by operation of the function key F2 code selector bridge contacts SB77) to the plugboard terminal K2. The energizing circuit last mentioned is shown as qualified by the normally closed contacts 1 and 2 (plugboard terminals A3 and B3 of the tape skip relay KTS so that the automatic non-print relay KANP is not energized if the non-print code is read during a tape skip operation. The non-print code thus energizes the non-print terminal K2 and is reproduced in an output punched tape by extension of the energizing circuit to the plugboard terminal J2. The non-print relay KANP maintains itself energized through its now closed contacts 9 and 10. Deenergization of the relay KANP to halt the non-print operation is accomplished by its reverse energization through its now closed contacts 29 and 30 and the terminal K3 of the plugboard (as by operation of a function key F3 in response to a print restore code, whereby electrical continuity of a plugboard wired circuit is completed from the negative energizing terminal A1 qualified through the now transferred plugboard terminals A5–C5 and through the plugboard terminals G3–H3 by operation of the function key F3 code selector bridge contacts SB81 to the terminal K3). Recording of the print restore code may be accomplished by extending the terminal K3 energizing circuit to the plugboard terminal F3. Upon energization of the non-print relay KANP, its normally open contacts 11 and 12 close to energize the non-print relays KNP1 and KNP2 as soon as restoration of the non-print function key (F2) retransfers the selector contacts SS12 to reclose the contacts 2 and 3 of the latter, and the non-print relays KNP1 and KNP2 effect non-print operations of the typewriter in the manner previously explained in connection with the manual non-print operation. When the non-print relay KANP is later deenergized by the function key K3, the contacts 11 and 12 of the non-print relay KANP open but the relays KNP1 and KNP2 continue to remain energized through the now closed contacts 9 and 10 of the relay KNP2 and the transferred contacts 1 and 3 of the selector contacts SS12 until the latter contacts open upon retransfer of the contacts SS12 with restoration of the print-restore operated function key (F3).

Certain of the typewriter operations, such as carriage return and tabulation, require a brief delay in the operation of the punched tape reader for an interval sufficient to permit the typewriter operation to be completed. For this purpose, a delay relay KDC-1 (FIG. 4g) is energized by closing of the contacts 1 and 2 of either of the translator contacts SDC-1 or SDC-2 (FIG. 4n) which are operated by the translator seeker selection of the back space key lever, the carriage return key lever, the tabulation key lever, each of the function keys F1–F3 and F7–F13, and the space bar key lever. In other words, the translator seekers which automatically operate the key levers and keys last enumerated operate individual ones of the translator delay contacts SDC-1 and SDC-2 to provide a brief delay in reader operation enabling the function controlled by the particular function key or key lever to be accomplished. When either of the translator delay contacts SDC-1 or SDC-2 is so operated to close its contacts 1 and 2, the delay control relay KDC-1 is energized through these closed contacts from an energizing circuit which includes the now closed contacts 29 and 30 of the reader control relay KRC, the normally closed contacts 1 and 2 of the code selector contacts SS10, a conductor 28, the normally closed contacts 1 and 2 of the non-print relay KNP-2, the normally closed contacts 21 and 22 of the non-print relay KNP-1, the normally closed contacts 1 and 2 of the tape read switch S6, the normally closed contacts 1 and 2 of the card read switch S7, a conductor 29, and the normally closed contacts 1 and 2 of all of the switches MS2, MS5 and MS3 to the energizing circuit of the key lock magnet LKL. The delay control relay KDC-1 thereafter remains energized through its "AX" contacts 1 and 2 and the now closed contacts 29 and 30 of the relay KRC in the energizing circuit last traced. It will be noted that the latter energizing circuit includes the normally open but now closed contacts 1 and 2 of the key lock magnet LKL, which open briefly to deenergize the relay KDC-1 and thus terminate the delay interval when the contacts 1 and 2 of the carriage return and tabulate contacts SCRT open (or the contacts 1 and 2 of the back space contacts SBS open) briefly to deenergize the key lock magnet LKL and thereby lock up the keyboard. When the selected function key F1–F3, F7–F13, or the space bar key lever is operated, the code selector slide corresponding to this key lever is also operated and causes the contacts 1 and 2 of the selector contacts SS10 to open and thereby interrupt the energizing circuit of the delay control relay KDC–1 to terminate the delay interval. The delay control relay KDC–1 may be energized by a space code when read if an additional function is to be accomplished which requires a delay. This energizing circuit extends from the delay control relay KDC–1 through a conductor 4A to the delay on space plugboard terminal R10 which, if a space delay is desired, is plugboard wired to the plugboard terminal I9. The latter extends the energizing circuit through the series connected and normally closed contacts 6 and 7 of the reader contact assemblies SR3, SR4, SR6 and SR7 to the normally open contacts 3 and 4 of the contact assembly SR5, which is operated to transfer its contacts by a 5-bit space code and thus extend the energizing circuit through the series connected and normally closed contacts 4 and 5 of the reader contact assemblies SR1, SR2 and SR8 to the conductor 52 negatively energized as earlier described. The translator operation of the space bar key lever also effects opening of the contacts 1 and 2 of the selector contacts SS10 to deenergize the relay KDC–1 in the manner previously explained and thus terminate the space delay. It is in this manner that the function keys F1–F3, F7–F13 and the space bar key lever each provide a short delay interval which is terminated by operation of the selector contacts SS10 when subsequently operated by these function keys and the space bar operation.

The delay control relay KDC–1 is also used to provide a brief delay interval upon reading a stop code to halt the automatic reading operation. The halt operation is accomplished by negatively energizing the stop function entry hub K1 of the plugboard through a selected one of the function keys F1–F13 from the plugboard negative terminal A1 with any desired qualification as herein described. The stop code selection of this function key causes the latter to operate the transfer contacts 3, 4 and 5 (FIG. 4h) of the selector contact SS10, whereby a condenser CS is charged from the positive energizing potential through the now closed contacts 4 and 5 of the selector contacts SS10, a diode rectifier CR17 and a resistor RS to the negatively energized plugboard terminal hub K1. Upon restoration of the function key and resultant return of the selector contact SS10 to close its contacts 3 and 4, the charge of the condenser CS is supplied through the latter contacts and through a conductor 3A and the now closed contacts 27 and 28 of the read control relay KRC to a reverse energizing winding of the read control relay KRC thus to deenergize the latter and halt the automatic reading operation. At the time the plugboard terminal K1 is negatively energized in the manner just explained, a condenser CD is also charged through a diode rectifier CR18; upon removal of the negative potential from the plugboard terminal K1, the delay control relay KDC–1 is now energized through the conductor 4A and a diode rectifier CR19 by the charge placed in the condenser CD. The delay control relay KDC is then deenergized when the contacts 29 and 30 of the read control relay KRC open to interrupt the hold energizing circuit of the relay KDC.

The present typewriter is enabled to have high flexibility of operation by reason of numerous types of control qualifications placed upon its operational functions. Thus it includes manually operable modification switches S11, S20, S30 and S40 (FIG. 4f) having transfer contacts terminating at terminals 1–4 in rows D, E and F of the plugboard as indicated. The switches S11 and S20 are of the toggle type and remain in the position to which manually set, whereas the switches S30 and S40 are self-restoring. These switches may, for example, control relay energizations or supply and interrupt negative energization supplied through one or more code selector bridge contacts operated by function key levers and function keys or other typewriter functional operations so that an operation controlled by the function may or may not take place depending upon the position of a given modification switch. By way of specific example of a simple relay control, assume that negative energization is applied by jumper-wire connection from the terminal A1 to the common terminal D3 of the modification switch S30. This applied energization will have no effect on the typewriter operations until the switch S30 is manually operated to close its normally open contacts and thereby apply negative energization from the transfer terminal F3 of the switch S30 to a plugboard terminal K10 to energize an ADD 8 relay KPA–1. This relay has contacts 4 and 5 (FIG. 4h) which close to energize the punch magnet LP8 (an "8" code bit is then recorded with the next recorded code to signify that the recorded code is an address code for a quantity of data subsequently recorded), and has contacts 1 and 2 (FIG. 4e) which open to interrupt the energizing circuit extending from the parity check transfer contacts to the error relay KP–1. Thus no error indication is provided by the even code parity resulting from the addition of the "8" code bit to an otherwise odd parity code, and the resultant address code is then suitable for use in a selectadata translating system of the type disclosed in the Blodgett et al. U.S. Patent No. 3,025,941.

Automatic modification of the typewriter functions, equivalent to that enabled by use of the modification switches S11, S20, S30 and S40 just described, may be accomplished by selection relays KSL1–KSL4 (FIG. 4f) which are energized from respective terminals M1–M4 of the plugboard, remain energized through the normally open contacts 10 and 11 of each, and are each deenergized by reverse energization applied through the normally open contacts 30 and 31 of each such relay from respective terminals M5–M8 of the plugboard. These selection relays each have five transfer contacts (FIGS. 4e and 4h) which are connected as shown to terminals 1–15 in rows N, P and Q of the plugboard. These relay transfer contacts, operating five at a time, provide substantial capacity for modification of numerous typewriter operations greatly exceeding the limited operational modifications enabled by the modification switches S11, S20, S30 and S40.

It was previously explained that the typewriter carriage positionally actuates any of twelve field switches of the transfer contact type. These are identified in FIGS. 4g and 4n as transfer switches SF1–SF12 having contacts connected as shown to terminals 5–16 in rows D, E and F of the plugboard. These field switches have utility in modifying the typewriter operations according to the prevailing carriage position. For example, in preparing a business form there may be an area of the form wherein all the typing is to be accomplished manually. This area of the form would be identified by initial and terminal carriage positions, and these carriage positions may actuate a first and a second field switch. The first field switch (for example switch SF1) could then be used to energize one of the selector relays KSL1–KSL4 just described (for example KSL2 by energization supplied through terminals D5 and F5 to terminal M2) and a pair of normally closed contacts (for example N6 and P6) of the selector relay could then interrupt the continuity of a circuit extending between terminal R5 and terminal R6 of the plugboard whereby the energizing circuit from the start read switch MS3 to the read control relay KRC would be interrupted and no tape reader operations could then be manually started during the energized state of the selector relay. The second field switch identifying the terminal carriage position at the end of the business form area (for example switch SF2) could then deenergize the selector relay previously energized (for example by negative energization supplied through terminals D6 and F6 to terminal M6) and thereby complete the energizing circuit between the start read switch MS3 and the read control relay KRC to permit manual start of the punched tape reader by operation of the switch MS3.

The tabulation stop-engaging member of the typewriter may be held by an interposer in a skip "tab off" position thereof out of engagement with all tabulating stops or may engage the tabulating stops upon repositioning of the interposer to a skip "tab on" position thereof. The positioning of the interposer to its skip "tab on" position is accomplished by a latching relay having a set magnet LTS (FIG. 4g) energized through latch-reset LTR closed contacts 1 and 2 of the relay from a terminal K8 of the plugboard, after which the interposer is set to its skip "tab off" position by energization of a reset winding LTR of the latching relay through its latch-set LTS closable contacts 3 and 4 from the terminal K9 of the plugboard. This set and reset positioning of the interposer, and resultant skipping of certain tabulation positions, may be accomplished by energizations applied to the plugboard terminals K8 and K9 through the carriage field switches SF1–SF12 at selected carriage positions. For example, suppose that the skip "tab on" and skip "tab off" functions are to occur between two carriage positions defined by field switches SF3 and SF4 but that the skip tab operation is to be qualified to take place only when the modification switch MS20 is actuated to close its contacts 2 and 3. The skip "tab on" function will occur when energization is supplied through plugboard terminals D2 and F2 and plugboard terminals D7 and F7 to the plugboard terminal K8, and the skip "tab off" function occurs upon extending the energizing circuit through plugboard terminals D8 and F8 to the plugboard terminal K9.

The read control relay KRC includes a contact transfer set 4, 5 and 6 and a second contact transfer set 21, 22 and 23 (FIG. 4n) which are connected as shown to terminals 9 and 10 in rows A, B and C of the plugboard. These transfer contacts enable further qualification of the typewriter operations dependent upon the energized and deenergized states of the read control relay. The automatic non-print relay KANP similarly includes two contact transfer sets 3–8 which are connected as shown to terminals 5 and 6 in rows A, B and C of the plugboard, thereby enabling qualification of the typewriter operations according to the energized and deenergized states of the automatic non-print relay. The tape skip relay KTS also includes two contact transfer sets 1–6 which are connected as shown to terminals 3 and 4 in rows A, B and C of the plugboard to permit qualification of the typewriter operations according to the energized and deenergized states of this relay. The select punch relay KSP likewise includes two contact transfer sets 1–3 and 21–23 which are connected as shown to terminals 7 and 8 in rows A, B and C of the plugboard to permit qualification of typewriter operations according to the energized and deenergized states of this relay. The carriage return and tabulaton contacts SCRT also are provided with two contact transfer sets 4–9 (FIG. 4h) which are connected as shown to terminals 15 and 16 in rows A, B and C of the plugboard to provide qualification of typewriter operations according to the positioning of these contacts in relation to a carriage return or tabulation operation. The case shift contacts SCS of the typewriter have two transfer contact sets 1–6 and a third transfer contact set 11–13 which are connected to terminals 17, 18 and 19 of rows D, E and F of the plugboard to permit qualification of typewriter operations according to the upper case or lower case positions of the type basket of the typewriter.

It was earlier mentioned that the code selector has bridge contacts normally open but operated to close contact position by reciprocal motion of the code slides responsive to actuation of a function key. In addition, there are similar bridge contacts (FIGS. 4k and 4l) which are operated to closed contact position by the tabulation key lever, the space bar, the back space key lever, the carriage return key lever, the dash key lever and the upper and lower case shift key levers. These with the contacts 3 and 4 of the selector common contacts SSC–2 are all connected as shown between terminals 1–20 in row H and terminals 1–20 in row G of the plugboard and between terminals 19 in rows L and K. These bridge contacts are each associated with a second similarly identified normally open contact pair having one contact of each connected as shown to terminals 1–19 in row J of the plugboard and having one contact of each connected in common to terminal K20 of the plugboard and through contacts 1 and 2 of the code selector common contacts SSC2 to the transfer contact 2 of the punch latch contacts SPL (FIG. 4c) which provides the energizing circuit for the punch clutch magnet and punch magnets as earlier explained. Thus the latter group of bridge contacts may be used, upon energization of their individual plugboard terminals J1–J19, to cause punch recording of codes corresponding to operation of the functional code keys, the carriage return key lever, the plus symbol key lever, the space key lever, the tabulation key lever, the back space key lever and the symbol key levers except for the comma (,) and period (.) key levers, all of which cause operation of the code selector common contacts SSC2 but do not cause operation of the code selector common contacts SSC1 through which the punch clutch magnet and punch magnets are normally energized. This permits selective punch-code recording, qualified as desired, corresponding to operation of certain key levers and keys which would not otherwise be recorded. By energization supplied to the plugboard terminal J20, the punch clutch magnet and punch magnets are energized (with any desired qualification) through the code selector contacts SS1–SS7 by energization supplied through the code selector common contacts SSC3 (FIG. 4g) which are operated in common by all symbol key levers except the comma and period key levers.

Unlike the arrangement of the above-mentioned Blodgett patent, wherein the reading of a stop code by the tape reader directly effects deenergization of the read control relay, the reading of a stop code in the present system causes the code translator to operate a selected function key (such as the key F1). In the manner earlier explained, the code selector bridge contacts operated by this function key then are plug-hub wired to supply negative energization to the plugboard terminal K1 to deenergize the read control relay KRC by reversely energizing it through its then-closed contacts 27 and 28. Accordingly, the usual halt of the tape reader operations upon reading a stop code during normal tape reading, during tape skip, and during automatic and manual non-print conditions can be easily qualified to take place or not according to a prevailing operation or operational condition of the typewriter. A common qualification is to wire the stop function to be ineffective during automatic non-print and tape skip conditions.

A further commonly used qualification concerns the non-print operation described above and which may be initiated, for example, by manual or automatic operation of the function key F2. During the non-print operation, no printing or other typewriter operation will occur except for the functions caused by code corresponding to the operational codes of the thirteen function code keys. If any of these codes are not to cause their assigned functions, they are to be so qualified through control wiring of the typewriter plugboard. For example, a common qualification is to wire the punch control codes (ON1, ON2, OFF) to be ineffective during the automatic non-print operation. Thus assume that function keys F4 and F5 turn the respective integral and auxiliary punches ON. The turn ON of either or both punches can be qualified during non-print by supplying energization to the plugboard terminal K4 through the plugboard terminals G4–H4 and A5–B5, and by extending this energizing circuit through the terminals G5–H5 to the terminal L10. The condition restores to normal reading upon sensing the print restore code. Often the non-print code itself is qualified to be non-reproducing (not punch-recorded) when the punch control switch S2 is in the select position. This means that the non-print code which initiates the automatic non-print condition will not itself be recorded by a tape punch operative at the time the non-print code is read. Once the non-print operational condition has been established, however, all further conditions including a further non-print code will be recorded by an operative tape punch. These subsequently recorded non-print codes provide the facility for carrying the non-print operation into a subsequent operation controlled by the newly recorded punched tape; thus two successively recorded non-print codes recorded in a first tape punch will result in the recording of a single non-print code in a second punched tape produced by the first tape, and the second tape will then initiate the non-print operation but without the recording of a non-print code in a third tape produced by the second tape. While address codes read during the non-print operation are recorded as an even parity code with the address identifying eight-code bit, and while the parity check contact system of FIG. 4 is operative during the recording of these address codes, the contacts 27 and 28 of the non-print relay KNP–2 are open during the non-print operation and thus disable the parity check contact system whenever an eight-bit code is recorded.

During a tape skip operation, the only format control function which may be wired through the plugboard to be operable is the carriage return function. Also, no printing or code recording will occur during the tape skip operation even if a tape punch is in operative condition at the time. If desired, the carriage return function can be qualified by plugboard wiring between the terminals R1 and R2 to be made inoperative during the tape skip operation. Further, if operable during the tape skip operation and a punch recorder is operative, the carriage return function can be qualified (plugboard terminals A3, B3 and C3 or A4, B4 and C4 and terminal J15) to be recorded or not recorded by the operative tape punch.

As previously indicated, qualification of operational functions enables functional control dependent upon whether the typewriter is manually or automatically operated at a given time. For example, function code keys assigned to punch control codes (ON1, ON2, OFF) can be made to punch codes when the typewriter is manually operated but not when these function key codes are read by the tape reader (plugboard terminals A9, B9 and C9 or A10, B10 and C10 controlling energization supplied to the function key reproduce entry terminals [J1–J13] concerned).

It is possible to have two or more different stop codes, one associated with one function code key which does not effect any punch code recording and the other stop code associated with another function code key which always effects a stop code recording but does not effect the stop function unless qualified as by the depressed position of one of the program modification switches S11, S20, S30 or S40. This form of qualified operation enables updating of a newly reproduced punched tape with information added or deleted with each reproduction of an older tape read by the tape reader at a given time.

Of the four format code switches terminating in hubs identified as columns 14–17 in rows G and H of the typewriter plugboard, only the space operated contacts do not have an integral delay. If an additional function is to be caused by the space code when read, and if it is a function which requires a delay, a jumper connection is completed between the plugboard hubs R9 and R10 so that the reader contact assemblies upon reading a five-bit space code energize the delay control relay KDC–1 in the manner earlier explained. The delay relay then maintains itself energized through its now closed "AX" contacts 1 and 2 until the code selector contacts SS10 are operated to open-contact position.

The foregoing description of the system explains various manners in which the typewriter operations may be qualified by the presence or absence of numerous functional operations or may be qualified manually or by functional operations and manually. Qualifications also has the important advantage that it is often possible to have various of the function codes perform as additional function codes which are not available by reason of the limited code capacity of a given code system. To illustrate this, the selection switch S11 is connected to supply through its closed contacts 2 and 3 in one position of the switch negative energization (plugboard terminals D1 and F1) to the transfer contacts of the field switch FS6 (plugboard terminals D10 and F10), and the latter at the carriage position defined by the field switch FS6 supplies this negative energization through the contacts 2 and 3 of the case shift contacts SCS in the upper case position of the type basket (plugboard terminals D17 and F17) and through the function switch F12 bridge contacts SB78 (plugboard terminals G12 and H12) to energize the plugboard terminal M1 and thus energize the selection relay KSL1. Thus when the bridge contacts SB9 of the code selector close in response to a tabulation operation, negative energization is supplied through these contacts (plugboard terminals G16 and H16) and the now transferred contacts 25 and 26 (plugboard terminals N5 and Q5 of the selection relay KSL1 to energize the plugboard terminal L4, which it will be explained hereinafter causes the tabulating card reader to skip one card column, and concurrently through an isolating diode rectifier CRV energizes the plugboard terminal L1 which it will be explained hereinafter terminates the reading operation of the tabulating card reader and initiates operation of the tape reader. Thus manual positioning of the switch S11 to close its contacts 2 and 3 effectively changes the tabulation code to a new one accomplishing a tabulation function and causing skipping of one tabulating card column and concurrent halt of the tabulating card reader operation with concurrent initiation of the punched tape reader operation. The select relay KSL1 is deenergized by negative energization supplied to the plugboard terminal M5 through the bridge selector contacts SB82 (plugboard terminals G13 and H13) when the function key F13 is next operated manually or automatically and thus halts this qualified operation concerning the tabulation code function.

The operational versatility and flexibility of the system described may be indicated by a further example. Assume that information recorded by the auxiliary tape punch unit is to include all data and functional control information automatically typed from a punched tape read by the integral tape reader but not recorded by the integral tape punch unit. In conformity with the earlier described turn-ON and turn-OFF of the auxiliary punch unit by the respective function keys F5 and F6 as qualified by the deenergized state of the automatic non-print relay (plugboard terminals A5 and B5,), the control of the auxiliary punch unit to record all data and functional controls under the assumed conditions may be accomplished by energizing the all-codes plugboard terminal K20 with qualifications that the auxiliary punch unit is operative (plugboard terminals A11 and C11), as further qualified by the operative state of the integral tape reader (plugboard terminals A10 and C10), as further qualified by the fact that the integral punch unit has not been selected for recording of information (plugboard terminals A7 and B7), and qualified lastly by the deenergized state of the automatic non-print relay (plugboard terminals A5 and B5). Thus all data and functional control information supplied by the integral tape reader and reproduced by the typewriter may be automatically rerecorded in a by-product tape produced by the auxiliary punch unit.

The automatic tabulating card reader is conditioned for operation by manual actuation of a power switch S9 (FIG. 4p) to close its contacts 1 and 2 and thereby energize a power relay KP from the negatively energized conductor 11. The power switch S9 also includes contacts 3 and 4 (FIG. 4t) which close to apply alternating current from a suitable alternating current source PAC through a conventional starting relay SR to a drive motor M′ which provides mechanical drive power for the tabulating current reader.

As will presently be described more fully, the tabulating card reader is adapted to operate under control of any of four programs each of which may be manually selected or may be automatically selected by a program selection code recorded in the first column of each tabulating card read. Manual selection of program requires that a toggle form of manual select switch S12 (FIG. 4r) be manually operated to close its contacts 2 and 3 by which to supply energization from the negatively energized conductor 11 through the now closed contacts 24 and 25 of the power relay KP and the now closed contacts 1 and 2 of an OFF normal contact ONC (the contacts 1 and 2 of which are closed at the completion of each card reading operation) to the manual program selection switches SPA–SPD. The contacts 1 and 3 of the latter switches are connected in series with one another so that manual operation of any of the switches to energize an associated program relay KPA–KPD interrupts the supply of negative energization to succeeding program switches in the order of their arrangement from the switch SPA to the switch SPD. When the manual select switch S12 is positioned to close its contacts 2 and 3 to establish the manual form of program selection, one of the program switches SPA–SPD (also of the toggle type) must be operated to close its contacts 1 and 2 (the manually actuated program switch will then remain with its contacts 1 and 2 closed since these selection switches are of the toggle type and remain in the position to which manually set) and energize an associated program relay. If no one of the program selection switches is so operated, the negative energization supplied to the program selection switches is translated through all of them to energize a card eject relay KCE (FIG. 4g) which thereupon prevents further operation of the card reader for reasons explained hereinafter. The card eject relay KCE remains energized through its now closed contacts 28 and 29, a conductor 22, the now closed contacts 2 and 3 of the read control relay KRC, and a conductor 23 to the negatively energized conductor 11. Thus the card eject relay KCE once energized in this manner will remain energized, even though a program selection switch SPA–SPD is thereafter manually operated, until the read control relay KRC is deenergized as by manual operation of the stop read switch MS4 to open its contacts 1 and 2. This operation of the relay KCE guards against an inadvertent failure manually to select one of the four available programs. Manual operation of the manual select switch S12 to open its contacts 2 and 3 (which will remain open since the switch S12 being of the toggle type remains in the position to which manually set) establishes the automatic program selection mode of operation and interrupts the supply of negative energization to the manual program selection switches SPA–SPD so that in this event failure manually to operate one of the program selection switches does not result in the foregoing described operation of the card eject relay KCE.

The tabulating card reader is now placed into reading operation by manual actuation of a card read switch S7 (FIG. 4p) to close its contacts 2 and 3 and supply negative energization from the conductor 29 through a jumper connection from BX to BT and thence through diode CR4–1 to a winding of a relay KSS (FIG. 4w) which has its other terminal connected to the positive potential. The relay KSS provides an alternate holding circuit from positive potential through a winding of relay KSS, a diode rectifier CR42, resistor R14, and now closed contacts 23 and 22 of KSS to the negatively energized conductor 11. The contacts 10 and 11 of the relay KSS thereupon open to interrupt the previously described energizing circuit for the tape reader clutch magnet LRC and thus halt the tape reader if the latter should be operating at this time or otherwise to prevent operation of the tape reader during the operative interval of the tabulating card reader. The negative energization supplied to the relay KSS as just described is also supplied through a diode rectifier CR6–1 to a select card relay KSC. The latter relay is not energized at this time, however, since the other terminal of the relay winding does not have an effective positive energization applied to it. This lack of positive energization is due to a large potential drop produced across a resistor R7 through a diode rectifier CRAD–2 and the card read switch S7 to the negatively energized conductor 29. Upon manual release of the card read switch S7 to open its contacts 2 and 3, the energizing circuit extending through the diode rectifier CRAD–2 as last mentioned is interrupted so that the potential drop across the resistor R7 disappears and a positive potential is now supplied to the relay KSC. This energizes the select card relay KSC since its negative energizing circuit is now completed through the diode rectifier CR43 and the now closed contacts 22 and 23 of the relay KSS to the negatively energized conductor 11. The relay KSC accordingly remains energized until deenergization of the relay KSS to open its contacts 22 and 23.

Energization of the relays KSS and KSC as last described effects energization of a card feed clutch magnet LCCF (FIG. 4v) of the tabulating card reader to move a tabulating card from the input card hopper into reading position in the reader. This energization circuit extends from the card feed clutch magnet LCCF through the now closed contacts 1 and 2 of the feed cam actuated contacts SCH1, the normally closed contacts 5 and 6 of the drum open contacts DOC (occupying the contact positions shown until a tabulating card is moved into reading position in the tabulating card reader), the normally closed contacts 6 and 7 of a relay KAR, the normally closed contacts 6 and 7 of a relay KCE, the now closed contacts 4 and 5 of the power relay KP, the now closed contacts 5 and 6 of the relay KSS, the now closed contacts 5 and 6 of the relay KSC, a jumper connection between the plugboard terminals CP and CK, a conductor 12, normally closed contacts 3 and 4 of the delay control relay KDC–1, normally closed contacts 23 and 24 of the card feed relay KCF, normally closed contacts 2 and 3 of the translator seeker contact SDC–2, normally closed contacts 2 and 3 of the second translator seeker contact SDC–1, now closed contacts 29 and 30 of the read control relay KRC, normally closed contacts 26 and 27 of the automatic non-print relay KANP, normally closed contacts 1 and 2 of a code translator contact SS10, a conductor 28, normally closed contacts 1 and 2 of a nonprint relay NP–2, normally closed contacts 21 and 22 of a non-print relay NP–1, normally closed contacts 1 and 2 of a tape read switch S6, and normally closed contacts 1 and 2 of the card read switch S7 to the negatively energized conductor 29.

At 190° of the card feed cycle, the normally open contacts 1 and 2 of the card feed cam actuated contacts SCH3 (FIG. 4v) close to energize a relay KAR from the negatively energized conductor 11. At 230° of the card feed cycle, a latch-release magnet LDM is energized to effect movement of a pressure and a drum-feed roll into driving engagement with a card positioned in reading position in the reader; this energizing circuit includes the now closed contacts 1 and 2 of a card-in contact CIC (these contacts 1 and 2 close as soon as a tabultaing card begins to be fed out of the input card hopper), and the now closed contacts 1 and 2 of the card feed cam actuated contacts SHC2 to the negatively energized conductor 11. The previously mentioned movement of the pressure roll into engagement with the drum-feed roll of the reader causes the contacts 3 and 4 of the drum open contacts DOC to close, and a hold circuit is now established for the relay KAR through its now closed contacts 28 and 29, the normally closed contacts of the 81st column contacts 81S (which are closed until the card moves to the 80th card column marking completion of the card reading operation and close again before the 81st card column), the now closed contacts 3 and 4 of the drum open contacts DOC, and the now closed contacts 24 and 25 of the power relay KP to the negatively energized conductor 11.

The energizing circuit of the card feed clutch magnet LCCF was previously interrupted by the now open contacts 6 and 7 of the relay KAR, and the card read clutch LCMR (FIG. 4r) is immediately energized through normally closed contacts 3 and 4 of reader cam actuated contacts SRC1, the now closed contacts 1 and 2 of the drum open contacts DOC, a conductor 78, normally closed contacts 1 and 2 of the typewriter translator cam actuated contacts STC-2, a conductor 37, normally closed contacts 21 and 22 of a relay KSE, the normally closed contacts 23 and 24 of a relay KSD, normally closed contacts 21 and 22 of a relay KDC, the now closed contacts 7 and 8 of the relay KAR, normally closed contacts 6 and 7 of the relay KCE, now closed contacts 4 and 5 of the power relay KP, now closed contacts 5 and 6 of the relay KSS, and now closed contacts 5 and 6 of the relay KSC to the plugboard terminals CP–CK negatively energized by the conductor 12 in the manner previously explained.

On the first card-column read cycle, the tabulating card is so positioned in the tabulating card reader that the latter reads the unperforated leading-edge marginal area of the card at a columnar position conveniently considered a "0" card column. Since this "0" card column is always unperforated and therefore blank, it effects the energization of a counter relay KSCA (FIG. 4u) from 30° to 47° of the first card read cycle. This energization circuit extends from the relay KSCA through the normally closed contacts 21 and 22 of a counter relay KSCB, the normally closed contacts 1 and 2 of a relay KBSO, now closed contacts 9 and 10 of the relay KAR, a diode rectifier CR14–1, the serially connected and normally closed contacts 21 and 22 of the card reader contact assemblies SR1–SR12 (and of which no reader contact assembly is operated to open its contacts 21 and 22 since there is no aperture or perforation in the "0" card column as noted), normally closed contacts 3 and 4 of relay KCI, now closed contacts 1 and 2 of reader cam actuated contacts SCR3, and normally closed contacts 23 and 24 of a relay KCE to the negatively energized conductor 11. The counter relay KSCA now maintains itself energized through its now closed contacts 5 and 6, normally closed contacts 24 and 25 of the counter relay KSCB, and the now closed contacts 26 and 27 of the relay KAR to the energized conductor 11. At 60° of the reader cycle, the counter relay KSCB (FIG. 4y) is energized through the now closed contacts 1 and 2 of the counter relay KSCA, the now closed contacts 1 and 2 or the reader cam actuated contacts SRC2, and the now closed contacts 26 and 27 of the relay KAR to th negatively energized conductor 11. The contacts 21 and 22 and the contacts 24 and 25 of the counter relay KSCB now open and the relay KSCA is then maintained energized only through its now closed contacts 3 and 4 and the contacts 1 and 2 of the reader cam actuated contacts SRC2 until the latter open at 82° of the reader cycle. The now closed contacts 3 and 4 of the cam actuated contacts SRC3 hold the counter relay KSCB to 30° of the next reader cycle through the normally closed contacts 1 and 2 of the relay KSE and the now closed contacts 1 and 2 of the counter relay KSCB.

If the second card column contains no proper program selection code, and if no one of the four program relays KPA–KPD have been energized by manual operation of program switches hereinafter to be considered, the card eject relay KCE is energized at 60° of this second card read cycle. This energization circuit extends from the relay KCE (FIG. 4q) through normally closed contacts 24 and 25 of the counter relay KSCA, serially connected and normally closed contacts 1 and 2 of all of the program relays KPD, KPC, KPB, and KPA, now closed contacts 1 and 2 of the reader cam actuated contacts SRC2, and now closed contacts 26 and 27 of the relay KAR to the negatively energized conductor 11. Energization of the card eject relay KCE as last described effects energization of a skip clutch magnet LCSK (FIG. 4u) of the tabulating card reader. This energizating circuit extends through normally closed contacts 5 and 6 of the reader cam actuated contacts SRC1, normally closed contacts 1 and 2 of the reader cam actuated contacts SRCS1, now closed contacts 4 and 5 of the card eject relay KCE, normally closed contacts 1 and 2 of the card eject switch SE, now closed contacts 3 and 4 of the drum open contacts DOC, and now closed contacts 24 and 25 of the power relay KP to the negatively energized conductor 11. The energization of the skip clutch magnet LCSK moves the card at a high reading rate (80 card columns per second) through the reader and continues as long as the card eject relay KCE remains energized through a hold circuit which includes its now closed contacts 28 and 29, a diode rectifier CRI, the now closed contacts 3 and 4 of the drum open contacts DOC, and the now closed contacts 24 and 25 of the power relay KP to the negatively energized conductor 11. This hold energizing circuit will continue to maintain the card eject relay KCE energized both until the contacts 3 and 4 of the drum open contacts DOC open at the end of a card read operation and until the now closed contacts 1 and 3 of the off-normal contacts ONC open at a time when the reader drive drum is angularly positioned in readiness to read the zero column of the next tabulating card. At this time the skip clutch magnet LCSK and the card eject relay KCE are both deenergized and the eject operation is completed.

When the card eject relay KCE becomes energized as last described, it reverse energizes the read control relay KRC of the typewriter through a circuit which may be traced through the now closed contacts 27 and 28 of the read control relay KRC, a conductor 2, now closed contacts 7 and 8 of the card eject relay KCE, now closed contacts 4 and 5 of the power relay KP, now closed contacts 5 and 6 of both the relay KSS and the relay KSC, a jumper connection between the plugboard terminals CP and CK, the conductor 12, the normally closed contacts 3 and 4 of the delay control relay KDC-1, the normally closed contacts 23 and 24 of the card feed relay KCF, the normally closed contacts 2 and 3 of the translator seeker contacts SDC-2, the normally closed contacts 2 and 3 of the translator seeker contacts SDC-1, the now closed contacts 29 and 30 of the read control relay KRC, the normally closed contacts 26 and 27 of the relay KANP, the normally closed contacts 1 and 2 of the code selector contacts SS10, the conductor 28, the normally closed contacts 1 and 2 of the relay NP-2, the normally closed contacts 21 and 22 of the relay NP-1, the normally closed contacts 1 and 2 of the tape read switch S6, and the normally closed contacts 1 and 2 of the card read switch S7 to the negatively energized conductor 29. It will be recalled that the earlier described energizing circuit of both the feed clutch magnet LCCF and the reader clutch magnet LCMR extend through the conductor 12 and the normally open contacts 29 and 30 of the read control relay KRC, so that reverse energization of the read control relay KRC to deenergize it halts a further card feed operation which would normally take place when the 81st column contact 81S opens at the 80th column of the card (and recloses before the 81st column) to deenergize the relay KAR and close its contacts 6 and 7 through which the feed clutch magnet LCCF is energized. The energizing circuit of the read clutch magnet LCMR is also interrupted. The tabulating card reader accordingly halts operation awaiting manual correction of the fault which caused the card eject relay KCE to be energized. Manual corrective action may be by way of manual selection of a program as presently to be described or by manual reactuation of the operation of the card reader by the previously described manual operation of the card read switch S7. It is of interest to note that the reader halt operation just described, and which was premised upon the absence of a program selection code recording in the first card column, could also occur if there was data information recorded in the first card column but the information was not correct to effect energization of a program relay KPA–KPD in a manner which will now be considered.

The tabulating card reader is provided with four program relays KPA–KPD (FIG. 4v) which may be energized by manual operation of four program selection switches SPA–SPD or by an automatic operation in which a selection program code is read from the first card column. Consider at the outset the energization of a selected program relay by manual operation of the manual select switch S12 to close its contacts 2 and 3 and manual operation of one of the program selection switches SPA–SPD, each of which is of the toggle type and remains in the position to which manually set to close its contacts 1 and 2 or to close its contacts 1 and 3. Assume by way of example that the program selection switch SPA is operated to energize the program relay KPA. This energizing circuit includes the normally closed contacts 23 and 24 of a read-out relay KRO, now closed contacts 1 and 2 of the program selection switch SPA, normally closed contacts 7 and 8 of the relay KRO, contacts 2 and 3 of the selection switch S12, the normally closed contacts 1 and 2 of the off normal contacts ONC (which close just ahead of the positioning of the reader drive drum in readiness to read the zero column of the card), and now closed contacts 24 and 25 of the power relay KP to the negatively energized conductor 11.

The tabulating card reader is then placed in operation by manual operation of the card read switch S7 (FIG. 4p) to initiate a card feed cycle and two successive card read cycles as described above. The first read cycle energizes the relay KAR as earlier explained, and after transfer of the off normal contacts ONC at this time the program relay selected is maintained energized through its now closed contacts 7 and 8 and the now closed contacts 24 and 25 of the relay KAR to the negatively energized conductor 11 until the reading operation is completed upon the card in the reader at that time. As long as the program selection switch SPA remains with its contacts 1 and 2 closed, the program relay KPA will be deenergized each time the contacts 24 and 25 of the relay KAR open to initiate a new card feed cycle but will be reenergized as just described upon each completion of the feed cycle and at the first read cycle. As the reader progresses through the two card read cycles last mentioned, the counter relays KSCA and KSCB are energized in succession in the manner earlier described, but the energized state of the now energized program relay (i.e., KPA for example) causes its contacts 1 and 2 to open and this prevents the earlier described energization of the card eject relay KCE which in turn assures that this relay does not deenergize the card read control relay KRC of the typewriter. It may be noted in this instance that the relay KSCB remains energized to 30° of the second card read cycle through its contacts 1 and 2, the normally closed contacts 1 and 2 of the relay KSE, the now closed contacts 7 and 8 of the reader cam actuated contacts SRC3, and the now closed contacts 26 and 27 of the relay KAR to the negatively energized conductor 11.

Upon reading the first card column, the read-out relay KRO (FIG. 4z) is energized at 60° of the read cycle through contacts 9 and 10 of the selected program relay KPA–KPD and the closing of contacts 1 and 2 of the reader cam actuated contacts SRC2 to the energizing circuit last mentioned and which maintained the relay KSCB energized through its contacts 1 and 2. The read-out relay KRO maintains itself energized through its now closed contacts 1 and 2 "AX" (the designation "AX" indicating that the contacts 1 and 2 of this relay close before any other contacts on the relay operate) and the now closed contacts 26 and 27 of the relay KAR to the negatively energized conductor 11. The energization of the read-out relay KRO at this time effects the supply of negative energization to the card data read contact assemblies. This energization circuit extends from the negatively energized conductor 11 through the normally closed contacts 23 and 24 (FIG. 4v) of the relay KCE, the normally open contacts 1 and 2 of the reader cam actuated contacts SRC–3 while these contacts are closed between 30° and 47° of each card column read cycle, the now closed contacts 27 and 28 of the read-out relay KRO, a jumper connection between the plugboard terminals CS and CM, the now closed contacts 22 and 23 of the select card relay KSC, and either through the parallel-connected contacts 25 and 26 of the card reader contact assemblies SR0, SR4 and SR8 or the normally open and series-connected contacts 7 and 8 of the reader contact assemblies SR0, SR4, and SR8 to the common number 3 contact of all of the reader contact assemblies SR0–SR8, SR11 and SR12 as shown and by which (in conjunction with reader contact assembly SR9) the code translator clutch magnet and translator magnets of the typewriter are energized for automatic operations thereof in the same manner as described above in connection with the operation of the punched-tape reader of the typewriter. It may be noted in this respect that the read drive shaft rotates 90° in reading each card column, that the cam actuated contacts SRC2 operated by the read drive shaft enetrgize the read-out relay KRO at 60° of the first read cycle, and accordingly that the zero or blank code read from card column zero can have no effect in causing any automatic operation of the typewriter since the relay KRO is not energized soon enough in this first read cycle. However, any program or data information recorded in the first card column is transmitted to the translator magnets of the typewriter. At the time the counter relay KSCB is energized in reading the zero card column, it energizes a card-in relay KCI (FIG. 4q) through a diode rectifier CRD, now closed contacts 5 and 6 of the counter relay KSCB, now closed contatcs 4 and 5 of the relay KAR, now closed contacts 3 and 4 of the drum open contacts DOC, and now closed contacts 24 and 25 of the power relay KP to the negatively energized conductor 11. The relay KCI maintains itself energized through its now closed contacts 26 and 27 from the energizing circuit last traced, and its contacts 5 and 6 energize an indicator lamp LCI (FIG. 4t) to indicate that a card is in process of being read.

Each data code read in Hollerith code form from the tabulating card is converted by the tabulating card reader contact assemblies SR0–SR12, operating in conjunction with the diode rectifiers CR31–CR33, to the code form with which the same item of data information would be read by the tape reader of the typewriter. After this code conversion, each item of data information read from the card is supplied through the conductors 55–60, 62 and 67 to the code translator magnets LT1–LT8 or the typewriter and the translator clutch magnet LTC is concurrently energized through the conductor 13 to provide automatic print and functional control operation of the typewriter in the same manner that the latter operates under control of a punched tape read by the punched-tape reader of the typewriter. Thus an automatic non-print code and a subsequent print restore code read from a tabulating card effects automatic non-print and print restore operations of the typewriter in the same manner as previously described, and this is true of all operations of function keys of the typewriter to provide program modifications by energization of the modification selection relays KSL1–KSL4 and the energization and deenergization of the punch selection relays selectively to turn the punch unit or units ON and OFF in the same manner as previously described in connection with codes read from a punched tape.

A tabulating card space code is a blank code in the Hollerith code form. It is frequently desired to provide a brief delay each time such space code is read in a tabulating card. To this end, the delay relay KDC–1 is energized through the "delay on space" terminals R9 and R10 (jumper connected) of the typewriter, a conductor 16, the now closed contacts 28 and 29 of the card in relay KCI, a diode rectifier CR13–1, the serially connected contacts 21 and 22 of all of the card reader contacts SR0–SR12 (none of which is actuated by reason of the blank space code read at this time from the tabulating card), a conductor 12A, the now closed contacts 7 and 8 of the relay KCI, the now closed contacts 22 and 23 of the select card relay KSC, a jumper connection between the terminals CM and CS, the now closed contacts 27 and 28 of the read out relay KRO, the contacts 1 and 2 of the card reader cam actuated contacts SRC3 which are closed between 30° and 47° of the card column read cycle, and the normally closed contacts 23 and 24 of the card eject KCE to the negatively energized conductor 11. No hold circuit is established for the delay relay KDC–1, which thus remains energized only during closure of the reader cam actuated contacts SRC3. This brief energization of the delay relay KDC–1 to open its contacts 3 and 4 briefly interrupts the energizing circuit of the tabulating card read clutch magnet LCMR, as earlier described, and in this manner effects a brief delay in the reader operation.

During reading of the tabulating card, one or more tabulating card columns can be skipped by reading a skip code from the card and using this code to energize one of the function keys of the typewriter. The bridge contacts of this function key can then be plug-hub wired, with any desired qualification, to energize the hub L4 of the typewriter plugboard whereby energization is supplied through the conductor 40 and normally closed contacts 6 and 7 of a relay KSD, normally closed contacts 6 and 7 of a relay KS, normally closed contacts 3 and 4 of a relay KCE, normally closed contacts 1 and 2 of read-skip cam actuated contacts SRCS1, and normally closed contacts 5 and 6 of read cam actuated contacts SCR1 to energize the skip clutch magnets LCSK of the tabulating card reader. The energized conductor 40 also energizes the skip delay relay KSD through diode rectifiers CR15–1 and CR21–1. The relay KSD opens its contacts 6 and 7 subsequent to energization of the skip clutch magnet LCSK, and thus limits the skip operation to one card column unless continued under program control in the manner hereinafter described.

The card column reading cycles progress with continuing energization of the card read clutch magnet LCMR as previously described, and under program controls hereinafter described, until card column 80 is read. At this time the 81st column switch 81S opens to interrupt the hold circuit of the relay KAR, which circuit extends through the now closed ocntacts 28 and 29 of the latter. The card skip relay KS (FIG. 4x) is now energized at 83° of the 80th card column read cycle through the contacts 7 and 8 of the cam actuated reader contacts SRC–1, an avalanche type of diode rectifier CRAD–5,, a conductor 121, the now closed contacts 22 and 23 of the relay KCI, the normally closed contacts 3 and 4 of the relay KAR, the now closed contacts 3 and 4 of the drum open contacts DOC, and the now closed contacts 24 and 25 of the power relay KP to the negatively energized conductor 11. The energizing circuit last traced also extends through the now closed contacts 7 and 8 of the relay KS, the normally closed contacts 3 and 4 of the card eject relay KCE, the normally closed contacts 1 and 2 of the reader cam actuated contacts SRCS1, and the normally closed contacts 5 and 6 of the reader cam actuated contacts SRC1 to the reader skip clutch magnet LCSC to initiate a card skip operation by which the card is rapidly ejected into the output card hopper. During this card skip operation, the reader cam actuated contacts SRC1 (particularly its contacts 5 and 6 and its contacts 7 and 8 last mentioned) are not operated but the reader cam actuated contacts SRCS1 operate both during read and skip cycles of operation so that it is these contacts which interrupt the energizing circuit of the skip clutch magnet LCSK at 50° of the skip cycle operation. At about 85° of the 81st column in the skip operation, the contacts 3 and 4 of the drum open contacts DOC open and its contacts 5 and 6 close whereby the relays KS and KCI are both deenergized. A new card feed cycle is thereupon initiated through the contacts 1 and 2 of the feed cam actuated contacts SCH1 (FIG. 4v), the now closed contacts 5 and 6 of the drum open contacts DOC, the normally closed contacts 6 and 7 of the relay KAR, the normally closed contacts 6 and 7 of the relay KCE, the now closed contacts 4 and 5 of the power relay KP, the now closed contacts 5 and 6 of the relay KSS, the now closed contacts 5 and 6 of the relay KSC, and a jumper connection between the plugboard terminals CP and CK to the conductor 12 negatively energized in the manner previously described. This card feed cycle is followed by two automatic card read cycles to read the zero and first card column as previously described. The foregoing cycles of card feed and card read ocntinue until the last card of the input card hopper has been read by the card reader.

When the last card of the input card hopper has been read and another card feed cycle is initiated, the card-in microswitch CIC (FIG. 4v) stands with its contacts 2 and 3 closed and its contacts 1 and 2 open since no card remains in the input card hopper. Now when the contacts 1 and 2 of the cam actuated feed contacts SCH2 close during this card feed cycle, negative energization is applied from the negatively energized conductor 11 through these contacts, the now closed contacts 2 and 3 of the card-in switch CIC, and a diode rectifier CR23 to energize the card eject relay KCE. The relay KCE remains energized through its now closed contacts 28 and 29, the conductor 22, the now closed contacts 2 and 3 of the read control relay KRC, and the conductor 23 to the negatively energized conductor 11. Energization of the card eject relay KCE reverse enerigzes the read control relay KRC in the manner previously described, and the deenergization of the relay KRC halts operation of the tabulating card reader as earlier explained.

The foregoing described operation of the tabulating card reader is premised upon manual actuation of one of the program selection switches SPA–SPD to energize a corresponding one of the program relays KPA–KPD. Consider now the changed character of operation which prevails when a tabulating card selects its own program by reason of a program code recorded in the first column of the card. Contacts 1 and 2 of the reader contact assemblies SR0–SR12 (FIG. 4u) terminate at the card reader plugboard (FIG. 4aa) in the card code exit terminals J, T, $b$, $k$, $u$, AC, AM, AW, BE, BP, BY and CH as shown by the plugboard terminal designations applied to the conductors in FIG. 4u which extend from the No. 2 contact of the reader contact assemblies SRO—SR12 (through isolating diode rectifiers CR25 and CR26 associated with the respective contact assemblies SR9 and SR8). The plugboard contains program select entry hubs D, N, X, and $g$ which extend to the respective program relays KPA–KPD through normally closed contacts of the relay KRO as shown in FIG. 4v by the plugboard terminal designations applied to the conductors connected to the contacts 4, 6, 24 and 26 of the relay KRO. Jumper connections are provided between these program select entry hubs and any four of the card code exit hubs corresponding to any four program codes which may be recorded in the first column of the card and thus are read by the contacts 1 and 2 of the reader contact assemblies SR0–SR12. By way of example, FIG. 4aa shows the selection of the program relay KPA by a Hollerith numeric 2 code, the selection program relay KPB by a numeric 4 code, the selection of the program relay KPC by a numeric 6 code, and the selection of the program relay KPD by a numeric 8 code. The contact number one of all of the reader contact assemblies SR0–SR12 are energized in common through the contacts 1 and 2 of the reader cam actuated contacts SRC4, a conductor 10, and the normally closed contacts 23 and 24 of the card eject relay KCE from the negatively energized conductor 11. Thus a program selection code read in the first card column by any of the reader contact assemblies SR0–SR12 effects energization of a selected one of the program relays KPA–KPD during the interval when the contacts 1 and 2 of the reader cam actuated contacts SRC4 close from 25° to 58° of the card column reading cycle.

The program relay thus energized maintains itself energized, throughout the remainder of the individual card reading operation, through the contacts 7 and 8 of the energized relay and the now closed contacts 24 and 25 of the relay KAR (which as earlier explained remains energized in the 81st column of the card) from the negatively energized conductor 11. Further, the now closed contacts 9 and 10 of the energized program relay effect energization of the read-out relay KRO (FIG. 4z) through the contacts 1 and 2 of the reader cam actuated contacts SRC2 when these contacts close during the first column read cycle, and the relay KRO maintains itself energized during the remainder of the card reading operation through its now closed "AX" contacts 1 and 2 and the now closed contacts 26 and 27 of the relay KAR from the negatively energized conductor 11. Energization of the read-out relay KRO effects opening of its contacts 3–6 and 23–26 (FIG. 4v) to prevent energization of a second program relay during the remainder of the card reading operation even through the contacts 1 and 2 of the reader contact assemblies SR0–SR12 may be repeatedly operated to closed contact position during the reading of successive card columns. The now closed contacts 27 and 28 (FIG. 4z) of the read-out relay KRO and the contacts 1 and 2 of the reader cam actuated contacts SRC3 energize the code conversion contacts of the reader contact assemblies in the manner earlier described.

It will be apparent from the foregoing description of the automatic program selection operation that the program selected is applicable throughout the reading of the card which selected the program, and the same or a new program may be selected as each successive tabulating card is read by the tabulating card reader. The program selected at any time by energization of one of the program relays KPA–KPD is visually indicated to the operator by illumination of a corresponding indicator lamp LA–LD (FIG. 4t) energized through the normally open contacts 29 and 30 of the program relay selected.

It was earlier explained that the tabulating card reader has the physical construction shown in the aforementioned Blodgett, Ahrns and Van Buskirk applications, and includes a program cylinder having twelve replaceable program control rings each with eighty teeth corresponding to the conventional eighty card columns. The teeth of these rings cooperate with individual pairs of program contacts each of which pair is controlled between circuit-open and circuit-closed positions by a mechanical follower which engages the teeth of an associated program ring. These program contacts are shown in FIGS. 4u and 4y, are identified as SP1–SP12, and are normally maintained in open-contact position by the teeth of the associated program ring. Any tooth missing from a program ring permits the program contact pair which is associated with this ring to move to closed-contact position, and it is these open-contact and closed-contact positions of the program contacts which control the column-by-column programmed operations of the tabulating card reader. Whenever the program rings of the drums are to be replaced by other rings, a lever associated with the program drum is moved away from a position at which the lever specifically prevents change of the program rings. Movement of this lever away from the latter position lifts the mechanical followers of the program contacts SP1–SP12 out of engagement with the teeth of the program rings, and at the same time opens a pair of contacts SPDS (FIG. 4q); restoration of the lever to its original position closes the latter contacts and reengages the mechanical followers of the program contacts SP1–SP2 with the teeth of the program rings.

There are seven card reader functions which may be controlled during programmed operations of the reader. These functions include skipping of information recorded in one or more selected card columns, a skip define function which establishes the length of a skip operation initiated by a card skip code, automatic transfer under card control of reading operations from the tabulating card reader to the tape reader of the typewriter, non-print operations, the overriding of skip operations normally occurring when two successive blank columns of the card are read and which effect automatic skip out of one field and into the first column of the next field, suppression of 11 and 12 zone punching of the tabulating card, and converting zeros read from the tabulating card to space operations of the typewriter. These seven functions will now be considered in turn.

An automatic skip may be programmed by one or more program rings of the program control cylinder. The four available program relays previously described may each select a program ring associated with the automatic card skip operation, or the automatic skip operation may be programmed to be common to all cards read by the tabulating card reader. A skip operation applicable to all cards is thus a permanent skip operation, whereas one controlled by one or more selected programs is a selective skip operation applicable to only those cards which select the particular program. By way of illustration of the skip operation, assume that it is desired to program an automatic skip from card column 10 through card column 20 and also from card column 50 through card column 60. The assigned program ring is coded by removing its teeth from the corresponding column positions 10 through 20 and 50 through 60. These removed teeth will effect the desired automatic skip operations, which will occur during non-print and tape skip modes of operation as well as during normal reading operations. When a program ring, which is controlling a skip operation through the eighthieth card column, from a given column through the eighthieth card column, a card eject cycle will result when the first missing tooth of this series is sensed. If such card eject cycle occurs during a non-print or tape skip mode of operation and if a card feed cycle immediately follows, the same non-print or tape skip condition will continue until terminated in a normal manner.

The automatic skip operation thus is initiated by missing teeth of a program ring associated with one of the pairs of program drum contacts SP1–SP12. All of the latter have their No. 2 contacts energized in common through the normally closed drum-lever-operated contacts SPDS, normally closed contacts 21 and 22 of a relay KCE, and either of two energizing circuit branches: the first of these is usually effective and includes a diode rectifier CRI, a conductor 22, the now closed contacts 2 and 3 of the read control relay KRC, and a conductor 23 to the negatively energized conductor 11; the second of the energizing circuit branches completes a prolonged skip even though the read control relay KRC might become deenergized while the skip operation is in process and includes the normally open but now closed contacts 3 and 4 of the drum open contacts DOC (which are closed when a card is positioned in the taaulating card reader in readiness to be read), and the now closed contacts 24 and 25 of the power relay KP to the negatively energized conductor 11. Thus when a missing tooth of a skip program ring is sensed by the associated one of the program drum contacts SP1–SP12, a corresponding one of the program ring exit hubs A K U c m v, AD, AN, AX, BF, BR or BZ is energized, and this energized exit hub is connected by a jumper wire either to the all-program skip entry hub E or one of the program skip entry hubs B, F, C or H. Assume for example that the skip operation is controlled by either of two program rings associated with the drum contacts SP12 or SP0 and is to take place during energization of either of the program relays KPA or KPC or either of the program relays KPB or KPD as shown by the plugboard wiring of FIG. 4aa. Consider by way of particular example the energization of the program drum contacts SP12 which will then be supplied by pulgboard wiring from the program ring exit hub A to skip hubs B and C, and will be translated by the now closed contacts 11 and 12 of the program relay KPA or KPC and through the normally closed contacts 7 and 8 of reader cam actuated contacts SRC1 to energize a skip relay KS. The program skip relay KS is maintained energized only by missing teeth on the particular program ring which initiated the skip operation, and accordingly remains energized only while such teeth are missing in succeeding card column to be skipped.

The energizing circuit last traced for the skip relay KS also effects energization of the skip clutch magnet LCSK (FIG. 4u) through normally closed contacts 5 and 6 of the reader cam actuated contacts SRC1, normally closed contacts 1 and 2 of the reader cam actuated read-skip contacts SRCS1, normally closed contacts 3 and 4 of the relay KCE, now closed contacts 7 and 8 of the skip relay KS and a conductor 121 to the energizing circuit of the skip relay KS. Thus energization of the skip relay KS is accompanied by concurrent energization of the skip clutch magnet LCSK to effect skipping of each individual card column for which there is a tooth missing on the program ring concerned. As explained in the aforementioned copending applications relating to the physical construction of the tabulating card reader, the skipping of card columns under control of the skip clutch magnet LCSK occurs at the much higher reading rate of 80 card columns per second in contrast to the normal reading of tabulating card columns at 572 columns per minute under control of the read clutch magnet LCMR as previously described.

Automatic skipping of one or more card columns may also be controlled by a card skip code sensed in the card during normal read operations or a corresponding skip code sensed in the tape reader of the typewriter. When a skip code is read by the card reader, it is converted to a tape code and is applied to the translator magnets of the typewriter to operate one of the function keys thereof. Code selector bridge contacts operated by this function key is plugboard wired to energize terminal L4 of the typewriter plugboard and thus energize the skip define relay KSD (FIG. 4u) through the conductor 40, a diode rectifier CR21–1, and a diode rectifier CR15–1 while concurrently energizing the skip clutch magnet SCSK through the normally closed contacts 6 and 7 of the relay KSD, the normally closed contacts 6 and 7 of the relay KS, the normally closed contacts 3 and 4 of the relay KCE, the now closed contacts 1 and 2 of the skip-read cam actuated contacts SRCS1, and the normally closed contacts 5 and 6 of the read cam actuated contacts SRC1. One card column is thereupon skipped by energization of the skip clutch magnet SCSK, but energization of the relay KSD to open its contacts 6 and 7 prevents a second card column skip operation by this energization of the conductor 40 from the typewriter.

This energization circuit of the skip define relay KSD includes a series circuit comprised by a resistor R3 and a condenser C2, which discharges its condenser C2 during the energized interval of the conductor 40 and thereafter recharges its condenser C2 through the operating winding of the skip define relay KSD and the diode rectifier CR15–1 to maintain the relay KSD energized for a period long enough to read the next column of the tabulating card if the tabulating card reader itself read the skip code. The purpose of maintaining the relay KSD energized to the next tabulating card column is to ascertain whether a program ring (for example, and as shown in FIG. 4aa, that associated with the drum contacts SP11 or SP1) has a tooth missing at a position corresponding to the next column and, if so, whether this program ring is assigned by an operative program (i.e. to programs A or C for drum contacts SP11 or programs B or D for drum contacts SP1) to a skip define function to maintain the relay KSD energized through the diode rectifier CR16–1, the now closed contacts 9 and 10 of the relay KSD, and the now closed contacts 13 and 14 of one of the program relays KPA–KPD (or the "ALL" conductor) energized at this time by plug-hub wiring to a program ring exit hub of one of the program drum contacts SP1–SP12 (i.e. SP1 or SP11) associated with the assigned skip define function ring. If the relay KSD is so maintained energized by a skip define function, skipping of one or more successive card columns will continue by continued energization of both the relay KSD and the skip clutch magnet SCSK (through the new closed contacts 7 and 8 of the relay KSD) as long as teeth are missing from the skip define program ring concerned. Thus the length of the card or tape initiated skip is determined by programming of the program control cylinder, accomplished by assigning one of the program rings to the skip define function and by wiring the associated program drum exit hub to one of the skip define entry hubs L, P, R, M, S. Several program rings, each assigned to a separate program, can be similarly assigned by plugboard wiring to the skip define function. The normally closed contacts 23 and 24 of the skip define relay KSD are included in the previously described energizing circuit of the card read clutch magnet LCMR, so that normal reading halts during the skip operation. The skip operation will terminate and data reading will begin again on the card column following the last missing tooth on the program ring assigned to the skip define function. A tooth need not be missing on the program ring at the position corresponding to the card column in which the skip code is read. However, the program ring must have a missing tooth in the next column position or no further skip will occur. A skip code will cause card eject when a program ring assigned to the skip define function has missing teeth from that point through card column No. 80.

In preparation to consider the blank skip OFF operation which may be programmed, it will be helpful first to consider a programmed blank skip operation which begins when two consecutive blank columns are read in the tabulating card. The blank skip operation is often desirable in connection with a left justified field of the tabulating card, such as one recording the name and address of a customer. As such, the tabulating card field will have enough columns to accommodate the entry which contains the largest number of characters. When fields are read which contain less than the maximum number of characters, the blank column skip operation will enable automatic skipping of the reading operation out of that particular field and into the first column of the next field.

In the blank skip operation, a first blank column will initiate the earlier described sequential energization of the counter relays KSCA and KSCB. The second blank column when read effects energization of the skip define relay KSD (FIG. 4u) through the normally closed contacts 21 and 22 of the counter relay KSCA, the now closed contacts 3 and 4 of the counter relay KSCB, normally closed contacts 1 and 2 of a blank skip OFF relay KBSO, now closed contacts 9 and 10 of the relay KAR, a diode rectifier CR14-1, the series-connected contacts 21 and 22 of the card reader contact assemblies SR0–SR12, a conductor 12A, now closed contacts 7 and 8 of the card-in relay KCI, now closed contacts 22 and 23 of the select card relay KSC, a jumper connection between the plugboard terminals CM and CS, now closed contacts 27 and 28 of the read out relay KRO, contacts 1 and 2 of the reader cam actuated contacts SCR3 when these contacts close at 30° of the card column read cycle, and normally closed contacts 23 and 24 of the card eject relay KCE to the negatively energized conductor 11. The skip define relay is not maintained energized after the energizing circuit last traced is interrupted by the contacts 1 and 2 of the reader cam actuated contacts SRC3 at 47° of the column read cycle unless such continued energization is supplied through the diode rectifier CR16-1, the now closed contacts 9 and 10 of the relay KSD, the closed contacts 13 and 14 of one of the program relays KPA–KPD (or the "ALL" conductor) and a plugboard jumper connection between the appropriate one of the skip define entry hubs L, R, M, S and P and an energized one of a program exit hubs of one of the program drum contacts SP1–SP12 operated to closed contact position by a missing tooth from a program ring assigned to the skip define function. Since the skip clutch magnet LCSK has its energizing circuit interrupted by opening of the contacts 5 and 6 of the reader cam actuated contacts SCR1 at 15° of the column read cycle during which the skip define relay KSD was energized, and since the skip magnet energizing circuit is not recompleted until 83° of the column read cycle after the skip define relay contacts 6, 7 and 8 have transferred, no skip operation occurs even though two consecutive blank columns are read from the tabulating card unless the skip define relay KSD is maintained energized by an assigned skip define program ring selected at this time by an operated one of the program relays KPA–KPD. If the skip operation takes place, it will continue as long as teeth are missing from the program ring thus assigned to the skip define function.

Whenever the blank skip operation just described is undesirable, as when it is otherwise applicable to all programs, it may be programmed to be non-operative. For this purpose, one or more of the program rings is or are assigned to the blank skip OFF function and is or are selected by energization of one or more of the program relays KPA–KPD. For example, and as illustrated in FIG. 4aa, the blank skip OFF function is rendered effective during programs A and B under control of a program ring associated with the drum contacts SP4 and also during programs C and D under control of a program ring associated with the drum contacts SP7. Each such program ring is coded by removing a tooth from each card column position where the blank column skip is not desired. Blank skip OFF control is applicable to either or both of the two consecutive blank columns read from the tabulating card. The blank skip OFF function is accomplished by energization of the blank skip OFF relay KBSO (FIG. 4q) through the closed contacts 25 and 26 of a selected program relay KPA–KPD (or by energization of the "ALL" conductor), plug-hub wiring of a corresponding blank skip OFF entry hub n, p, r, s and t to one of the program ring exit hubs corresponding to the program drum contacts SP1–SP12 which are operated to closed contact position by the blank skip OFF program ring assigned to this function. Energization of the blank skip OFF relay KBSO opens its contacts 1 and 2 (FIG. 4) to interrupt the energizing circuit of both the counter relays KSCA and KSCB, thus preventing energization of the skip define relay KSD (FIG. 4u) through the normally open contacts 3 and 4 of the counter relay KSCB. The blank skip off relay KBSO is maintained energized through its now closed contacts 3 and 4, the normally closed contacts 21 and 22 of the relay KSD, the normally closed contacts 23 and 24 of the relay KS and the contacts 5 and 6 of the reader cam actuated contacts SRC–2 until 60° of the column read cycle when the latter contacts open and thus interrupt the hold energizing circuit. The blank skip OFF relay KBSO will also remain energized as long as there are teeth missing from the program ring assigned to the blank skip column OFF function of the particular program to maintain is closed contact position the associated program drum contacts SP1–SP12. The blank skip OFF function thus may be programmed to prevent undesirable blank column skip as, for example, when two consecutive blank columns are read preceding the highest significant digit of a right-hand justified field of a numeric quantity.

The zero-to-space function enables conversion of zeros, placed to the left of significant digits in a numeric field, to spaces. This is accomplished by assigning one or more of the program rings to the zero-to-space function, and by plug-hub wiring a program ring exit hub corresponding to the assigned program ring to a zero-to-space entry hub associated with a particular program (or to the "ALL" entry hub applicable to all programs). For example, and as shown in FIG. 4aa, the zero-to-space operation may be plugboard wired to take place during each of programs A, B and C under control of the program ring associated with the drum contacts SP6 and to take place during program D under control of the program ring associated with the drum contacts SP8. Thus as here indicated, several program rings can be assigned to the zero-to-space function, each assigned to a separate program. Program rings are coded by removing teeth from the card column positions which correspond to the card field in which zero-to-space conversion is desired. In a field so defined, a zero punch read in the first card column of that field will be ignored, thus resulting in the output of a space code to the typewriter. Zero-to-space conversion will continue in the defined field until a card column is read which contains a coded numeric digit, or the conversion will continue until the end of the defined field is sensed. When a coded digit is sensed, the digit will read out in normal manner and normal reading will then take place through the remainder of the field. Zero-to-space conversion will occur during the non-print mode of operation as well as during normal card reading.

The zero-to-space operation involves the energization of a zero-to-space relay KZS and a zone relay KZ. The zero-to-space relay KZS (FIG. 4q) is energized through normally closed contacts 1 and 2 of the relay KZ, now closed contacts 31 and 32 of the energized one of the program relay KPA–KPD (or the "ALL" conductor), and plug-hub wiring from a corresponding program zero-to-space function entry hub AY, AZ, BB, BC and BD to a program ring exit hub of one of the program drum contacts SP1–SP12 corresponding to the zero-to-space program function ring concerned. The relay KZS closes its contacts 4 and 5 to energize the zone relay KZ through a diode rectifier CRH from the energizing circuit of the relay KZS last traced. The interruption of the relay KZS energizing circuit by the now open contacts 1 and 2 of the relay KZ requires that the relay KZS thereafter be maintained energized through its now closed contacts 24 and 25, a diode rectifier CR12-1, and the contacts 5 and 6 of the reader cam actuated contacts SRC3 (to 30° of the column read cycle) from the energizing circuit last traced. If the card column read has a zero zone bit in it to close the contacts 9 and 10 (FIG. 4q) of the reader contact assembly SRO (which contacts close just ahead of 25° of the column read cycle), energization continues to be supplied to the zero-to-space relay KZS through its now closed contacts 24 and 25, a diode rectifier CR11–1, now closed contacts 9 and 10 of the reader contact assembly SRO, contacts 1 and 2 of the reader cam actuated contacts SRC4 which close at 25° of the column read cycle, a conductor 10, and the normally closed contacts 23 and 24 of the card eject relay KCE to the negatively energized conductor 11. The energizing circuit last traced maintains the relay KZS energized until the contacts 5 and 6 of the reader cam actuated contacts SRC3 close again at 47° of the column read cycle and thereby hold the relay KZS energized to the next column read cycle. The zero-to-space relay KZS has transfer contacts 1, 2 and 3 (FIG. 3s) associated with contacts 3 and 4 of the reader contact assembly SRO as shown; while the zero-to-space relay KZS remains energized, its contacts 2 and 3 cause contacts 3 and 4 of the reader contact assembly SRO to energize the five-bit conductor 59 to the code translator of the typewriter and the five-bit code thus created is interpreted by the code translator as a space code to effect the zero-to-space conversion. When the next numeric digit having a value other than zero is read, the zero-to-space relay KZS is no longer maintained in energized state by reason of the opening of the contacts 5 and 6 of the read cam actuated contacts SRC3 at 30° of the column read cycle and by reason of the now open state of the contacts 9 and 10 of the reader contact assembly SRO. The now closed contacts 1 and 2 of the relay KZS thereafter cause any closure of the contacts 4 and 5 of the reader contact assembly SRO to energize the output conductor 60 and thus apply a six code bit to the translator of the typewriter.

The zone relay KZ remains energized to completion of the numeric field through a rectifier CRG, the now closed contacts 4 and 5 of the relay KZ, normally closed contacts 21 and 22 of the relay KSD, normally closed contacts 23 and 24 of the relay KS, contacts 5 and 6 of the reader cam actuated contacts SRC-2 (which open at 60° of the column read cycle and thus hold the relay energized to 60° of such cycle), normally closed contacts 21 and 22 of the relay KCE, now closed contacts 3 and 4 of the drum open contacts DOC, and now closed contacts 24 and 25 of the power relay KP to the negatively energized conductor 11. The zone relay KZ also continues to remain energized through the diode rectifier CRH, and the now closed contacts 2 and 3 of the relay KZ from the energizing circuit which originally energized the zero-to-space relay KZS through the contacts 31 and 32 of a selected program relay KPA-KPD or the "ALL" conductor, so that the zone relay KZ remains energized through this original energizing circuit so long as teeth are missing from the zero-to-space program ring concerned and which thereby defines the numeric field over which the zero-to-space function is to prevail. Thus while energization of the zero-to-space relay KZS as just described effects conversion of all zeros to spaces preceding the first significant digit of a numeric field, the relay KZ remains energized under program control to define the length of the numeric field as specified by missing teeth of the zero-to-space program ring concerned and over which the zero-to-space function cannot be reinitiated by reenergization of the zero-to-space relay KZS (which reenergization is prevented by the then open contacts 1 and 2 of the zone relay KZ).

The suppress 11-12 program function is frequently desirable in connection with numeric fields of a tabulating card in which one or more numeric digit columns are often conventionally overpunched with an eleven or a twelve zone punch to indicate that the information in that field is either a debit or a credit. To guard against erroneous interpretation of the overpunched columns by the tabulating card reader, it is possible to suppress reading of the eleven or twelve zone punches. To this end, one or more of the program control rings are assigned to the suppress 11-12 function and the program drum contacts SP1-SP12 corresponding to these rings are plug-hub wired from the corresponding program ring exits to the program controlled suppress 11 and 12 entry hubs AE, AF, AK, AL or the all-program entry hub AJ. For example, and as shown in FIG. 4aa, this function may be plugboard wired to take place during each of programs B, C and D under control of a program ring associated with the drum contacts SP9. When a missing tooth is sensed on the program ring so assigned, the tabulating card reader will read only the numeric valued rows 0-9 of the corresponding card column and will ignore punches in the 11th and 12th zone rows thereof. Such zone punch suppression will occur during non-print or the tape skip mode of operation, as well as during normal reading. The suppress 11-12 function is initiated by energization of the alpha suppress relay KAS (FIG. 4q) through contacts 27 and 28 of an energized one of the program relays KPA-KPD (or the "ALL" conductor) and the previously mentioned plug-hub wiring from the suppress 11 and 12 entry hubs to the program ring exits energized by closure of the contacts 1 and 2 of the program drum contacts SP1-SP12 associated with the program ring concerned. The alpha suppress relay KAS is maintained energized by all succeeding missing teeth on the program ring concerned. On the last column at which 11-12 suppression is to occur, the alpha suppress relay KAS is maintained energized through its now closed contacts 4 and 5, normally closed contacts 21 and 22 of the relay KSD, normally closed contacts 23 and 24 of the relay KS, contacts 5 and 6 of the reader cam actuated contacts SRC-2 until these contacts open at 60° of the column read cycle, normally closed contacts 21 and 22 of the relay KCE, now closed contacts 3 and 4 of the drum open contacts DOC, and now closed contacts 24 and 25 of the power relay KP. While the alpha supress relay KAS is energized, its contacts 1 and 2 (FIG. 4s) interrupt the energizing circuit which extends through the energized conductor 53 to the contact pair 3 and 4 and the contact pair 5 and 6 of the reader contact assembly SR12 and to the contacts 5 and 6 of the reader contact assembly SR11. The transfer contacts 21-23 (FIG. 4w) of the alpha suppress relay KAS provide, as between the energized and deenergized state of this relay, changes in the electrical interconnections between the reader contact assemblies SR0, SR8 and SR11 to change the manner with which the reader contact asemblies of the tabulating card reader convert the Hollerith tabulating code form to the five-code-bit supplied to the code translator of the typewriter. The effect of the tabulating card reader assembly contact controls provided by the energized state of the alpha suppress relay KAS is to convert what would otherwise be an alphabetic Hollerith code employing the eleven and twelve zone code bits to an Hollerith numeric code employing only the zero through nine code bits and thus suppress the eleven and twelve zone punchings read from the tabulating card.

Non-print functions can also be programmed in the tabulating card reader by which designated columns of a tabulating card can be read in an automatic non-print character of operation. This is accomplished by assigning one or more of the program rings to the non-print function applicable with respect to all programs or selectable according to selective programs. Here again the program ring exit hubs of the program drum contacts SP1-SP12 associated with the non-print program rings are plug-hub wired to non-print entry hubs d, f, h, i, j as, for example, in the manner shown in FIG. 4aa. The assigned program rings are coded by removing teeth from those positions which correspond to the card columns that are to be read in a non-print character of operation. This non-print programmed operated effects energization of a non-print relay NP-1 (FIG. 4t) and concurrent energization of the delay control relay KDC. At the outset of this operation, the relay KSE is energized at 55° of the column read cycle through the contacts 1 and 2 of the reader cam actuated contacts SRCS-2, a diode rectifier CRB, the normally closed contacts 1 and 2 of the non-print relay NP-1, normaly closed contacts 1 and 2 of the relay KSD, normally closed contacts 21 and 22 of the relay KS, now closed contacts 33 and 34 of one of the energized program relays KPA–KPD or the "ALL" conductor, plug-hub wiring between the non-print hubs and the program ring exit hubs of the plugboard, and the now closed contacts 1 and 2 of one of the program drum contacts SP1–SP12 associated with the non-print program ring. The relay KSE remains energized to the next card column by energization supplied through a diode rectifier CR31–1, the now closed contacts 24 and 25 of the relay KSE, and resistor R2 from the energy stored in a previously charged capacitor C3.

The contacts 21 and 22 of the relay KSE thereupon open to interrupt the earlier traced energizing circuit of the card reader read clutch magnet LCMR and thus temporarily halt the card reading operation. The delay control relay KDC is also energized at this time through a diode rectifier CRF, the now closed contacts 4 and 5 of the relay KSE, and the now closed contacts 11 and 12 of the relay KSC from the energizing circuit of the relay KSE. The contacts 21 and 22 of the delay control relay KDC also interrupt the energizing circuit of the read clutch magnet LCMR, and the delay relay KDC remains energized through the diode CRF and its now closed contacts 4 and 5 from the energizing circuit of the relay KSE. Prior to the time the delay relay KDC is energized, its normally closed contacts 1 and 2 effect storage of energy in a capacitor C4 through a resistor R4 from the negatively energized conductor 11. Upon energization of the delay relay KDC, its transfer contacts 2 and 3 close to maintain the relay KSE energized for approximately 110 to 120 milliseconds by discharge of the capacitor C4 through the resistor R4, a resistor R9, and the relay winding. At the end of the latter interval, the relay KSE becomes deenergized to close its contacts 3 and 4 and thus energize the non-print relays NP–1 and NP–2 through the now closed contacts 8 and 9 of the delay relay KDC, the normally closed contacts 3 and 4 of the relay KSE, and the now closed contacts 11 and 12 of the card select relay KSC from the energizing circuit of the KDC relay. The contacts 4 and 5 of the non-print relay NP–1 now close and apply negative energization from the conductor 11 (1) through the now closed contacts 4 and 5 of the relay NP–2 to maintain the latter energized and (2) through the conductor 80 to energize the non-print relays KNP1 and KNP2 of the typewriter to initiate the non-print operation. This energization is also supplied through the now closed contacts 24 and 25 of the delay control relay KDC to reverse-energize it causing it to release. The contacts 21 and 22 of the delay control relay KDC return to their normally closed position to complete the energizing circuit of the read clutch magnet LCMR through the now closed contacts 21 and 22 of the relay KSE, thereby to effect resumed card reader operation. The halt of the reader operations during the energized period of the delay control relay KDC provides an adequate time delay within which to effect transfer of the contacts of the non-print relays KNP1 and KNP2 of the typewriter.

The non-print relay NP–1 is maintained energized through a diode rectifier CRJ, the now closed contacts 2 and 3 of the non-print relay NP–1, the normally closed contacts 1 and 2 of the relay KSD, the normally closed contacts 21 and 22 of the relay KS, and the contacts of the energized program relay KPA–KPD and plug-hub wiring to the energizing program drum contacts SP1–SP12 as long as the latter are operated to closed contact position by the absence of teeth from the non-print program ring concerned. Restoration of normal printing therefore occurs when the program ring teeth once more are present on the program ring concerned and thereby effect opening of the contacts of the associated program drum contacts SP1–SP12 to deenergize the relay NP–1 and thus effect deenergization of the relay NP–2 and the non-print relays KNP1 and KNP2 controlled by the relay NP–1. In this, the non-print relay NP–1 remains energized through a diode rectifier CRK, the now closed contacts 24 and 25 of the relay NP–1, the normally closed contacts 21 and 22 of the relay KSD, the normally closed contacts 23 and 24 of the relay KS, and the contacts 5 and 6 of the reader cam actuated contacts SRC–2 until these contacts open at 60° of the column read cycle. The non-print relays KNP1 and KNP2 remain energized for a short delay interval by continued energization supplied to these relays through the now closed contacts 10 and 11 of the relay KNP1, a diode rectifier CR20, and the contacts 1 and 2 of the translator cam-actuated contacts STC–4 which remain closed until 344° of the prevailing translator cycle.

Reading operations may be transferred back and forth between the tape reader of the typewriter and the automatic card reader. Automatic transfer of reading operations from the tape reader to the card reader is effected upon reading a switch code by the tape reader. Automatic transfer of reading operations from the card reader to the tape reader may be accomplished by program control at preselected card columns defined by program rings of the program drum and effective with respect all programs or according to any of the four available selective programs. Automatic transfer of reading operations from the card reader to the tape reader may also be accomplished by reading a switch code recorded in a tabulating card. This automatic transfer type of reading operation is conveniently referred to as "duplex" operation of the readers and requires manual actuation of a duplex switch SD (FIG. 4w) to close its contacts 1 and 2. This switch is of the toggle type and accordingly will remain in the position to which it is manually actuated with its contacts 1 and 2 open for non-duplex operation or closed for the duplex type of operation. The energized and deenergized states of the relay KSS (FIG. 4w) earlier considered signify which reader has been selected for operation. Thus the normally closed contacts 21 and 22 of this relay energize tape read lamps TRL (FIG. 4w) and TRL' (FIG. 4m) at the respective tabulating card reader unit and at the typewriter to indicate an operative state of the tape reader, while the normally open contacts 22 and 23 of the relay KSS similarly energize card read lamps CRL (FIG. 4w) and CRL' (FIG. 4m) to indicate the operative state of the tabulating card reader.

Consider first the program controlled automatic transfer of reading operation from the tabulating card reader to the taper reader. The program rings assigned to the automatic transfer or "switching" function have teeth missing at those card columns where automatic transfer of reading operations is desired. The program drum contacts SP1–SP12 associated with these program rings are plug-hub wired from their associated program ring exit hubs to the entry switch hubs V, W, Y, X and a as in the plugboard wiring example shown in FIG. 4aa. When the contacts 1 and 2 of the program drum contacts SP1–SP12 sense a missing tooth on an associated program ring assigned to the switch function, energization is applied through the program drum contacts and the plug-hub wiring between the program ring exit hubs and switch entry hubs, through now closed contacts 5 and 6 of one of the energized program relays KPA–KPD (or the "ALL" program conductor), through the normally closed contacts 1 and 2 of the relay KS, through a diode rectifier CRA, and through the contacts 1 and 2 of the reader cam actuated contacts SRCS–2 to energize the relay KSE. The contacts 21 and 22 of the latter open to interrupt the earlier described energizing circuit of the read clutch magnet LCMR. The card reader operation is thereupon halted, and the energizing circuit of the relay KSE is extended through the now closed contacts 26 and 27 of the relay KSE, the now closed contacts 29 and 30 of the relay KSS, a diode rectifier CR55, the normally closed contacts 3 and 4 of the relay KSD, a jumper connection between the plugboard terminal CR and the plugboard terminal CL, the now closed contacts 1 and 2 of the duplex switch SD, the now closed contacts 25 and 26 of the relay KSC, and the now closed contacts 27 and 28 of the relay KSS to reverse-energize the relay KSS and thus effectively deenergize it. The relay KSC is maintained energized at this time by an energizing circuit which extends from terminal 2 of the duplex switch SD through the now closed contacts 25 and 26 of the relay KSC, and a diode rectifier CR5–1 to the relay KSC. While the relay KSS is being deenergized in the manner just explained, the relay KSE is maintained energized through the resistor R9, a diode rectifier CR46, the now closed contacts 29 and 30 of the relay KSS, and the now closed contacts 26 and 27 of the relay KSE from the previously described energizing circuit which caused energization of the relay KSE. Thus when the relay KSS becomes deenergized in the manner just explained, its contacts 29 and 30 open to interrupt the hold energizing circuit last described and the relay KSE thereupon is deenergized. It was earlier explained that the energizing circuit which extended to the duplex switch SD from the jumper connection between the plugboard terminals CL and CR included the normally open but then closed contacts 29 and 30 of the relay KSS, and that this energizing circuit maintained the relay KSC energized; thus the latter relay becomes deenergized when the relay KSS is deenergized and opens its contacts 29 and 30. With both of the relays KSS and KSC thus deenergized, the contacts 10 and 11 of the relay KSS and the contacts 4 and 5 of the relay KSC close to reestablish the energizing circuit of the reader clutch magnet LRC of the tape reader and the latter thereupon resumes its reading operations. The card reader operation remains halted by the now open contacts 5 and 6 of the relay KSS, which transfers the earlier described energizing circuit of the card read clutch magnet LCMR to and through the normally closed contacts 1 and 2 of the relay KCE, the now closed contacts 24 and 25 of the card-in relay KCI, and the conductor 9 to the now open contacts 23 and 24 of the relay KAR which interrupt the energizing circuit of the card read clutch magnet.

When the tape reader of the typewriter reads a switch code such as code 2–3–4 effecting operation of the typewriter function key F9, the translator slide of this key operates the code selector bridge contacts SB76 and it is here assumed that these bridge contacts are plug-hub wired to apply negative energization from the plugboard hub G9 through an isolating diode rectifier CRW to the plugboard entry hub L1 which energizes the conductor 31 through the now closed contacts 7 and 8 of the read control relay KRC. The conductor 31 extends through a jumper connection between the card reader plugboard terminals CR and CL, and the negative energization of the conductor 31 is thus applied through the now closed contacts 1 and 2 of the duplex switch SD, the now closed contacts 24 and 25 of the relay KSC, and the diode rectifier CR4–1 to energize the relay KSS. The latter thereupon maintains itself energized through the diode 42, the resistor R14, and its now closed contacts 22 and 23 directly from the negatively energized conductor 11. As previously described, the now closed contacts 22 and 23 of the relay KSS normally tend to energize the relay KSC through the diode rectifier CR43, but the relay KSC cannot be thus energized by reason of the large voltage drop produced across the resistor R7 by current flow through the diode rectifier CRAD-2 to the negatively energized circuit extending through the normally closed contacts 24 and 25 of the relay KSC and the now closed contacts 1 and 2 of the duplex switch SD to the conductor 31. When the selector bridge contacts SB76 open near the end of the tape reader cycle, however, negative energization is removed from the conductor 31 and this permits the relay KSC to be energized by the previously described energizing circuit extending through the now closed contacts 22 and 23 of the relay KSS. The contacts 4 and 5 of the relay KSC and the contacts 10 and 11 of the relay KSS open to halt the tape reader by interrupting the energizing circuit of its read clutch magnet LRC, and the contacts 5 and 6 of the relay KSS and the contacts 5 and 6 of the relay KSC are now closed to complete the energizing circuit of the card read clutch magnet LMCR. The tabulating card reader thereupon resumes reading operations which start either with a card feed cycle as earlier described if no tabulating card is in reading position in the reader or with a column read cycle if a taubulating card is in reading position in the reader.

If during operation of the tabulating card reader a switch code is read from a tabulating card, a function key such as the key F9 is operated with resultant operation of the code selector bridge contacts SP76 once more to energize the conductor 31 through the now closed contacts 7 and 8 of the read control relay KRC as just above described. The resulting transfer of the reading operation from the tabulating card reader to the tape reader is precisely the same as that just described as occurring when the tape reader itself read a switch code.

In respect the transfer of reading operations just described, suppose that a program ring establishes a non-print condition at a card column in which a switch code is recorded. The reading operation is immediately transferred to the punched tape reader with halt of tabulating card reading, and the program drum contacts associated with the non-print ring supply energization through the contacts 33 and 34 of the program relay selected at this time, through normally closed contacts 21 and 22 of the relay KS, normally closed contacts 1 and 2 of the relay KSD, now closed contacts 10 and 11 of the select card relay KSC, and the normally closed contacts 8 and 9 of the relay NP–2 to energize the delay control relay KDC. The latter then remains energized through a diode rectifier CRF and its now closed contacts 4 and 5 from the energizing circuit last traced. Thus when the punched tape reader subsequently reads a switch code, the transfer of reading operation to the tabulating card reader provides a delay and no further delay is needed so that the relay KDC stands energized in readiness to energize through its now closed contacts 8 and 9 the non-print relays NP–1 and NP–2 as soon as the contacts 11 and 12 of the relay KSC again close. Accordingly, the tabulating card reader resumes reading operation in the non-print mode.

The blank skip OFF, suppress 11 and 12, and zero-to-space functions described above may be combined in many applications since any two or all of these three functions can often be effective in the same card fields. The card reader plugboard is therefore provided with double electrically-connected entry hubs for each of these three functions as shown. Accordingly, any two or three of these function entry hubs can be plug-hub wired in the same applicable program (i.e. in any of programs A, B, C or D or in all programs) and this interconnected group of entry hubs may then be plug-hub wired to a selected program ring exit hub which will then control the combined functions concurrently. For example, entry hub BC can be jumper connected to entry hub AU, entry hub AK can be plug-hub wired to entry hub AA, and entry hub s can then be wired to program ring exit hub m to effect concurrent blank skip OFF, suppress 11 and 12, and zero-to-space functions during selection of program B.

It is also possible to code the program drum rings so that automatic non-print and reader switching functions are accomplished at the same card column. In this instance, programmed transfer of the reading operations to the tape reader occurs in normal manner, and tape codes are read in a normal fashion and not in a non-print condition. Now when a switch code in the tape reader causes return of the reading operations to the tabulating card reader, the first card column read (the one at which the switch and non-print function appeared, will be read in a non-print condition. In similar fashion, it is possible to code the program control drum rings so that automatic skip and reader switching functions are effected at the same card column. In this instance, transfer of reading operations to the tape reader will occur in a normal manner and simultaneously a card skip operation will occur under control of the program control drum.

In the duplex mode of operation last described, manual actuation of the typewriter start read switch MS3 (FIG. 4m) will cause the reader last in operation to start reading. For this purpose, a jumper connection is completed between the plug hubs R5 and R6 of the typewriter plugboard so that manual operation of the start read switch MS3 effects energization of the read control relay KRC through the diode rectifier CR11 and the normally closed contacts 23 and 24 of the manual non-print relay KMNP. If the tabulating card reader was the last to operate, its relay KSS will remain energized as will its relay KSC if this relay was energized at the time the card reader operations were halted by deenergization of the read control relay KRC. Thus the energized states of one or both of the relays KSS and KSC will interrupt the previously described energizing circuit of the tape reader clutch magnet LRC, and reenergization of the read control relay KRC will accordingly initiate operation of the tabulating card reader. If the tape reader was the last to operate, the card reader relays KSS and KSC are both deenergized and their deenergized states complete the energizing circuit of the tape read clutch magnet LRC. At the same time, the card reader relay KAR is also deenergized to intetrrupt the previously described energizing circuit of the card read clutch magnet LCMR so that reenergization of the read control relay KRC accordingly initiates operation of the tape reader.

If the tabulating card reader is operation or was the last to operate, its relays KSS and KSC are energized and manual operation of the tape read switch S6 (FIG. 4p) to close its contacts 2 and 3 applies negative energization through a jumper connection between the card reader plugboard terminals CF and CB to reverse-energize the relay KSS through its now closed contacts 27 and 28. At the same time, this reverse-energization circuit maintains the relay KSC energized through the diode rectifier CR5-1. Upon release of the tape read switch S6, the energization of the relay KSC through the reverse-energizing circuit last described is terminated and the normal energization of the relay KSC is now interrupted by the now open contacts 22 and 23 of the relay KSS. The relay KSC thereupon becomes deenergized, and read operations are transferred to the tape reader in the same manner as previously described in connection with the reading of a switch code by the tabulating card reader.

In the duplex mode of operation of the tabulating card and tape readers, manual actuation of the typewriter non-print switch MS2 (FIG. 4f) will cause its function to occur during the operation of either reader. By completing a jumper connection between the plug hubs R7 and R8 of the typewriter plugboard, manual operation of the tape skip switch MS5 (FIG. 4m) to energize the skip control relay KCS will cause the tape skip function to occur during operation of either reader according to the skip operation previously described. When a manual non-print or tape skip operation is desired in a reader other than the one that was last in operation, the card read switch S7 (FIG. 4p) or the tape read switch S6 is manually actuated and maintained in actuated position while either the non-print switch MS5 (FIG. 4m) is concurrently operated. The card read switch S7 or the tape read switch S6 is then released followed by release of the non-print switch MS2 or tape skip switch MS5, and the desired function will then start in the selected reader.

If it is desired for any reason to eject a tabulating card in process of being read or to eject a card positioned in the tabulating card reader in readiness for reading, the card eject switch SE (FIG. 4v) may be manually operated to close its contacts 2 and 3 and thereby energize the card eject relay KCE through an energizing circuit which includes the now closed contacts 3 and 4 of the drum open contacts DOC and the now closed contacts 24 and 25 of the power relay KP. The card eject relay KCE is thereafter maintained energized through its now closed contacts 28 and 29 and the diode rectifier CRI to the energizing circuit last traced, and the read clutch LCMR energizing circuit is interrupted by the now open contacts 7 and 6 of this relay. Upon manual release of the eject switch SE to close its contacts 1 and 2, the skip clutch magnet LCSK (FIG. 4u) is energized from this same energizing circuit through the now closed contacts 4 and 5 of the card eject relay KCE. Skipping operation to eject the card will continue until the contacts 3 and 4 of the drum open contacts DOC open and the contacts 1 and 3 of the OFF normal contacts ONC also open as previously described in connection with the card eject operation. The relay KAR is deenergized at the eighty-first card collum of the card ejected, and an automatic card feed cycle will accordingly not automatically follow this manual card eject operation.

If the typewriter plugboard terminal K1 is plughub wired to reverse-energize the read control relay KRC (FIG. 4m) through its now closed contacts 27 and 28 and the selector contacts SS10 operated (in the manner previously described by the reading of a stop code by either the tape reader or the tabulating card reader, resumed operation of the reader is accomplished by manual actuation of the card read switch S7 (FIG. 4p) or the tape read switch S6 or is resumed in the reader last to operate by manual actuation of the start read switch MS3 (FIG. 4m) in conformity with the previously described control of the reading operations provided by these manually operable switches.

It will be apparent from the foregoing description of the invention that a data translating system embodying the invention provides a highly flexible system for program controlled translation and utilization of data recorded in tape or in each of successively read tabulating cards, and is one having particular utility in the preparation of printed documents. A data translating system embodying the invention is one wherein a variety of function opeartional qualifications may be impossed and removed on numerous operations, and a tape or each tabulating card is read under very flexible program controls manually selectable and changeable at will or automatically selectable and changeable according to program information recorded in the tape or according to prerecorded programs derived from card to card and under selective control of each card itself. In respect these program selections and controls, a system embodying the invention has the important advantages that the program control extends to each individual card column and various program applicable to preselectable card columns are selectably changeable manually or automatically from card to card. The data and functional control information read from a record tape or from tabulating cards may with or without imposed qualification be skipped or rerecorded in whole or in selectable part in a new record medium, may with or without imposed qualification be utilized alone or combined with manually inserted data for printed document preparation, or may with or without qualification be both rerecorded and utilized under both format controls and reading and recording controls exercised both manually and by the document printer or which are supplied by the record tape or tabulating cards in addition to the data supplied by either or both thereof.

While a specific form of the invention has been described for purposes of illustration, it is contemplated that numerous changes may be made without departing from the spirit of the invention.

What is claimed is:
1. In a data utilizing system comprising:
(a) signal deriving means for deriving means for deriving from a record source electrical signals representative of successive itesms of coded data information interspersed with items of coded functional-control, program control and format control information and wherein said items are recorded in discrete units;
(b) printing means responsive to said electrical signals for printing at least a portion of said data information in a format and in accordance with a program determined at least in part by said electrical signals representative of said items of functional, program and format control information;
(c) control means for imposing and removing selected control qualifications modifying the control exerted over the operations of said printing means by preselected ones of said functional, program and/or format control items of information; and
(d) signal responsive means responsive to the receipt of an electrical signal, derived from said record source at a location a predetermined number of units from a reference point thereon, indicative of one of said items of program control information for selectively controlling said control means to control said printing means to respond to said electrical signals by altering the response of said printing means to at least some of the subsequently received electrical signals representative of said items of data information, functional and program control codes over what the response was before the receipt of said electrical signal derived from said predetermined location.

2. The combination as set forth in claim 1 and including selectively operable manual means to impose and remove additional control qualifications upon the operational response of said printing means to said electrical signals.

3. The combination as set forth in claim 1 wherein
(a) said printing means include:
(1) a carriage movable relative to
(2) a frame, and
(3) actuating means for producing relative motion between said frame and said carriage in response to said electrical signals; and
(b) position sensitive means responsive to preselected relative positions between said carriage and said frame for selectively imposing and removing additional control qualifications upon the operational response of said printing means to said electrical signals.

4. A data utilizing system comprising:
(a) signal deriving means for deriving from a record source first electrical signals representative of successive items of coded data information interspersed with items of coded functional-control and program control information and wherein said items are recorded in discrete units;
(b) printing means for printing said data information in response to said first electrical signals and under control of said functional-control and program control information;
(c) signal generating means for generating second electrical signals representative of successive items of data information printed by said printing means in response to the printing of said data information by said printing means;
(d) recording means for selectively recording data information under control of said functional-control information and in response to either of said first and second electrical signals;
(e) control means for imposing and removing selected control qualifications modifying the control exerted over the operations of said printing and recording means by preselected functional-control and program control items of information; and
(f) signal responsive means responsive to the receipt of an electrical signal, derived from said record source at a location a predetermined number of units from a reference point thereon, indicative of one of said items of program control information for selectively controlling said control means to control said printing means to respond to said electrical signals by altering the response of said printing means to at least some of the subsequently received electrical signals representative of said items of data information, functional and program control codes over what the response was before the receipt of said electrical signal derived from said predetermined location.

5. The combination as set forth in claim 4 and including selectively operable manual means to impose and remove additional control qualifications upon the operational control of said printing and recording means by said functional-control items of information.

6. The combination as set forth in claim 4 wherein said
(a) printing means include
(1) a carriage movable relative to
(2) a frame, and
(3) actuating means for producing controlled relative motion between said frame and said carriage in response to said first electrical signals; and
(b) position sensitive means responsive to preselected relative positions between said carriage and said frame for selectively imposing and removing additional control qualifications upon the operational response of at least one of said printing and recording means.

7. The combination as set forth in claim 4 and including functional means responsive to preselected functional operations of said printing means for selectively controlling said control means to impose and remove said control qualifications upon the operations of said printg and recording means.

8. A data utilizing system comprising:
(a) reading means for reading each of successive columns of a tabulating card to derive for utilization electrical signals representative of each of successive items of coded data and functional-control information which may be recorded in each of said successive card columns;
(b) printing means responsive to said electrical signals for printing under control of said functional-control information at least a portion of said data information;
(c) qualification-control means responsive to preselected ones of said electrical-signal representations of said items of functional-control information for selectively imposing and removing any of plural control qualifications modifying the control exerted by preselected functional-control items of information over the operations of said printing means in effecting said printing of data information;
(d) plural selecting means each operable between select and non-select states;
(e) plural control means individually selected by the select state of individual ones of said selecting means and operable by said reading means between operated and non-operated states at times individually corresponding to the reading of preselected columns of a card read thereby for controlling in said operated state of each thereof at least one operational condition of said reading means to control the availabliity for utilization of said derived information; and
(f) means responsive to individual select-coded information items derived by said reading means from a tabulating card read thereby for operating individual ones of said selecting means to the select state thereof throughout the reading of the remainder of the card and to said non-select state thereof upon completion of reading of the card.

9. A data utilizing system comprising:
(a) reading means for reading each of succesive columns of a tbaulating card to derive for utilization electrical signals representative of each of successive items of coded data and functional-control information which may be recorded in each of said successive card colnmns;
(b) printing means responsive to said electrical signals for printing under control of said functional control information at least a portion of said data information;
(c) controllable means for imposing and removing any of plural control qualifications modifying the control exerted by preselected functional-control items of information over the operations of said printing means in effecting said printing of data information;
(d) means responsive to preselected ones of said electrical-signal representations of said items of functional-control information for selectively controlling said control means to impose and remove said control qualifications upon the operational response of said printing means to said electrical signals;
(e) first control means operable between operated and non-operated states for controlling in said operated state thereof at least one operational condition of said reading means to control the availability of utilization of said derived information;
(f) a plurality of second control means individual operable by said reading means between operated and non-operated states at times individually corresponding to the reading of preselected columns of a card read by said reading means;
(g) plural selecting means each operable between select and non-select states and including means responsive to the select state of each for enabling the operated state of preselected ones of said second control means to operate said first control means to said operated state thereof; and
(h) means responsive to individual select-coded information items derived by said reading means from a tabulating card read thereby for operating individual ones of said selecting means to the select state thereof throughout the reading of the remainder of the card and to said non-select state thereof upon completion of reading of the card.

10. A data utilizing system comprising:
(a) reading means for reading each of successive columns of a tabulating card to derive for utilization electrical signals representative of each successive items of coded data and functional-control information which may be recorded in each of said successive card columns;
(b) printing means having:

(1) printing keys and
(2) functional control keys;
(c) operating means responsive to said electrical signals for operating said printing and functional control keys to print, under control of said functional-control information, at least a portion of said data information;
(d) functional control means electrically operable to control functional operations of said printing and operating means;
(e) a plurality of electrical switches having contacts operated between open-contact and closed-contact positions by individual ones of said function keys and by individual preselected functional operations of said printing means for electrically controlling said control means to effect said controlled operations of said printing and operating means and for providing qualifying electrical controls over functional operations of said printing means; plural selecting means each operable between selecting means each operable between select and non-select states;
(f) plural control means individually selected by the select state of individual ones of said selecting means and operable by said reading means between operated and non-operated states at times individually corresponding to the reading of preselected columns of a card read thereby for controlling in said operated state of each thereof at least one operational condition of said reading means to control the availability for utilization of said derived information; and
(g) means responsive to individual select-coded information items derived by said reading means from a tabulating card read thereby for operating individual ones of said selecting means to the select state thereof throughout the reading of the remainder of the card and to said non-select state thereof upon completion of reading of the card.

References Cited

UNITED STATES PATENTS

| | | | |
|---|---|---|---|
| 2,905,298 | 9/1959 | Blodgett et al. | 197—20 |
| 3,025,941 | 3/1962 | Blodgett et al. | 197—20 |
| 3,072,238 | 1/1963 | Chan | 197—20 XR |
| 3,120,301 | 2/1964 | Lorch | 197—20 |
| 3,197,618 | 7/1965 | Stanley et al. | 197—20 XR |
| 3,260,340 | 7/1966 | Locklar et al. | 197—20 XR |
| 3,297,124 | 1/1967 | Sims | 197—19 |
| 3,353,744 | 11/1967 | Becking | 197—20 XR |

EDGAR S. BURR, Primary Examiner

U.S. Cl. X.R.

235—61.11

PO-1050
(5/69)

UNITED STATES PATENT OFFICE
CERTIFICATE OF CORRECTION

Patent No. 3,507,377          Dated April 21, 1970

Inventor(s)        Gilbert A. Denis

It is certified that error appears in the above-identified patent and that said Letters Patent are hereby corrected as shown below:

Column 43, line 3, after "deriving" (first occurrence) delete "means for deriving";
           Line 5, delete "itsems" and add --items--.
Column 44, line 41, delete "g" and add --ing--.
Column 45, line 6, delete "tbaulating" and add --tabulating--;
           Line 12, after "functional" add a hyphen, thus, -- - --.
Column 46, line 20, delete the last word of the line, which is "selecting";
           Line 21, delete "means each operable between".

SIGNED AND
SEALED
SEP 22 1970

(SEAL)
Attest:

Edward M. Fletcher, Jr.
Attesting Officer

WILLIAM E. SCHUYLER, JR.
Commissioner of Patents